(12) United States Patent
Bhat et al.

(10) Patent No.: US 12,591,793 B2
(45) Date of Patent: Mar. 31, 2026

(54) HIERARCHICAL CASCADE ARCHITECTURE OF SEMANTIC FINGERPRINTING OPERATIONS FOR AGENT ROUTING

(71) Applicant: Citibank, N.A., New York, NY (US)

(72) Inventors: Ganesh Prasad Bhat, New Jersey, NJ (US); James Myers, New York, NY (US); Sourabh Deb, Tampa, FL (US); Jason Engelbrecht, London (GB); Zheyu Wang, Shanghai (CN); Haolin Jin, Shanghai (CN)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/325,796

(22) Filed: Sep. 11, 2025

(65) Prior Publication Data

US 2026/0004162 A1    Jan. 1, 2026

Related U.S. Application Data

(63) Continuation-in-part of application No. 19/279,103, filed on Jul. 24, 2025, which is a continuation-in-part
(Continued)

(51) Int. Cl.
*G06F 8/41*        (2018.01)
*G06N 3/042*       (2023.01)
(Continued)

(52) U.S. Cl.
CPC ........... *G06N 5/022* (2013.01); *H04L 9/0643* (2013.01)

(58) Field of Classification Search
CPC .............................. G06N 5/022; H04L 9/0643
See application file for complete search history.

(56) References Cited

U.S. PATENT DOCUMENTS 12,135,740 B1    11/2024  Yu et al.
12,345,713 B2    7/2025   Gaylord et al.
(Continued)

FOREIGN PATENT DOCUMENTS

CN        115811401 A     3/2023
CN        115905471 A     4/2023

OTHER PUBLICATIONS

Nauta, M., et al., "From Anecdotal Evidence to Quantative Evaluation Methods: A Systematic Review of Evaluating Explainable AI" ACM Computing Surveys, vol. 55 No. 13s Article 295, 2023 [retrieved Jul. 3, 2024].
(Continued)

*Primary Examiner* — Brandon S Cole
(74) *Attorney, Agent, or Firm* — Perkins Coie LLP

(57)        ABSTRACT

The systems and methods disclosed herein orchestrate task execution among autonomous (or semi-autonomous) AI agentic models ("agents") responsive to a received query by using a hierarchical semantic fingerprinting framework to generate semantic-aware fingerprints for the query and agents. Queries and descriptions of agent capabilities are processed by a series of hierarchical levels using locality-sensitive hash (LSH) functions, where subsequent layers encode more complex semantic information and generate longer hash values. The hash values are aggregated into a semantic fingerprint. A bloom filter cascade uses a series of increasingly accurate hierarchical bloom filters to reject agent fingerprints that differ from the query fingerprint. The remaining agent fingerprints are compared bitwise to the query fingerprint, and those closest to the query fingerprint are selected to generate a routing path for the query. Responses from the selected agents are aggregated into an output that is responsive to the input.

20 Claims, 24 Drawing Sheets

Related U.S. Application Data of application No. 18/812,913, filed on Aug. 22, 2024, which is a continuation-in-part of application No. 18/661,532, filed on May 10, 2024, now Pat. No. 12,111,747, which is a continuation-in-part of application No. 18/661,519, filed on May 10, 2024, now Pat. No. 12,106,205, and a continuation-in-part of application No. 18/633,293, filed on Apr. 11, 2024, now Pat. No. 12,147,513.

(51) Int. Cl.
G06N 3/08 (2023.01)
G06N 5/022 (2023.01)
H04L 9/06 (2006.01)

(56) References Cited

U.S. PATENT DOCUMENTS

| | | | | |
|---|---|---|---|---|
| 2018/0240043 | A1* | 8/2018 | Majumdar | G06N 20/20 |
| 2022/0224716 | A1* | 7/2022 | Salji | H04L 63/1441 |
| 2022/0245441 | A1* | 8/2022 | Dechene | G06N 3/006 |
| 2022/0245462 | A1* | 8/2022 | Dechene | G06N 3/045 |
| 2022/0247643 | A1* | 8/2022 | Dechene | H04L 41/122 |
| 2022/0300716 | A1 | 9/2022 | Sabharwal et al. | |
| 2022/0377107 | A1 | 11/2022 | Lee et al. | |
| 2024/0282296 | A1 | 8/2024 | Bhathena et al. | |
| 2024/0320251 | A1 | 9/2024 | Hemington et al. | |
| 2024/0330579 | A1 | 10/2024 | Saxena | |
| 2024/0420012 | A1 | 12/2024 | Austin et al. | |

OTHER PUBLICATIONS

Bouchiha, Mouhamed, "LImchain: Blockchain-based reputation system for sharing and evaluating large language models", 2024 IEEE 48th Annual Computers, Software, and Applications Conference (COMPSAC). IEEE, 2024.

* cited by examiner

700

Query Fingerprint (336 bits)
702

10110010 11001101 01110101 ... 10010011 (42 bytes)

Candidate Agent Fingerprints
704

Agent_4782: 10110011 11001100 01110101 ... 10010010

Agent_9234: 10100010 11101101 01110001 ... 10110011

Agent_1122: 11110010 11001111 00110101 ... 10010111

Hamming Distance Results

| Agent | Hamming Distance | Match % |
|---|---|---|
| Agent_4782 | 3 bits | 99.1% |
| Agent_9234 | 5 bits | 98.5% |
| Agent_1122 | 7 bits | 97.9% |
| Agent_7651 | 12 bits | 96.4% |

*Threshold: less than 10 bits (97% match)*

SIMD Parallel Processing (AVX-512)
710

1. SIMD Load
712

_mm512_load_si512(query)

_mm512_load_si512(candidate)

Load 512 bits (64 bytes)
in single instruction

2. Bitwise XOR
714 diff = _mm512_xor_si512(a, b)

Example:
10110010 XOR 10110011 = 00000001
Identifies differing bits

3. Population Count
716

_mm512_popcnt_epi64(diff)

Counts '1' bits in parallel
8 x 64-bit popcounts
= Hamming distance

4. Horizontal Sum
718

_mm512_reduce_add_epi64()

Sum all popcount results
Final Hamming distance
for 512-bit chunk

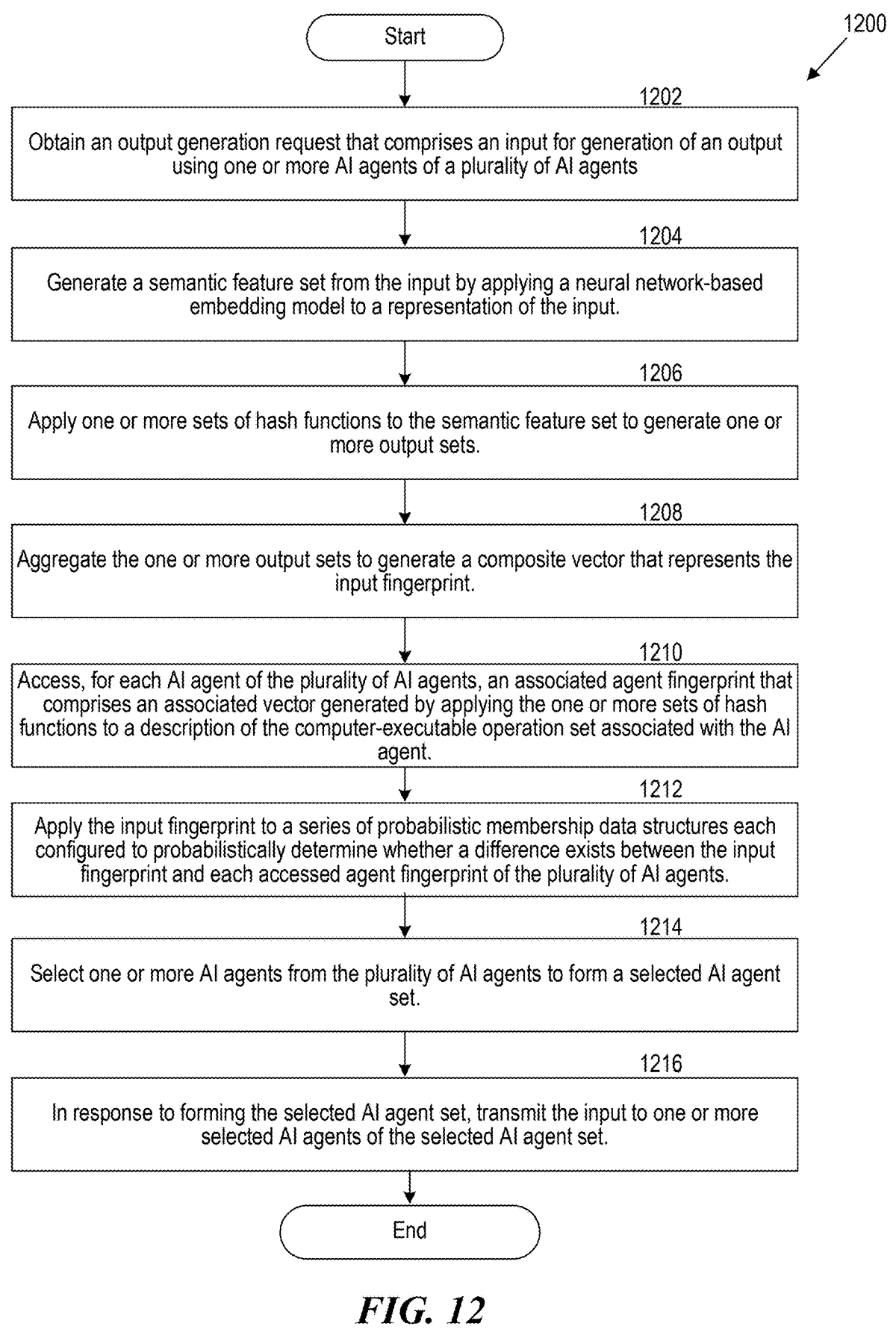

Start

1202

Obtain an output generation request that comprises an input for generation of an output using one or more AI agents of a plurality of AI agents

1204

Generate a semantic feature set from the input by applying a neural network-based embedding model to a representation of the input.

1206

Apply one or more sets of hash functions to the semantic feature set to generate one or more output sets.

1208

Aggregate the one or more output sets to generate a composite vector that represents the input fingerprint.

1210

Access, for each AI agent of the plurality of AI agents, an associated agent fingerprint that comprises an associated vector generated by applying the one or more sets of hash functions to a description of the computer-executable operation set associated with the AI agent.

1212

Apply the input fingerprint to a series of probabilistic membership data structures each configured to probabilistically determine whether a difference exists between the input fingerprint and each accessed agent fingerprint of the plurality of AI agents.

1214

Select one or more AI agents from the plurality of AI agents to form a selected AI agent set.

1216

In response to forming the selected AI agent set, transmit the input to one or more selected AI agents of the selected AI agent set.

End

*FIG. 12*

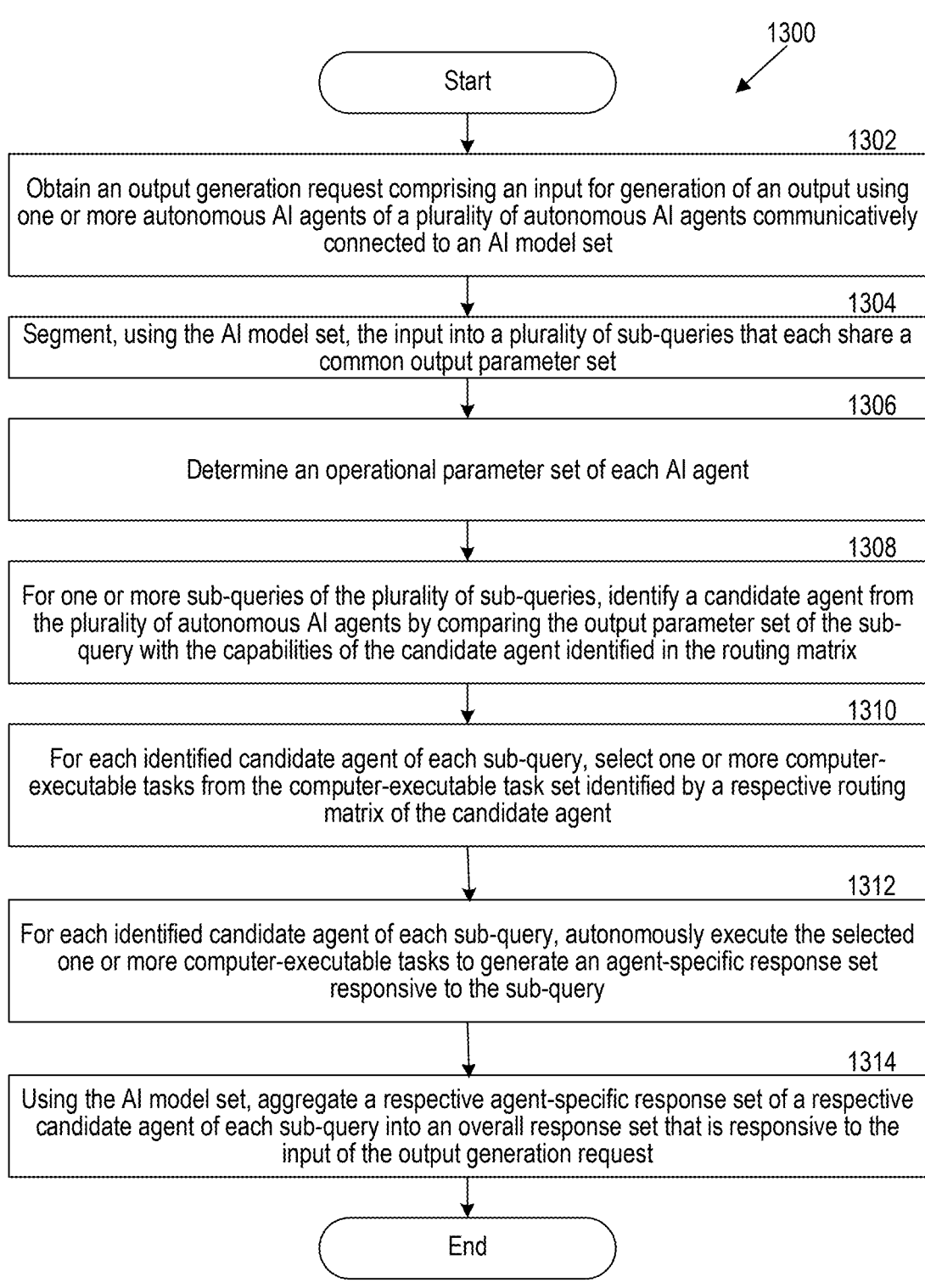

1300

Start

1302

Obtain an output generation request comprising an input for generation of an output using one or more autonomous AI agents of a plurality of autonomous AI agents communicatively connected to an AI model set

1304

Segment, using the AI model set, the input into a plurality of sub-queries that each share a common output parameter set

1306

Determine an operational parameter set of each AI agent

1308

For one or more sub-queries of the plurality of sub-queries, identify a candidate agent from the plurality of autonomous AI agents by comparing the output parameter set of the sub-query with the capabilities of the candidate agent identified in the routing matrix

1310

For each identified candidate agent of each sub-query, select one or more computer-executable tasks from the computer-executable task set identified by a respective routing matrix of the candidate agent

1312

For each identified candidate agent of each sub-query, autonomously execute the selected one or more computer-executable tasks to generate an agent-specific response set responsive to the sub-query

1314

Using the AI model set, aggregate a respective agent-specific response set of a respective candidate agent of each sub-query into an overall response set that is responsive to the input of the output generation request End

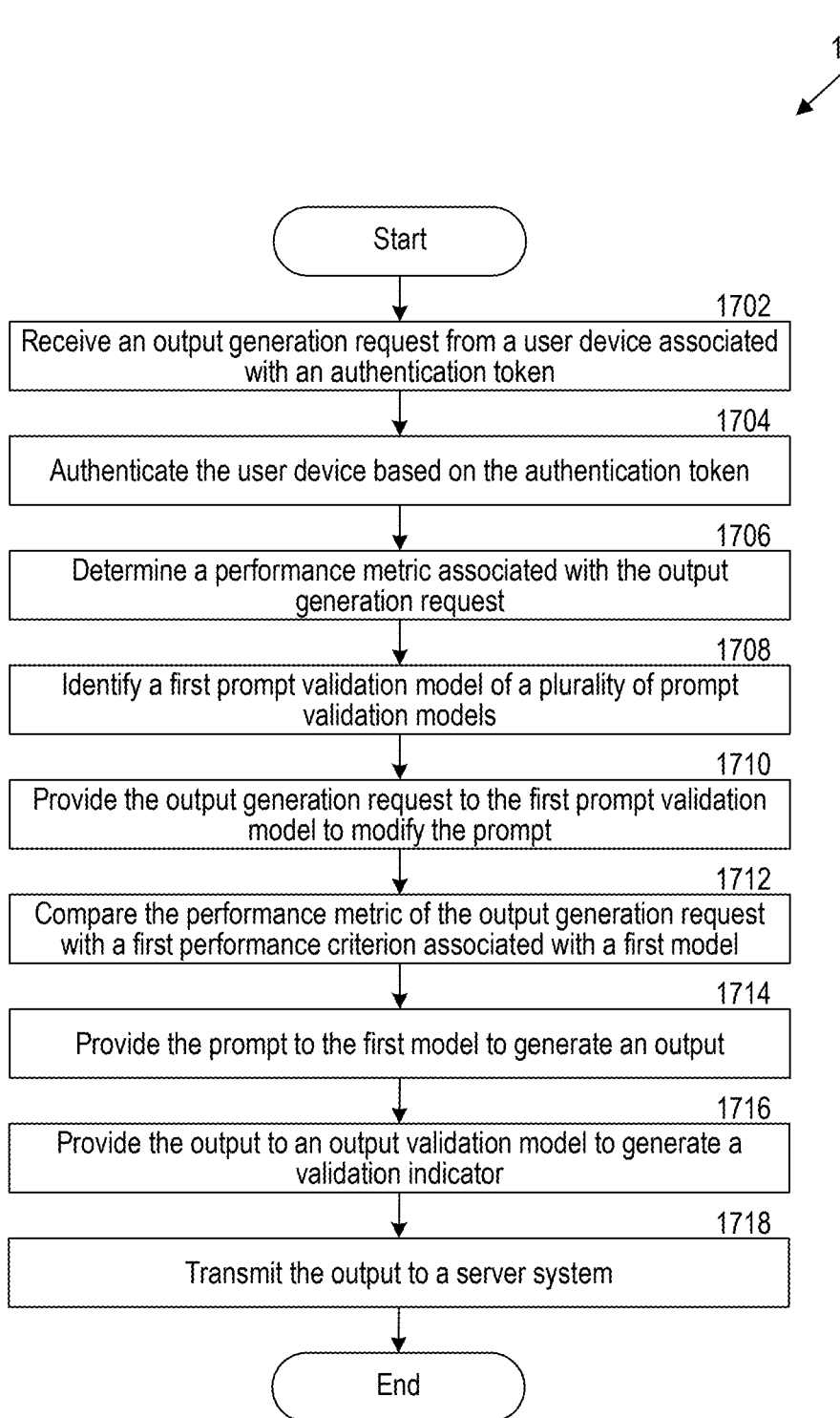

1700

Start

1702
Receive an output generation request from a user device associated with an authentication token 1704
Authenticate the user device based on the authentication token 1706
Determine a performance metric associated with the output generation request 1708
Identify a first prompt validation model of a plurality of prompt validation models 1710
Provide the output generation request to the first prompt validation model to modify the prompt 1712
Compare the performance metric of the output generation request with a first performance criterion associated with a first model 1714
Provide the prompt to the first model to generate an output 1716
Provide the output to an output validation model to generate a validation indicator 1718
Transmit the output to a server system End

| Performance Metric 1902 | Usage Value 1904 | Maximum Value 1906 | Threshold Metric Value 1908 |
|---|---|---|---|
| Central Processing Unit (CPU) Usage | 45% | 100% | 55% |
| Memory Usage | 12.30 GB | 50.00 GB | 37.70 GB |
| Hard Disk Space Usage | 93.2 TB | 100.0 TB | 68.0 TB |
| Number of Input Tokens | 150 | 200 | 50 |
| Cost Incurred | $5,203 | $12,000 | $6,797 |

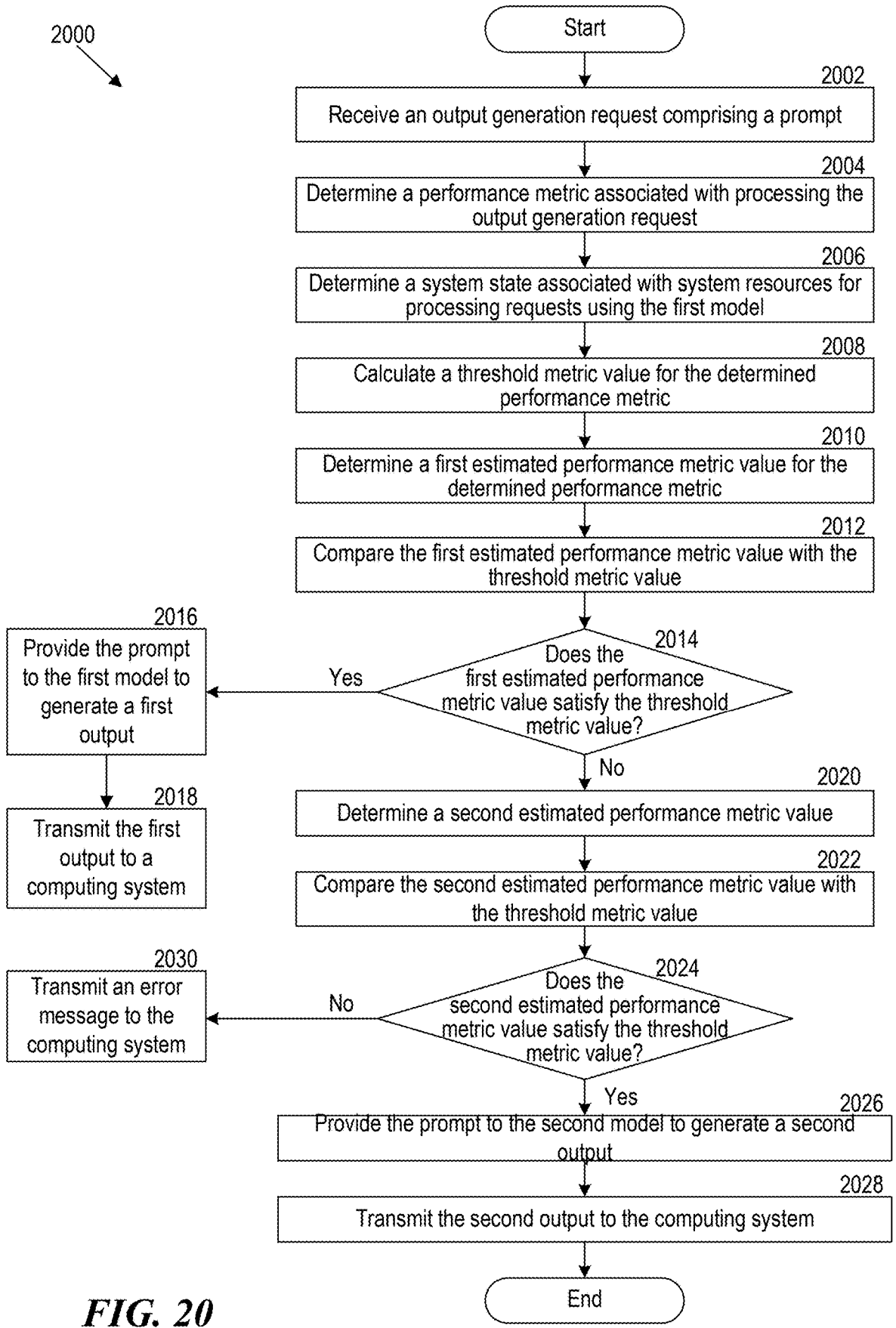

2000

Start

2002
Receive an output generation request comprising a prompt

2004
Determine a performance metric associated with processing the output generation request 2006
Determine a system state associated with system resources for processing requests using the first model 2008
Calculate a threshold metric value for the determined performance metric 2010
Determine a first estimated performance metric value for the determined performance metric 2012
Compare the first estimated performance metric value with the threshold metric value 2014
Does the first estimated performance metric value satisfy the threshold metric value?

2016
Provide the prompt to the first model to generate a first output

Yes

2018
Transmit the first output to a computing system

No

2020
Determine a second estimated performance metric value

2022
Compare the second estimated performance metric value with the threshold metric value 2024
Does the second estimated performance metric value satisfy the threshold metric value?

2030
Transmit an error message to the computing system

No

Yes

2026
Provide the prompt to the second model to generate a second output

2028
Transmit the second output to the computing system

End

*FIG. 20*

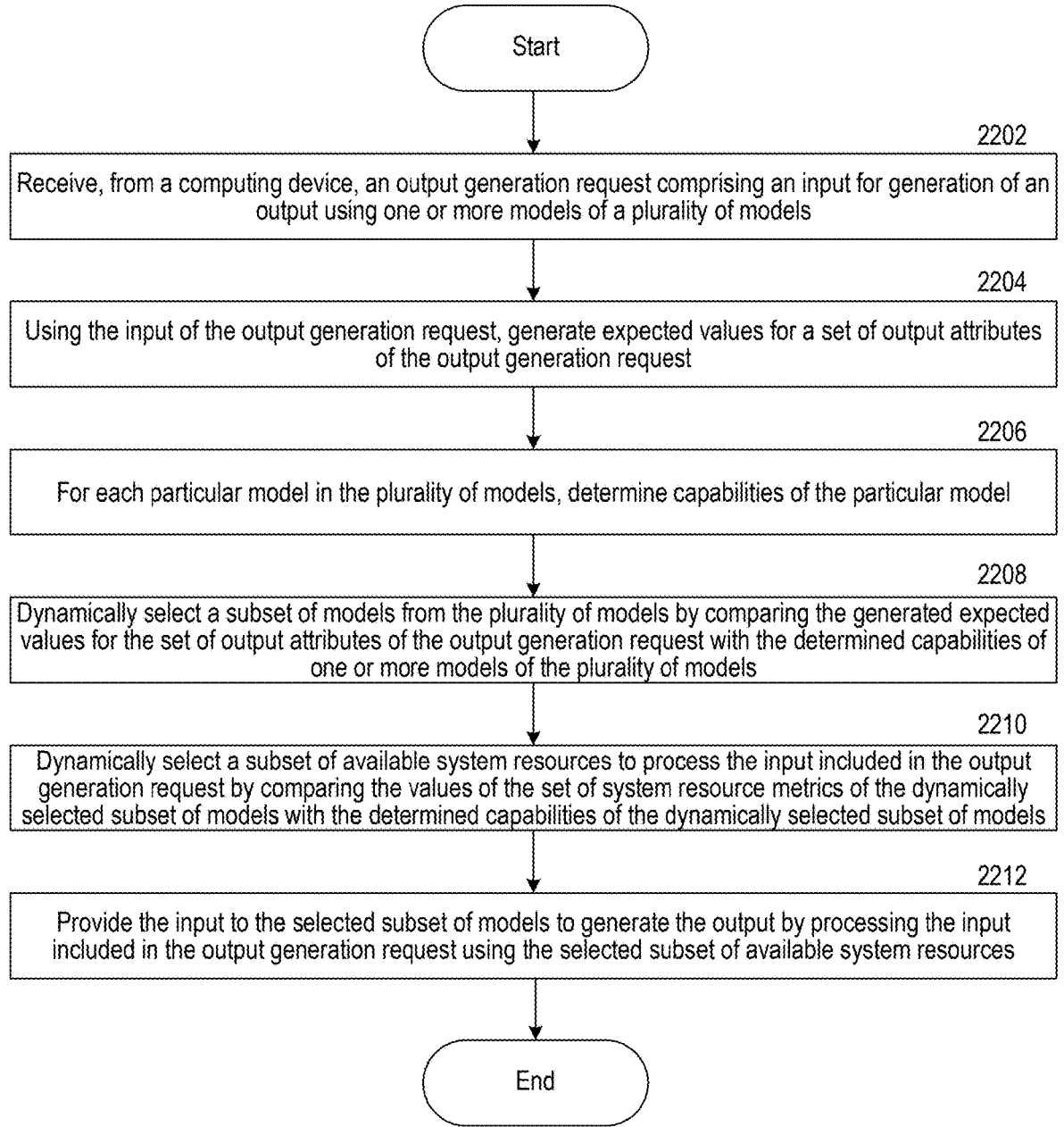

Start

2202

Receive, from a computing device, an output generation request comprising an input for generation of an output using one or more models of a plurality of models

2204

Using the input of the output generation request, generate expected values for a set of output attributes of the output generation request

2206

For each particular model in the plurality of models, determine capabilities of the particular model

2208

Dynamically select a subset of models from the plurality of models by comparing the generated expected values for the set of output attributes of the output generation request with the determined capabilities of one or more models of the plurality of models

2210

Dynamically select a subset of available system resources to process the input included in the output generation request by comparing the values of the set of system resource metrics of the dynamically selected subset of models with the determined capabilities of the dynamically selected subset of models

2212

Provide the input to the selected subset of models to generate the output by processing the input included in the output generation request using the selected subset of available system resources End

HIERARCHICAL CASCADE ARCHITECTURE OF SEMANTIC FINGERPRINTING OPERATIONS FOR AGENT ROUTING

CROSS-REFERENCE TO RELATED APPLICATION(S)

This application is a continuation-in-part of U.S. patent application Ser. No. 19/279,103 entitled "DYNAMIC ARTIFICIAL INTELLIGENCE AGENT ORCHESTRATION USING A LARGE LANGUAGE MODEL GATEWAY ROUTER" and filed Jul. 24, 2025, which is a continuation-in-part of U.S. patent application Ser. No. 18/812,913 entitled "DYNAMIC SYSTEM RESOURCE-SENSITIVE MODEL SOFTWARE AND HARDWARE SELECTION" and filed Aug. 22, 2024, which is a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024. This application is related to U.S. patent application Ser. No. 18/653,858 entitled "VALIDATING VECTOR CONSTRAINTS OF OUTPUTS GENERATED BY MACHINE LEARNING MODELS" and filed May 2, 2024, and U.S. patent application Ser. No. 18/637,362 entitled "DYNAMICALLY VALIDATING AI APPLICATIONS FOR COMPLIANCE" filed on Apr. 16, 2024. The content of the foregoing applications is incorporated herein by reference in their entirety.

BACKGROUND

An artificial intelligence (AI) agentic model ("agent"), whether autonomous or semi-autonomous, refers to a persistent software entity characterized by a digitally encoded objective function. The objective function can instruct the agent to, for example, maximize task accuracy, minimize resource usage, comply with specified operational constraints, and the like. The degree of autonomy can range from semi-autonomous, where human intervention is occasionally used, to fully autonomous, where the agent operates independently within defined parameters. Agents use received data (e.g., an input, a prompt, a query) to autonomously trigger and manage actions such as application programming interface (API) invocations, outbound network requests, updates to internal or external datastores, and other computational tasks.

BRIEF DESCRIPTION OF THE DRAWINGS

FIG. 7 shows a schematic illustrating an example architecture implementing a bitwise matching procedure, in accordance with some implementations of the present technology.

FIG. 12 is a flow diagram illustrating a process for routing queries by performing semantic fingerprinting of queries, in accordance with some implementations of the present technology.

FIG. 13 shows a flow diagram illustrating a process for orchestrating a plurality of semi-autonomous or autonomous artificial intelligence (AI) agents to generate a personalized response, in accordance with some implementations of the present technology.

FIG. 17 shows a flow diagram illustrating a process for evaluating natural language prompts for model selection and for validating generated responses, in accordance with some implementations of the present technology.

FIG. 20 shows a flow diagram illustrating a process for dynamic selection of models based on evaluation of user prompts, in accordance with some implementations of the present technology.

FIG. 22 is a flow diagram illustrating a process for dynamic selection of models and infrastructure to process the request with the selected models based on evaluation of user prompts, in accordance with some implementations of the present technology.

Figure 1:
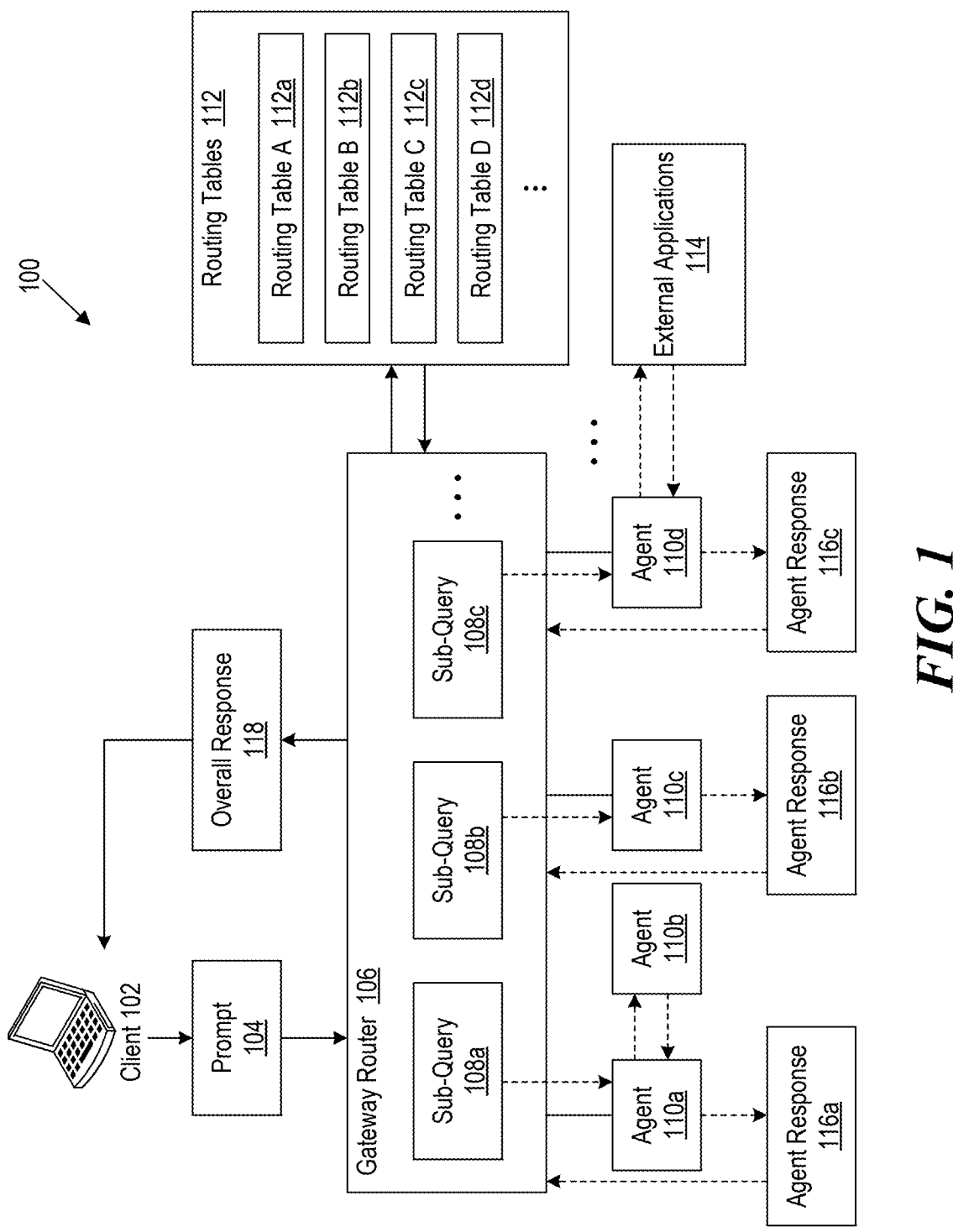
FIG. 1 shows a schematic illustrating an example environment of orchestrating semi-autonomous or autonomous agents, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Traditional machine learning and large language models (LLMs) are typically designed as static, monolithic models. These models are trained on broad (i.e., general) datasets and, once deployed, respond to inputs strictly based on internal representations—that is, the way information, patterns, and relationships learned from training data are encoded and stored within the model's architecture as parameters, embeddings, and/or latent features. The internal representations enable the model to interpret and generate responses to new inputs by referencing what has been encoded during training. To update the internal representations, the models are retrained. In contrast, AI agents are persistent software entities characterized by objective functions and varying degrees of autonomy. Agents can perceive environments, make decisions, execute actions, and optimize their behavior with respect to defined objective functions. Autonomous or semi-autonomous agents can independently process incoming data, determine action plans, and dynamically invoke APIs, databases, other agents, or external services to execute tasks.

Conventional approaches of query classification include keyword-based matching or intent classification models that rely on predefined domain categories or rule sets. The routing of queries to sub-models or agents is typically based on static mappings, routing tables, or gating functions that are configured in advance and do not dynamically adjust to changes in the operational environment. For example, mixture-of-experts (MoE) architectures-which route an input to specialized embedded sub-models, also known as "experts"-employ a gating network to select among a set of experts, with the gating decision determined by features extracted from the input. However, both the gating logic and the experts are trained jointly and share a common context window and parameter space. These static routing mechanisms do not account for changes in data topology, agent availability, user roles, or contextual signals that may arise during system operation. Consequently, conventional systems are unable to dynamically adapt their routing or classification strategies in response to evolving user requirements, agent states, or environmental conditions.

The lack of adaptability and context can partially be remedied by incorporating information retrieval into an architecture. In conventional systems, this can be implemented by retrieval-augmented generation (RAG) architectures, which are designed to enhance the capabilities of LLMs by incorporating external knowledge sources. RAG enables a model to retrieve additional context from external knowledge bases, thereby supplementing generic model capabilities with specialized (e.g., domain-specific) or up-to-date data. However, both RAG and MoE approaches assume the existence of centralized, comprehensive, and accessible data repositories, and rely on the ability to retrieve relevant and authoritative information at inference time. In distributed or access-restricted environments, where data may be fragmented, incomplete, or subject to privacy and security constraints, these conventional retrieval and routing mechanisms are unable to provide accurate, comprehensive, or policy-compliant responses. Additionally, reliance on static retrieval logic and centralized data access further limits the applicability of these approaches in environments characterized by distributed, federated, or regulated data sources. Privacy, security, and regulatory requirements frequently preclude the centralization or unrestricted sharing of sensitive data, thereby constraining the ability of conventional systems to aggregate and process all relevant information.

Beyond missing data, large-scale MoE or RAG systems typically degrade in quality when presented with redundant or unrelated data, returning overly generic or even misleading outputs. The degradation is exacerbated as the context window enlarges. For example, models may "forget" or dilute the significance or weight of specific facts. In addition, since legal, privacy, and commercial risks mean that users often cannot or will not upload all proprietary or sensitive data into global models, even if such upload were technically feasible, traditional information retrieval workflows and context windows that are typically optimized for public data and open environments are unable to operate accurately using regulated, distributed, or privacy-sensitive workflows.

As datasets increase in scale and become more distributed across heterogeneous and access-restricted repositories, the performance of static routing and retrieval approaches degrades significantly. Common static mapping and search-based approaches become prohibitively expensive to perform as the number of agents, capabilities, and data sources increases. Existing architectures lack mechanisms for fine-grained, context-aware, and policy-compliant query routing that can operate effectively in regulated, distributed, or privacy-sensitive environments. Consequently, there exists a need for systems and methods that enable efficient, scalable, and policy-compliant query classification and routing in environments characterized by distributed, heterogeneous, and access-controlled data sources.

Attempting to create a system to route queries to autonomous or semi-autonomous AI agents for output generation in view of the available conventional approaches created significant technological uncertainty, especially in environments comprised of large, distributed, and access-restricted datasets (such as those encountered in regulatory, industrial, or IoT deployments). Creating such a system requires addressing several unknowns in conventional distributed data processing techniques, including the inflexibility, latency, and lack of contextual awareness in existing orchestration and data access solutions.

To overcome the technological uncertainties, the inventors systematically evaluated multiple design alternatives. For example, the inventors evaluated systems that relied on hard-coded, rule-based routing architectures, in which requests are segmented and routed to designated external agents or datasets according to pre-set rules. Although the segmentation of the request enabled a more focused context window (and thereby reduced the probability of a diluted response), the system was unable to adapt to changes in data topology, user roles, or other access policies, which are prevalent in environments governed by regulatory or organizational controls. For instance, if a user's request requires expertise from a newly added device/agent or if a particular agent becomes overloaded or offline, static routing is unable to adjust dynamically. Another alternative relied on a RAG system configured to process a user query and retrieve agent information for routing the query to an appropriate agent. In this approach, the LLM receives the user query as input, generates an embedding of the query, and then performs a retrieval operation over a database or list of agent data to identify a candidate agent to process the query. However, this approach is characterized by significant latency, as the system must sequentially process the user query and perform retrieval over potentially large agent datasets with a high dimensional representation of each agent data, resulting in slow response times that are unsuitable for environments requiring low-latency or real-time agent orchestration.

As such, the inventors have developed systems (hereinafter "model orchestration platform") and related methods to generate routing decisions for user inputs (queries, requests, commands) using a semantic fingerprinting framework to generate an output from a distributed network (e.g., a "constellation") of artificial intelligence (AI) agents. The semantic fingerprinting framework receives an output generation request from a user interface or API endpoint, then generates a semantic fingerprint by processing the input/request through successive fingerprinting levels. Each fingerprinting level uses one or more locality-sensitive hash (LSH) functions to encode semantic data according to distinct dimensions, such as semantic content, information domain, and/or input intent. Each subsequent level of the semantic fingerprinting framework generates a longer hash value and encodes more semantic content than previous levels. The resulting hash values for each fingerprinting level are aggregated to generate the fingerprint. The semantic fingerprinting framework generates fingerprint values for the plurality of AI agents based on descriptions (e.g., natural language descriptions) of each agent's capabilities, focus, accessible databases, permission level, and/or executable tasks. The input fingerprint is compared to the plurality of agent fingerprints to determine a set of agent fingerprints that are closest to the input fingerprint (e.g., with the fewest bitwise differences between the fingerprints), and the corresponding agents are selected for a routing path of the input (e.g., are selected to process the input in order to address the query and generate an output).

Additionally, the model orchestration platform can implement a hierarchical bloom filter cascade to compare the input fingerprint to the plurality of agent fingerprints. Each agent fingerprint can be processed using a set of hash functions to generate a corresponding bitstring, wherein the bitstring has nonzero entries at bit positions corresponding to hash values generated by applying the set of hash functions to the agent fingerprint. The hierarchical bloom filter cascade can implement multiple levels, each associated with a set of hash functions which can be used to generate agent bitstrings. The agent bitstrings of higher levels can be longer and encode more semantic information that the agent bitstrings of lower levels. The hierarchical bloom filter cascade can, at each level, use the bitstrings to probabilistically determine an equality between the query fingerprint and the agent fingerprints, wherein successive levels compare longer bitstrings on a reduced amount of agent fingerprints to narrow the set of potential agents. The agent fingerprints that pass all levels of the hierarchical bloom filter cascade can be directly compared to the query fingerprint, and the agents with the closest fingerprints (e.g., with the smallest Hamming distance with respect to the query fingerprint) can be selected for a routing path of the input.

The model orchestration platform routes the input and/or input representations to a set of AI agents to produce an output responsive to the input. Each agent can independently retrieve and process only the slices of federated, privacy-controlled data within its authorization scope (e.g., relevant slices of data), thereby producing localized results. The model orchestration platform aggregates/synthesizes the agent-specific responses into an overall, contextually responsive output that is in compliance with access controls, operational boundaries, and regulatory constraints. In some implementations, the model orchestration platform displays a presentation (e.g., on a graphical user interface, command line interface, or other transmittal destination) of the routing path decision generated by the semantic fingerprinting framework, detailing confidence scores and agent identifiers to create an audit trail that identifies the processing history and/or data lineage.

The agents in the network, of which can be a subject matter expert (SME) trained on specialized data (i.e., data sharing a common domain), can each access respective specialized data repositories or devices. When an input to the hierarchical model cascade spans multiple domains, the hierarchical model cascade can invoke hierarchies of agents, such as starting with generalists and cascading to deeper specialists as needed (e.g., as determined by the generalist agent), and/or enable the agents themselves to flag missing data, recommend delegation to peer experts, or identify additional data sources. Each agent can operate with an independent context window, can maintain its own workflow, and can communicate recommendations or missing points of failure (such as a lack of current sensor data or an unavailable device). The model orchestration platform thus enables a closed feedback loop where agent workflows may themselves evolve, ontologies and routing tables can be dynamically updated, and the agents can participate in voting or consensus workflows for particular tasks. The model orchestration platform does not depend on a single shared model or input pipeline (such as that of MoE architectures), but instead orchestrates a distributed, context-aware, and dynamically adaptable network of specialized agents.

Further, the model orchestration platform disclosed herein enables dynamic evaluation of machine learning prompts for agent selection, as well as validation of the resulting outputs, in order to improve the security, reliability, and modularity of data pipelines (e.g., software development systems). The model orchestration platform can receive a prompt from a user (e.g., a human-readable request relating to software development, such as code generation) and determine whether the user is authenticated based on an associated authentication token (e.g., as provided concurrently with the prompt). Based on the selected model, the model orchestration platform can determine a set of performance metrics (and/or corresponding values) associated with processing the requested prompt via the selected model. By doing so, the model orchestration platform can evaluate the suitability of the selected model (e.g., agent) for generating an output based on the received input or prompt. The model orchestration platform can validate and/or modify the user's prompt according to a prompt validation model. Based on the results of the prompt validation model, the model orchestration platform can modify the prompt such that the prompt satisfies any associated validation criteria (e.g., through the redaction of sensitive data or other details) thereby mitigating the effect of potential security breaches, inaccuracies, or adversarial manipulation associated with the user's prompt.

The inventors have also developed a system for dynamically selecting models (e.g., agents) for processing user prompts in a resource-sensitive manner. The system state can include a current CPU usage associated with processors of the model orchestration platform. Based on the system state, the model orchestration platform can calculate a threshold metric value that indicates an allotment of system resources available for generating an output based on the prompt. The model orchestration platform can determine the estimated performance metric value associated with generating the output using the user's selected machine learning model (e.g., agent). In response to determining that the estimated performance metric value satisfies the threshold metric value, the data generation platform can provide the prompt to the selected model (e.g., agent) for generation of the requested output and subsequent transmission to a system that enables the user to view the output. When the estimated performance metric value does not satisfy the threshold metric value, the data generation platform can determine another model (e.g., a second agent) for generation of the output.

To evaluate the model (e.g., agent) outputs, the inventors have developed a system that operates in an isolated environment to mitigate errors and security breaches. For example, the data generation platform determines whether an output from a machine learning model, such as an agent, includes particular types of data (e.g., including software-related information, such as a code sample, code snippet, or an executable program). In such cases, the data generation platform can provide the generated output to a parameter generation model (e.g., an LLM, another agent) configured to generate validation test parameters to validate the nature of the output data (e.g., the generated code). For example, using the parameter generation model, the platform generates compilation instructions for an appropriate programming language, where the compilation instructions identify or locate a compiler for compiling a set of executable instructions based on the generated code. The parameter generation model can generate a virtual machine configuration for testing the behavior of the executable instructions. The data generation platform can generate the virtual environment (e.g., within a virtual machine) according to the virtual machine configuration to enable compilation of the generated code within an isolated environment (e.g., a "sandcastle") for testing the code.

Further, the model orchestration platform can select, in response to an input, AI model(s) to generate an output and the infrastructure to run the one or more AI models. For example, the system receives an output generation request including an input for the generation of an output using one or more models from a plurality of models. The system can generate expected values for a set of output attributes (e.g., a type of the output generated from the input, a threshold response time of the generation of the output) of the output generation request. For each particular model in the plurality of models, the system can determine the capabilities of the particular model (e.g., estimated performance metric values for processing requests, system resource metric values indicating an estimated resource usage), and dynamically select a subset of models from the plurality of models. For the selected subset of models, the system can dynamically select a subset of available system resources to process the input included in the output generation request. The system generates the output by processing the input included in the output generation request using the selected subset of available system resources.

While the current description provides examples related to LLMs and agents, one of skill in the art would understand that the disclosed techniques can apply to other forms of machine learning or algorithms, including unsupervised, semi-supervised, supervised, and reinforcement learning techniques. For example, the disclosed model orchestration platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Model Orchestration Platform

FIG. 1 shows a schematic illustrating an example environment 100 of orchestrating semi-autonomous or autonomous agents, in accordance with some implementations of the present technology. The environment 100 is implemented using components of example devices 200 and computing devices 302 illustrated and described in more detail with reference to FIG. 2 and FIG. 3, respectively. Implementations of example environment 100 can include different and/or additional components or can be connected in different ways.

The environment 100 includes a client 102, which may be any electronic device provisioned with digital computation and communication capability, such as a laptop, workstation, server endpoint, mobile processor, or embedded system, capable of generating, encoding, and transmitting semantically structured input data (e.g., prompts, search queries, command tokens) to the gateway router 106. The client 102 can be a personal computer, mobile device, or any other suitable computing device such as those with a user interface.

The gateway router 106 refers to an orchestration endpoint of the environment 100 that receives the prompt 104 from the client 102 and manages the distribution of processing tasks across multiple semi-autonomous or autonomous agents. The gateway router 106 can operate as a routing node and be implemented as a computer program executable on one or more processors of the client 102 or a different computing device. The gateway router 106 may, in some implementations, include a monolithic LLM. In some implementations, the gateway router can include a federated suite of models where each model can be specialized for different tasks (e.g., prompt segmentation, domain inference, agent selection) and the suite can operate under a meta-controller (potentially itself, an LLM, or other system) that arbitrates inter-model decisioning and delegates segmented tasks to the agent network. The gateway router 106 can include an active ensemble configuration, in which diverse models (e.g., transformer-based models, symbolic reasoners, reinforcement learning agents) run in coordinated or competitive execution, with routing decisions produced through model fusion and aggregation methods (e.g., MoE or majority/consensus voting).

In each case, the gateway router 106 partitions, segments, or otherwise decomposes the received prompt 104 into sub-queries 108 (e.g., a first sub-query 108a, a second sub-query 108b, a third sub-query 108c, and so forth). The sub-queries 108 each refer to a computational action unit that includes instructions such as data retrieval requests, each annotated with an output parameter set that can specify a user type (e.g., access-level), temporal context (timestamp), requested output modality (text, vector, file), performance requirements, system resource thresholds, and so forth.

The environment 100 includes multiple semi-autonomous or autonomous agents 110 (a first agent 110a, a second agent 110b, a third agent 110c, a fourth agent 110d, and so forth) that process the sub-queries 108 and generate agent responses 116 (e.g., a first agent response 116a, a second agent response 116b, a third agent response 116c, and so forth). The agents 110 refer to a persistent software entity that can be characterized by a digitally encoded objective function (e.g., maximization of task accuracy, minimization of resource usage, compliance with specified policy constraints). The instantiation of the objective function can be static (e.g., assigned at deployment) or dynamic, enabling runtime adaptation of the objective function in response to changes in environmental signals (such as resource state, input task complexity, geopolitical events, market data, user context, and the like). The agents 110 are enabled to receive unstructured, semi-structured, or structured environmental signals (e.g., prompt metadata, resource availability, inter-agent messages, contextual signals received from the gateway router 106), and use the environmental signals to autonomously trigger and manage actions such as application programming interface (API) invocations, outbound network requests, updates to internal or external datastores, and so forth.

The agents 110 can be structured as a network and/or a "constellation" of agents. For example, the agents 110 can be interconnected such that each agent operates as an autonomous or semi-autonomous node enabled to perform direct peer-to-peer interactions and/or hierarchical delegation. For example, a general agent can perform query parsing and context recognition, but subsequently route specialized sub-tasks to sub-agents with subject matter expertise (SMEs) (e.g., trained on a domain-specific dataset) in specific domains such as legal compliance, financial analysis, and so forth. Therefore, either the orchestrator agent can initially invoke only the general agent, which then further delegates sub-tasks, or the orchestrator agent can choose to directly identify and route work to the specialized sub-agent. For instance, in a financial services context, the gateway router can divide a trading query into segments for agents handling treasuries, equities, and derivatives, and then aggregate the results to produce an overall response.

The actions autonomously executed by the agents 110 can be responsive to a respective objective function of the agent. For example, an agent's objective function may direct it to maximize retrieval accuracy from a specific database, minimize task completion latency, or balance multiple criteria based on predefined weights. During autonomous execution, the agent 110 can determine a degree of expected utility of candidate actions by evaluating them against the agent's objective function and select executable actions that align with the agent's assigned objectives within any imposed operational constraints or boundaries set by the gateway router 106.

The agents 110 can vary in architecture. For example, the first agent 110a refers to a primary agent that receives sub-queries directly from the gateway router 106, and is enabled to autonomously communicate with the second agent 110b (e.g., spawn secondary sub-tasks or transfer execution context to other agents), which is not directly connected to the gateway router 106. The inter-agent communication enables collaborative problem-solving and knowledge sharing between different agents without direct orchestration from the gateway router 106. In another example, the third agent 110c refers to a directly connected agent that interfaces directly with the gateway router 106 for processing sub-queries. In yet another example, the fourth agent 110d refers to an agent enabled to autonomously connect to external applications 114, for example, via application programming interfaces (APIs) or other integration methods, to gather additional information or perform specific tasks to generate the third agent response 116c.

In some implementations, the gateway router 106 uses routing tables 112 to determine a candidate agent or combination of candidate agents to route the sub-query to. The routing tables 112 refer to data structures that store information associated with one or more respective agents 110, such as agent capabilities, knowledge bases connected to the agent, compliance status with certain guidelines (e.g., compliance with the EU AI Act, compliance with organizational guidelines), resources used by the agent, current workload, historical performance metrics, and so forth. The routing tables 112 can include multiple individual routing tables (such as a first routing table 112a, a second routing table 112b, a third routing table 112c, a fourth routing table 112d, and so forth) corresponding to different agents or agent types. Each routing table can include or otherwise indicate mappings between sub-query characteristics and agent capabilities, thereby enabling the gateway router 106 to use the information within the routing table when routing the sub-queries. The routing tables 112 can be dynamically updated based on agent performance and/or system feedback.

The fourth agent 110d in FIG. 1 communicatively connects with one or more external applications 114. The external applications 114 refer to third-party software systems, databases, or services that can be accessed by the agents 110 to supplement their knowledge base or operations. These external applications 114 can include data sources, computational tools, domain-specific APIs, and so forth.

Each agent generates an agent response 116 (e.g., the first agent response 116a, the second agent response 116b, the third agent response 116c, and so forth) based on the assigned sub-query 108. The agent responses 116 refer to unstructured, semi-structured, or structured output data that includes or otherwise indicates the results of a respective agent responsive to the assigned sub-query 108. The agent responses 116 can include text, structured data, or references to external resources. For instance, the agent responses 116 may include natural language text (such as summaries or explanations), structured outputs like JSON or XML objects, tabular data, executable scripts, or uniform resource identifiers (URIs) referencing files or computational results stored elsewhere. The agent responses 116 can include pointers to large datasets or content retrieved via external APIs (e.g., the external applications 114).

The gateway router 106 is enabled to receive or otherwise obtain these individual agent responses 116 and synthesize the agent responses 116 into an overall response 118. The gateway router 106 can, for example, concatenate or merge the agent responses 116. In some implementations, the gateway router 106 combines overlapping results, filters redundancies, resolves conflicts based on agent confidence scores or reliability metrics, and so forth. The gateway router 106, in some implementations, uses majority voting to aggregate the agent responses 116 when multiple agents provide alternative answers to the same logical sub-task. The gateway router 106, in some implementations, weighs or re-prioritizes agent responses in response to known user preferences, system policies, or observed trustworthiness (e.g., via an assigned reputation score) of specific agent/application pairs. Further methods of aggregating the agent responses 116 are discussed in detail with reference to FIG. 13. The overall response 118 can be transmitted back to the client 102 (e.g., via the gateway router 106) for presentation to the user.

Suitable Computing Environments for the Model Orchestration Platform

Figure 2:
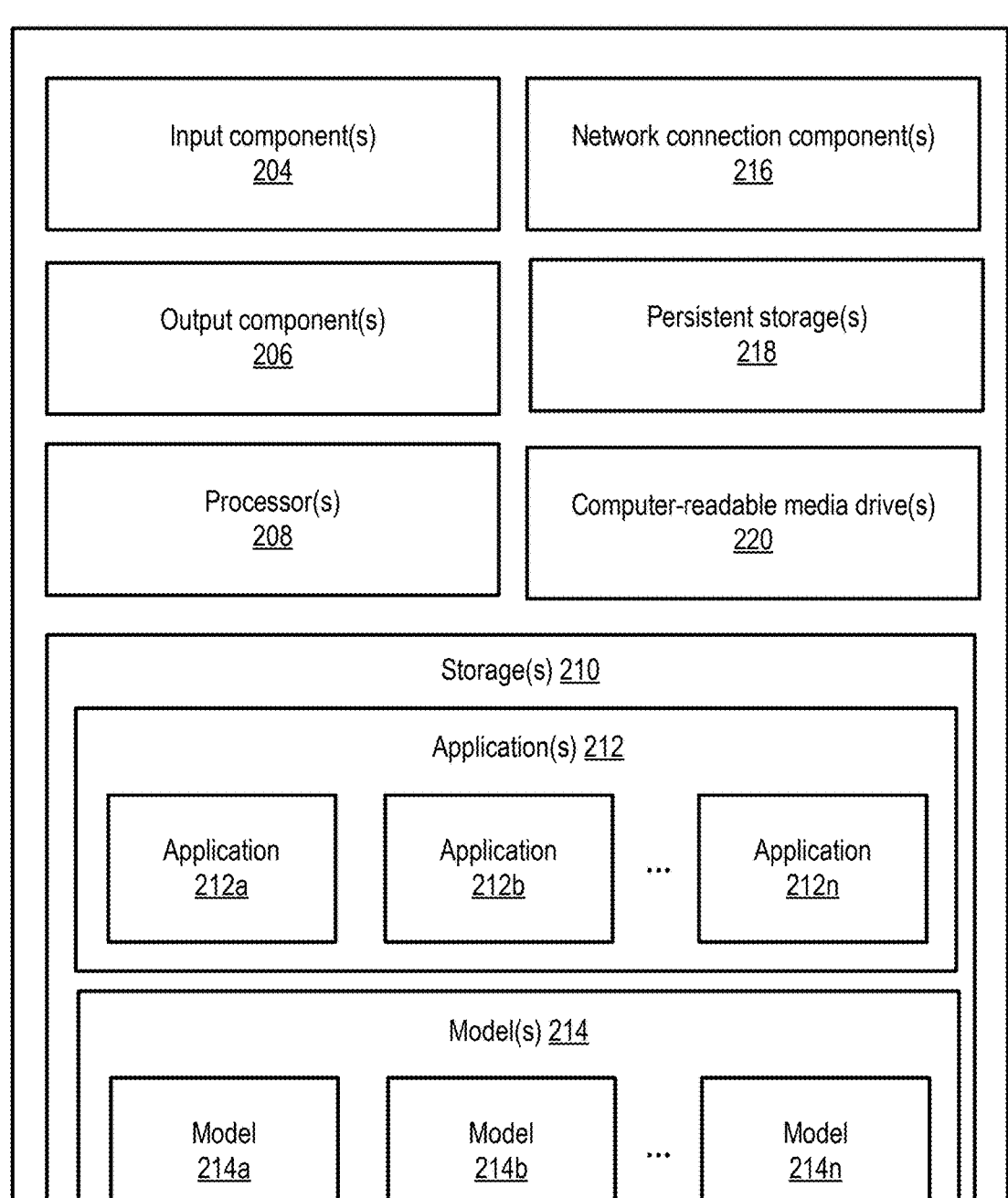
FIG. 2 shows a block diagram showing some of the components typically incorporated in at least some of the computer systems and other devices on which the disclosed system operates, in accordance with some implementations of the present technology.

FIG. 2 shows a block diagram showing some of the components typically incorporated in at least some of the computer systems and other devices 200 on which the disclosed system (e.g., the model orchestration platform) operates in accordance with some implementations of the present technology. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, track pads, mice, compact disc (CD) drives, digital video disc (DVD) drives, 3.5 mm input jack, High-Definition Multimedia Interface (HDMI) input connections, Video Graphics Array (VGA) input connections, Universal Serial Bus (USB) input connections, or other computing input components; output components 206, including display screens (e.g., liquid crystal displays (LCDs), organic light-emitting diodes (OLEDs), cathode ray tubes (CRTs), etc.), speakers, 3.5 mm output jack, lights, light emitting diodes (LEDs), haptic motors, or other output-related components; processor(s) 208, including a CPU for executing computer programs, a GPU for executing computer graphic programs and handling computing graphical elements; storage(s) 210, including at least one computer memory for storing programs (e.g., application(s) 212, model(s) 214, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility can be implemented using devices of various types and configurations and having various components.

Figure 3:
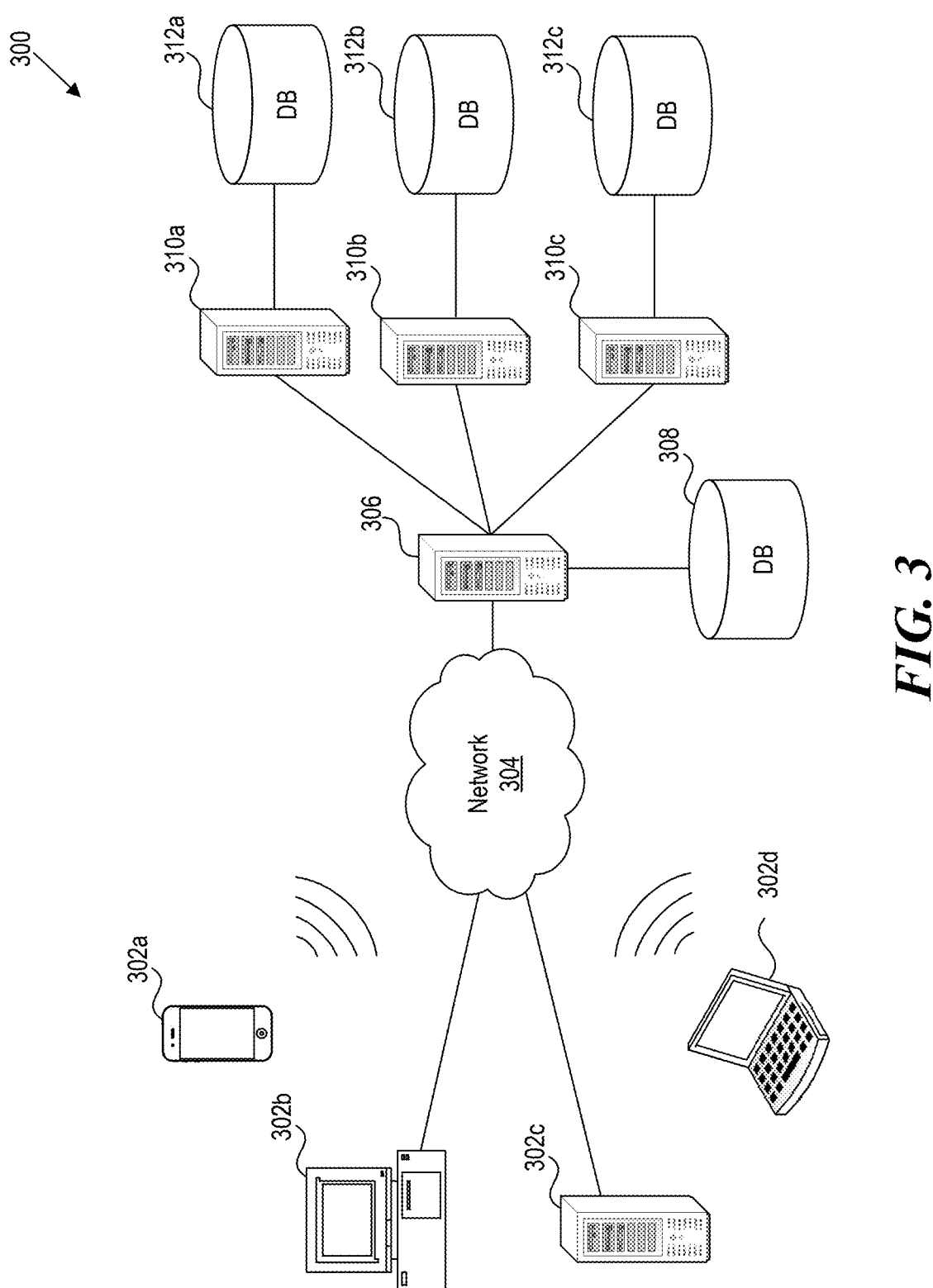
FIG. 3 is a system diagram illustrating an example of a computing environment in which the disclosed system operates, in accordance with some implementations of the present technology.

FIG. 3 is a system diagram illustrating an example of a computing environment 300 in which the disclosed system operates in some implementations of the present technology. In some implementations, environment 300 includes one or more client computing devices 302a-302d, examples of which can host graphical user interfaces associated with client devices. For example, one or more of the client computing devices 302a-302d includes user devices and/or devices associated with services requesting responses to queries from LLMs. Client computing devices 302 operate in a networked environment using logical connections through network 304 (e.g., the network 1450) to one or more remote computers, such as a server computing device (e.g., a server system housing the model orchestration platform). In some implementations, client computing devices 302 can correspond to device 200 (FIG. 2).

In some implementations, server computing device 306 is an edge server that receives client requests and coordinates fulfillment of those requests through other servers, such as server computing devices 310a-310c. In some implementations, server computing devices 306 and 310 comprise computing systems. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310a-310c) connect to a corresponding database (308, 312a-312c). For example, the corresponding database includes a database stored within the data node 1404 (e.g., a sensitive token database, an event database, or another suitable database). As discussed above, each server computing device 310 can correspond to a group of servers, and each of these servers can share a database or can have its own database (and/or interface with external databases, such as third-party databases 1408a-1408n). In addition to information described concerning the data node 1404 of FIG. 14, databases 308 and 312 can warehouse (e.g., store) other suitable information, such as sensitive or forbidden tokens, user credential data, authentication data, graphical representations, code samples, system policies or other policies, templates, computing languages, data structures, software application identifiers, visual layouts, computing language identifiers, mathematical formulae (e.g., weighted average, weighted sum, or other mathematical formulas), graphical elements (e.g., colors, shapes, text, images, multimedia), system protection mechanisms (e.g., prompt validation model parameters or criteria), software development or data processing architectures, machine learning models, AI models, training data for AI/machine learning models, historical information, or other information.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 (e.g., corresponding to the network 1450) can be a local area network (LAN) or a wide area network (WAN) but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of LAN, WAN, wired network, or wireless network, including network 304 or a separate public or private network.

Overview of the Hierarchical Model Cascade

Figure 4:
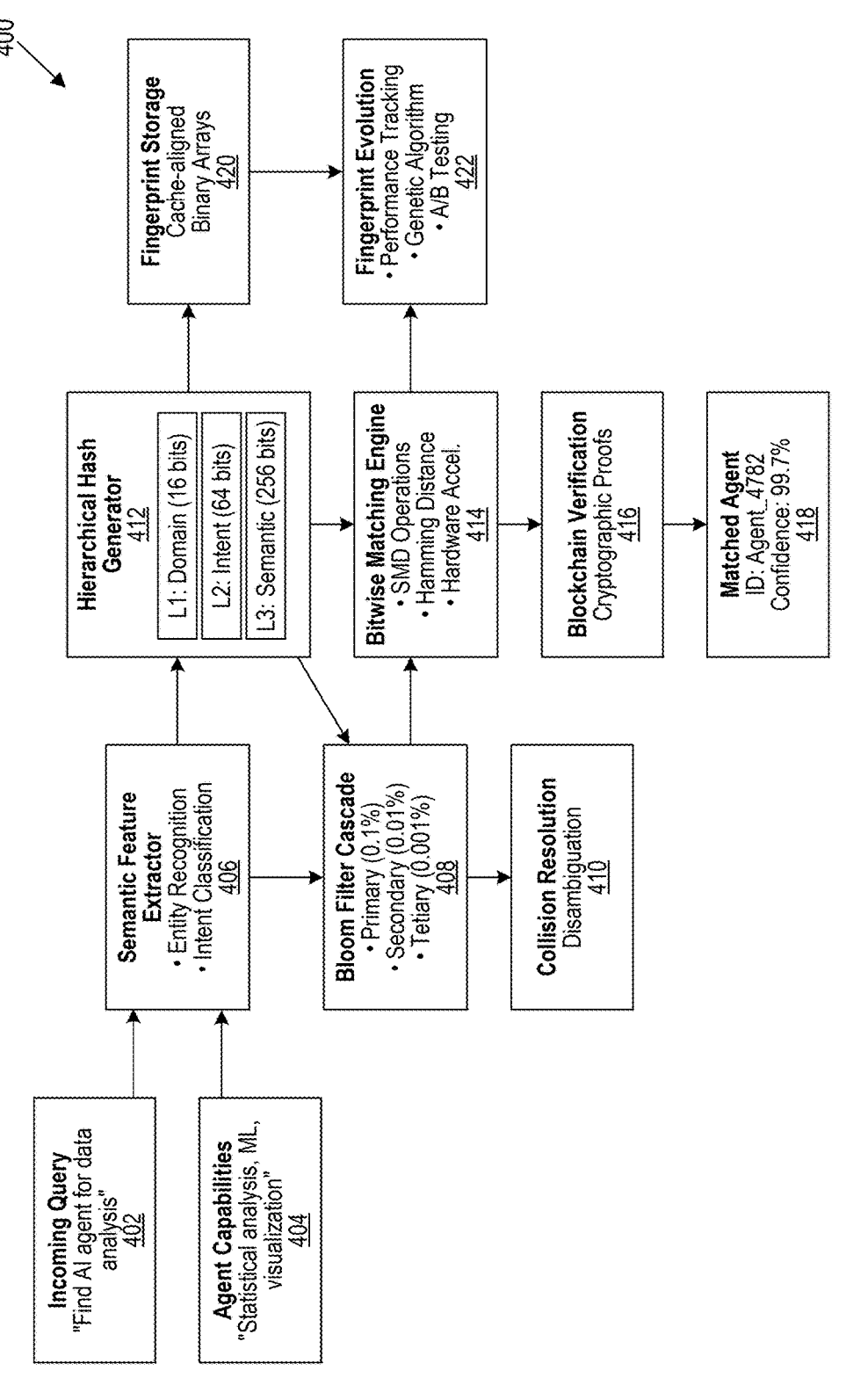
FIG. 4 shows a schematic illustrating an example architecture implementing a semantic fingerprinting framework for agent routing, in accordance with some implementations of the present technology.

FIG. 4 shows a schematic illustrating an example architecture 400 implementing a semantic fingerprinting framework for agent routing, in accordance with some implementations of the present technology. The architecture 400 is implemented using one or more computing systems, such as example device 200 and computing device 302 illustrated and described in more detail with respect to FIG. 2 and FIG. 3, respectively. Implementations of example architecture 400 can be carried out on multiple such devices (e.g., connected through a network) connected in various ways. The components included in the architecture 400 can be configured based on deployment requirements for a specific deployment and/or system implementing the architecture 400.

The architecture 400 can receive a query 402. The query 402 can be received by a user interface, which can be implemented on the client 102 of FIG. 1, and can be received through API endpoints (e.g., for message queues). The query 402 can be a natural language query (or input, request, command) requesting generation of an output using one or more AI agents. The architecture 400 can be connected to multiple downstream AI agents (e.g., via a network connection, API interface), such as the AI agents 110 in FIG. 1. Each AI agent can have a specific task or focus, such as managing inventory, making purchases, or providing customer service. The architecture 400 can be configured to route the query 402 to a set of one or more downstream AI agents that are chosen from multiple AI agents. The AI agents can be chosen such that the agents are capable of addressing the query (e.g., generating a response and/or performing an action according to a request of the query) and generating an output.

The architecture 400 can receive a description 404 of AI agent capabilities. For example, the description 404 of the capabilities of a particular AI agent can include a natural language description of specific computer-executable tasks the agent is configured to perform (e.g., a computer-executable operation set configured to be executed on a software application set), privileged data the agent can access, systems or databases that the agent has access to, the domain or focus of the agent, and the like.

The semantic feature extractor 406 processes input (such as the query 402 and/or an agent capability description 404) and extracts semantic features. Extracting semantic features can include implementing language processing techniques, such as tokenization, keyword identification, intent classification, or domain identification. This can include ontological techniques such as named entity recognition. Extracting semantic features can include determining (e.g., computing) metadata associated with the input, such as a complexity assessment (e.g., if the input has multiple domains, multiple intents, or multiple requested actions), or detecting one or more agent capabilities required to address a query input. Computing the semantic features can include using a language model, such as an LLM or small language model (SLM). The semantic features can be in the form of one or more feature vectors. The semantic features can be combined into a semantic feature set. In some implementations, generating the semantic feature set includes generating the semantic feature set from the input by applying a neural network-based embedding model (e.g., a language model) to tokens generated from the input.

The hierarchical hash generator 412 can perform a fingerprinting operation to generate a fingerprint for each input. The fingerprint can be a binary representation (e.g., a binary vector) that reflects characteristics of the input, such as a domain, intent, and/or semantic content. The fingerprint can be generated by using a plurality of hierarchical hash levels. As described in more detail with respect to FIG. 5, each hierarchical hash level can apply one or more hash functions to a dimension of the input semantic feature set. The dimensions can include semantic categories, such as intent, domain, intended tasks, query complexity, data privilege level and security, and the like. Outputs from higher levels of the hierarchical hash generator 412 can be longer and encode more detailed information that the output from lower levels. The hierarchical hash levels can implement locality-sensitive hash (LSH) functions so that semantically similar semantic feature sets will have similar hashes. Examples of LSH functions include MinHash (e.g., for determining set similarity), SimHash (e.g., for determining cosine similarity), and random hyperplane projection. In some implementations, feature-weighted hashing is implemented, in which certain members of the semantic feature set influence the final hash value more than other members.

The fingerprint storage 420 can store agent fingerprints. As described in more detail with respect to FIG. 10, the fingerprint storage 420 can implement memory optimizations, such as cache-aligned storage, to improve the efficiency of operations involving loading and comparing agent fingerprints.

A bloom filter cascade module 408 can implement a hierarchical bloom filter cascade to identify a set of agent fingerprints that are most similar to the query fingerprint. As described in more detail with respect to FIG. 6, the bloom filter cascade module 408 can be used to probabilistically determine equality (and/or inequality) between the query fingerprint and one or more agent fingerprints. The bloom filter cascade module 408 can implement one or more bloom filter levels. Each bloom filter level can use a plurality of hash functions to generate bitstrings from each fingerprint. If the bitstring corresponding to an agent fingerprint is identical to the bitstring corresponding to the query fingerprint, then the agent fingerprint passes the bloom filter level and is processed by a subsequent bloom filter level. The bloom filter levels can be arranged hierarchically, such that higher levels produce longer bitstring outputs and encode more detailed information than lower levels. The agent fingerprints that pass all bloom filter levels can be directly compared to the query fingerprint. For example, a Hamming distance can be computed between each agent fingerprint that passes all bloom filter levels. The architecture 400 can use the Hamming distances to determine a routing path for the query 402 (e.g., a list of one or more AI agents to process the query 402).

A collision resolution module 410 can resolve fingerprint collisions. A fingerprint collision describes the scenario when two distinct AI agents are assigned the same fingerprint by the semantic fingerprinting framework (e.g., by the hierarchical hash generator 412). Fingerprint collisions can decrease the efficiency of the semantic fingerprinting framework by causing false positives (e.g., agents that would be a poor match for a particular query 402, but have the same fingerprint as an agent that is a good match) to not be excluded from earlier levels of the bloom filter cascade, and can lead to the query 402 being processed by agents that are not equipped to address the query 402. As described in more detail with respect to FIG. 11, the collision resolution module 410 can resolve a fingerprint collision by using additional hash functions and/or additional agent data to determine an agent to include in the routing path for processing the query 402.

The fingerprint evolution module 422 can use feedback data (e.g., user feedback, agent success rates) to improve the fingerprinting operation. As described in more detail with respect to FIG. 8, the fingerprint evolution module 422 can modify parameters of the fingerprinting operation (e.g., parameters of the hierarchical hash generator 412) to generate new fingerprinting operations. The fingerprint evolution module 422 can receive and/or monitor metrics such as routing success rate, system performance (e.g., latency, system load), and/or fingerprint collision rate, to evaluate the advantages of different fingerprinting operations.

The blockchain manager 416 can integrate the architecture 400 with distributed ledger technology to generate audit trails for the processing of the query 402 through the architecture 400 and to implement audit verification using the blockchain. The blockchain manager 416 can generate a cryptographic attestation of the query 402, which can include a timestamp, hash functions and/or parameters, generated routing paths, and/or one or more characteristics of the query 402 (e.g., length, complexity, intent, domain). The blockchain manager 426 can format the attestations for storage in a distributed ledger and/or blockchain, and can manage on-chain transaction submissions.

Hierarchical Fingerprint Generation

Figure 5:
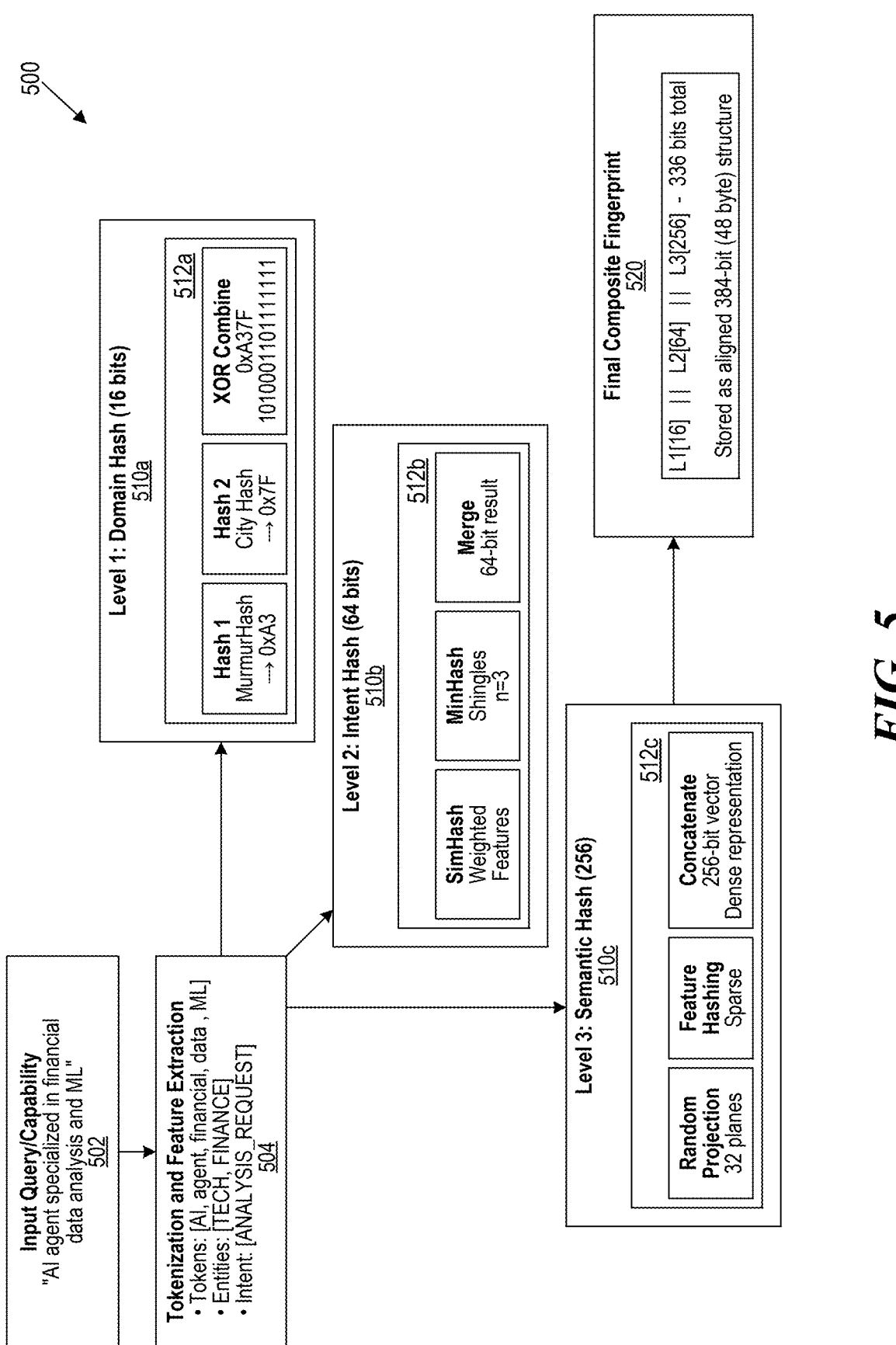
FIG. 5 shows a schematic illustrating an example architecture implementing a hierarchical fingerprint generation process for agent routing, in accordance with some implementations of the present technology.

FIG. 5 shows a schematic illustrating an example architecture 500 implementing a hierarchical fingerprint generation process for agent routing, in accordance with some implementations of the present technology. The architecture 500 is implemented using one or more computing systems, such as example device 200 and computing device 302 illustrated and described in more detail with respect to FIG. 2 and FIG. 3, respectively. Implementations of example architecture 500 can be carried out on multiple such devices (e.g., connected through a network) connected in various ways. The components included in the architecture 500 can be configured based on deployment requirements for a specific deployment and/or system implementing the architecture 500.

The architecture 500 receives an input 502. The input can be a query that is requesting output generated by a set of agents, or a description of the capabilities of an agent. The architecture 500 is configured to create a fingerprint for each input that is a fixed-length hash reflecting semantic content of the input. That is, inputs that are semantically similar (e.g., having the same domain, intent, described tasks) will have similar fingerprints. Similarity between fingerprints can be defined in terms of a Hamming distance (e.g., the number of bits that are different between the fingerprints when represented as a binary vector and/or bitstring). The architecture 500 is configured to apply the same fingerprinting operation to the query and agent capabilities, so that agent capabilities with similar semantic content to a particular query will have a fingerprint that is similar to the fingerprint of the particular query.

The preprocessing module 504 processes the input 502 to generate a representation of the input 502. The representation of the input 502 can include a set of semantic features, such as an intent, a domain, a task, and/or one or more feature vectors. Processing the input 502 can include generating intermediate representations of the input 502, such as a list of tokens and/or one or more feature vectors, and can include creating characterizations of the input, such as identifying an intent or domain, and/or extracting key words. The key words can correspond to entities in a domain-specific ontology. In some implementations, the preprocessing module 504 includes neural network-based encoder, such as an AI model, LLM, or SLM. In some implementations, the preprocessing module 504 creates a different representation of the input 502 for each level of the hierarchical fingerprint generation process.

The hierarchical fingerprint generation process includes a first level 510*a*, a second level 510*b*, and a third level 510*c*. The levels 510 can apply one or more hash functions to input data (e.g., a representation of the input 502, a semantic feature set generated form the input 502). The levels 510 are arranged hierarchically, with higher levels 510 generating a longer output hash than lower levels 510, and encoding more detailed, comprehensive, and/or abstract information and/or meaning than lower levels 510. In some implementations the hierarchical fingerprint generation process includes additional levels and/or alternate levels with a different focus and/or intent than the levels 510 described with respect to the architecture 500.

Each level 510 can include applying one or more locality-sensitive hash (LSH) functions. Examples include MurmurHash, CityHash, SimHash, MinHash, and random plane projection. Each LSH function can return a hash output of a specific number of bits, where the number of bits depends on the level 510 and/or the particular implementation.

In some implementations, a level 510 uses multiple LSH functions to create multiple partial hashes (e.g., an output set) that are merged into a final level hash 512. For example, the first level 510*a* can use a MurmurHash to generate an 8-bit first partial hash, use a CityHash to generate an 8-bit second partial hash, and merge the first and second partial hashes by concatenating the second partial hash to the end of the first partial hash to generate a 16-bit final hash. In another example, the second level 510*b* can use a SimHash to generate a 64-bit first partial hash, use a MinHash to generate a 64-bit second partial hash, and merge the first and second partial hashes by applying a bitwise XOR operation to the first and second partial hashes to generate a 64-bit final hash. In some implementations, a level 510 uses three hashes to make three partial hashes that are merged into a single hash. For example, a first partial hash can be used as a bitwise selector between a second and third partial hash to generate a final hash. Alternatively, or additionally, multiple hashes can be combined using a bitwise XOR operation. In some implementations, each level 510 has an independent number of partial hashes that are merged using any combination of the operations described above.

In some implementations, a level 510 processes input data (e.g., a semantic feature set) and generates an output set. For example, the level 510 can apply a hash function to a plurality of elements of a semantic feature set to generate an output set, or can apply a plurality of hash functions to one or more elements of the semantic feature set to generate the output set. The elements of the output set can be aggregated (e.g., merged, concatenated) to create the fingerprint (e.g., a binary vector representing the fingerprint).

The hierarchical fingerprint generation process includes a first level 510a. The first level 510 can include creating a first level hash 512a that encodes a domain of the input 502. For example, the hash can be a function of a semantic domain (e.g., medical, travel, finance) related to the input. The domain can be detected by keyword search (e.g., analyzing tokens) and/or vector similarity (e.g., with domains encoded as feature vectors). The first level hash 512a can have a relatively (e.g., as compared to other levels 510) small number of output bits (e.g., 16 bits). This can correspond to a coarse-grained hashing (e.g., where the first level hash 512a encodes a relatively small amount of information and/or cannot easily differentiate between a large number of domains).

The second level 510b can generate a second level hash 512b that encodes an intent of the input 502. If the input is a query, it can encode a query intent (e.g., information retrieval, purchase intent). If the input is an agent capability, it can encode a query intent that is addressable by the agent (e.g., encoding an agent's ability to perform purchases). The second level hash 512b can have a relatively moderate number of output bits (e.g., 64 bits).

The third level 510c can generate a third level hash 512c that encodes semantic meaning extracted from the input 502. The third level hash 512c can have a relatively large number of output bits (e.g., 256 bits).

The architecture 500 can include one or more additional levels. For example, the architecture 500 can include a fourth level that encodes detailed requirements for addressing the query. The fourth level can generate a fourth level hash with a larger number of output bits than previous levels. For example, the fourth level hash can include 1024 bits.

The architecture 500 produces a final composite fingerprint 520. The level hashes 512 can be merged to generate the final composite fingerprint 520. In some implementations, the final composite fingerprint 520 can be generated by concatenating the level hashes 512. For example, the final composite fingerprint can include 384 bits, where the first 16 bits include the first level hash 512a, the subsequent 64 bits include the second level hash 512b, and the final 64 bits include the third level hash 512c.

Bloom Filter Cascade

Figure 6:
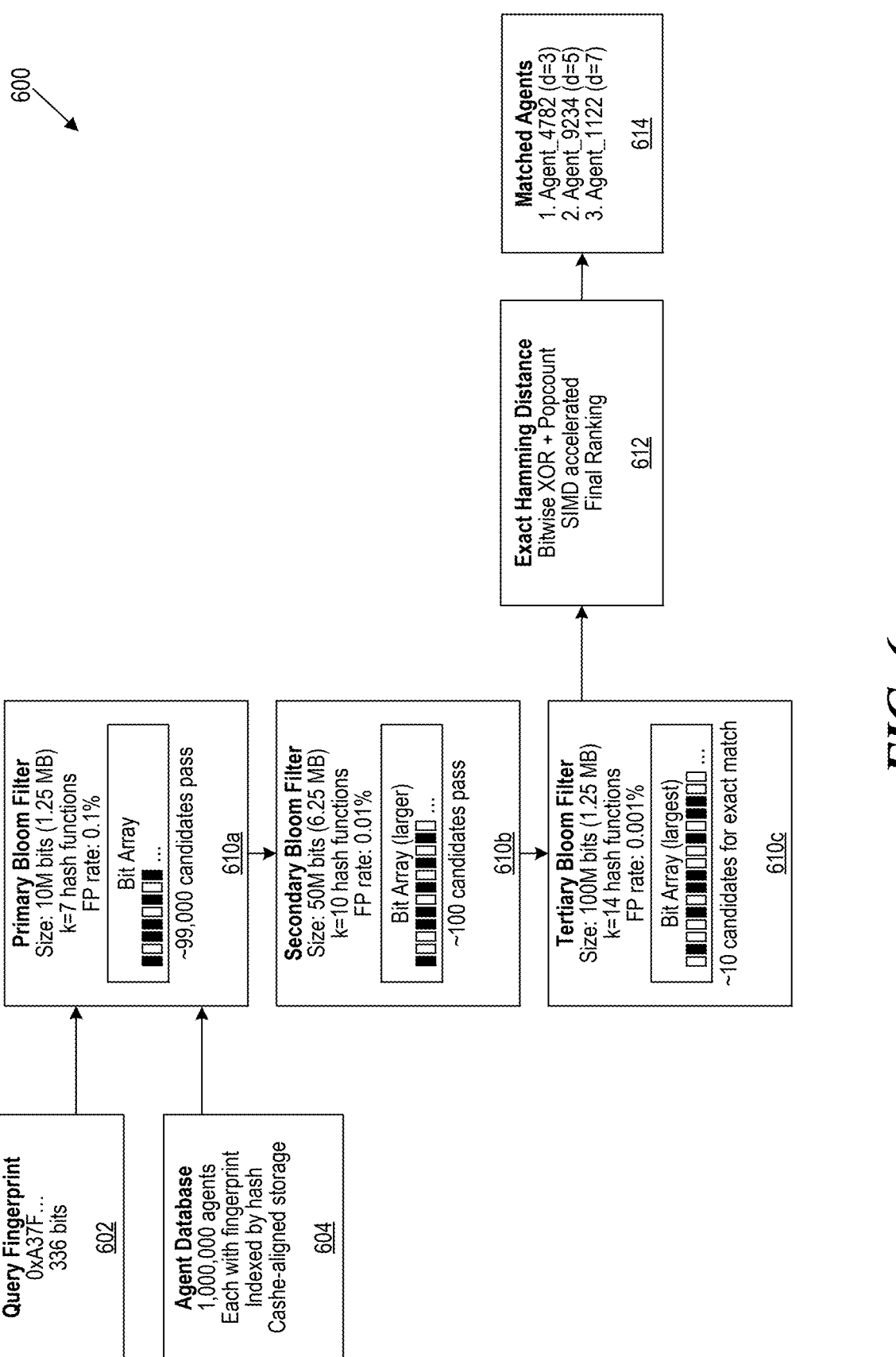
FIG. 6 shows a schematic illustrating an example architecture implementing a bloom filter cascade for semantically relevant agent matching, in accordance with some implementations of the present technology.

FIG. 6 shows a schematic illustrating an example architecture 600 implementing a bloom filter cascade for semantically relevant agent matching, in accordance with some implementations of the present technology. The architecture 600 is implemented using one or more computing systems, such as example device 200 and computing device 302 illustrated and described in more detail with respect to FIG. 2 and FIG. 3, respectively. Implementations of example architecture 600 can be carried out on multiple such devices (e.g., connected through a network) connected in various ways. The components included in the architecture 600 can be configured based on deployment requirements for a specific deployment and/or system implementing the architecture 600.

A bloom filter refers to a probabilistic membership data structure and procedure in which multiple hash values are used to determine inclusion of a test element in a set of elements. This is done by generating a bitstring, as described in more detail below, that encodes every unique hash value computed from every element in the set. The hash values of the test element are calculated and compared to the bitstring of the set. If the test element is a member of the set, then the calculated hash values will be consistent with the hash values recorded in the bitstring. Thus, if the hash values calculated for the test element are not consistent with the bitstring of the set, then the test element cannot be an element of the set.

A bloom filter can be implemented in two parts. First, a bitstring is generated for the set. A plurality of hash functions are identified that output hash values of a fixed length (e.g., 8 bits). Equivalently, the hash functions output hash values that are below a maximum hash value (e.g., 255). The output hash values for the set are interpreted as numbers within a particular range of values (e.g., between 0 and 255). The bitstring for the set is generated by setting the bitstring to have a value of 1 at all bit positions in the bitstring (e.g., as indexed from 0 to 255) that correspond to hash values of the set, and to have a value of 0 at all other bit positions. For example, the bitstring can be initialized as a bitstring of zeros, where the number of bits equals the total number of distinct possible hash values (e.g., a bitstring of 256 bits). Then, each element in the set can be hashed using the plurality of hash functions, each hash value can be interpreted as an index value, and the bit of the bitstring at that index value can be set to 1. Alternatively, a bitstring can be generated for each element individually, and the bitstring for the set can be generated by applying a bitwise AND operation applied to the element bitstrings.

Second, the plurality of hash functions are applied to the test element to determine membership in the set. Because hash functions are deterministic, if the test element is an element of the set, then all bits at positions corresponding to hash values of the test element will have a value of 1 (e.g., they were set to 1 as a result of applying the hash functions to the element of the set that is identical to the test element). The plurality of hash functions are applied to the test element, and each hash value is interpreted as a bit position index value, and the bits of the bitstring at these index value are read. If all of the corresponding bitstring values are 1, then the test element passes the bloom filter, and can be an element of the set. If an index value corresponds to a 0 in the bitstring, the test element cannot be an element of the set.

The bloom filter can only probabilistically determine membership, as it is possible for a test element to pass the bloom filter and not be an element of the set. This is because of the existence of hash collisions (e.g., two elements can generate the same set of hash values and thus the same bitstring), and because the bitstring of the set is a combination of multiple single-element bitstrings (e.g., the pattern of nonzero values can include the bitstring of a particular test element, even if none of the elements of the set correspond to the same bitstring). The advantage of the bloom filter is that this approach is faster than a direct comparison of the test element to every element in the set. This is in part because the test element (e.g., the corresponding bitstring) is compared to a single object (e.g., the bitstring of the set) that represents a combined information from all set elements, rather than comparing the test element to each element individually. Additionally, a bitstring can be a much smaller representation of an element, and thus comparisons between bitstrings can be faster than comparisons between the elements themselves.

The bloom filter approach can also be used to probabilistically determine equality between two objects. A bitstring can be generated for a target element (e.g., a bitstring for a set containing a single element), and the bitstring of a test element can be compared to it (e.g., testing for inclusion in a set containing a single element). This can thus be used to probabilistically determine if two elements satisfy a similarity threshold (e.g., equality between the two elements). In some implementations, LSH functions are used to generate bitstrings, such that two similar fingerprints will produce two similar bitstrings (e.g., with only a few bits having different values).

The bloom filter cascade can use multiple bloom filter levels 610 to probabilistically match a query fingerprint 602 with one or more agent fingerprints stored in an agent bitstring database 604. Each bloom filter level 610 uses a plurality of hash functions to encode each agent fingerprint into a bitstring of a fixed length. Each bitstring can be calculated once and stored in an agent bitstring database 604. The agent bitstring database can be configured for quick access and retrieval of agent bitstrings (e.g., "cache-friendly" storing, as described in more detail with respect to FIG. 10). The query fingerprint 602 is encoded into a query bitstring using the plurality of hash functions, and the query bitstring is compared to the bitstrings of the agents. The agent bitstrings that pass the bloom filter level 610 continue to subsequent bloom filter levels 610. The bitstrings associated with subsequent bloom filter levels 610 can be longer, encode more information, and/or encode more complex information than the bitstrings of lower bloom filter levels 610. This allows the subsequent bloom filter levels 610 to make a more accurate comparison of the agent fingerprints with the query fingerprint 602, at the cost of requiring more computational resources per comparison. However, fewer agents will pass the previous bloom filter level 610. In some implementations, agent fingerprints are grouped into predetermined sets of agent fingerprints. The bloom filter levels 610 can then determine membership of the query fingerprint 602 in each of the predetermined sets of agent fingerprints (and/or determine if the query fingerprint 602 and the fingerprints in the set satisfy a similarity threshold). This can decrease the computational resources needed to perform each bloom filter level 610, at the cost of a higher false positive rate (e.g., higher number of agent fingerprints that pass all bloom filter levels 610 and do not match the query fingerprint 602).

A primary bloom filter level 610a can be configured to compare bitstrings of a relatively small length (e.g., smaller than other bloom filter levels 610) generated using a relatively small number of hash functions (e.g., smaller than other bloom filter levels 610). The primary bloom filter level 610a can compare a bitstring of the query fingerprint 602 to bitstrings from a relatively large number of agents (e.g., larger than other bloom filter levels 610). In some implementations, the primary bloom filter level 610a generates a bitstring from a portion of a fingerprint (e.g., a portion corresponding to the output of one or more levels 610 of the hierarchical fingerprint generation process). In some implementations, the primary bloom filter level 610a is configured to generate bitstrings by applying seven hash functions to each fingerprint. In some implementations, the primary bloom filter level 610a is configured to have a guaranteed false positive rate not exceeding 0.1%.

A secondary bloom filter level 610b can be configured to compare bitstrings of a relatively moderate length generated using a relatively moderate number of hash functions. The secondary bloom filter level 610b can compare a bitstring of the query fingerprint 602 to bitstrings from a relatively moderate number of agents. In some implementations, the secondary bloom filter level 610b generates a bitstring from a portion of a fingerprint. In some implementations, the secondary bloom filter level 610b is configured to generate bitstrings by applying ten hash functions to each fingerprint. In some implementations, the secondary bloom filter level 610b is configured to have a guaranteed false positive rate not exceeding 0.01%.

A tertiary bloom filter level 610c can be configured to compare bitstrings of a relatively long length generated using a relatively large number of hash functions. The tertiary bloom filter level 610c can compare a bitstring of the query fingerprint 602 to bitstrings from a relatively small number of agents. In some implementations, the tertiary bloom filter level 610c generates a bitstring from a portion of a fingerprint. In some implementations, the tertiary bloom filter level 610c is configured to generate bitstrings by applying fourteen hash functions to each fingerprint. In some implementations, the tertiary bloom filter level 610c is configured to have a guaranteed false positive rate not exceeding 0.001%.

The architecture 600 can implement additional bloom filter levels 610 and/or alternative bloom filter levels 610. For example, the architecture 600 can implement a fourth bloom filter level that generates longer bitstrings than previous bloom filter levels 610.

The architecture 600 implements a bitwise matching module 612 to quantify a difference between the bitstring representation of the query fingerprint 602 and the bitstrings that pass all bloom filter levels 610 (e.g., that satisfy a similarity threshold with the query fingerprint 602). For example, the bitwise matching module 612 can calculate a Hamming distance between the bitstring of the query fingerprint 602 and a bitstring of an agent fingerprint. The Hamming distance between two bitstrings of equal length is equal to the number of bits in which the two bitstrings have different values. As described in more detail with respect to FIG. 7, the bitwise matching module 612 can include algorithms that parallelize bitwise computations to determine a Hamming distance between two bitstrings.

In some implementations, the architecture 600 implements a bitwise matching module 612 as part of one or more bloom filter levels 610. For example, if a particular bloom filter level 610 uses a portion of the agent fingerprints (e.g., corresponding to a hierarchical level hash as described in FIG. 5), then the architecture can identify a set of agent bitstrings that pass the particular bloom filter level 610, and can implement a Hamming distance between the each of the agent fingerprint portions and the corresponding query fingerprint portion. Agents with corresponding fingerprint portions that satisfy additional/alternate similarity thresholds with the query fingerprint portion (e.g., fingerprint portions that are within a certain Hamming distance of the query fingerprint portion, such as a Hamming distance of zero) can then proceed to the subsequent bloom filter level 610.

The architecture 600 can determine a routing path 614 of matched agents for the query. For example, the architecture 600 can rank agent fingerprints based on the Hamming distance of each fingerprint with respect to the query fingerprint 602. The routing path 614 can include agents with fingerprints associated with the smallest Hamming distances (e.g., out of all agent fingerprints that passed all bloom filter levels 610). In some implementations, the routing path 614 can include all agents associated with fingerprints associated with Hamming distances at or below a certain threshold (e.g., that satisfy a similarity threshold). The threshold can be predetermined or dynamic. For example, the threshold can depend on available computational resources, characteristics of the agents (e.g., an amount of computational resources associated with executing a particular agent), and/or can be chosen such that a predefined number of agents are included in the routing path (e.g., the top three). The query can then be routed to the agents on the routing path 614.

Bitwise Matching Algorithms

FIG. 7 shows a schematic illustrating an example architecture 700 implementing a bitwise matching procedure, in accordance with some implementations of the present technology. The architecture 700 is implemented using one or more computing systems, such as example device 200 and computing device 302 illustrated and described in more detail with respect to FIG. 2 and FIG. 3, respectively. Implementations of example architecture 700 can be carried out on multiple such devices (e.g., connected through a network) connected in various ways. The components included in the architecture 700 can be configured based on deployment requirements for a specific deployment and/or system implementing the architecture 700.

The architecture 700 receives a query fingerprint 702 and a set of one or more candidate agent fingerprints 704 (e.g., one or more agent fingerprints that have passed the bloom filter levels 610). The architecture 700 is configured to determine the number of bits in which an agent fingerprint 704 differs from the query fingerprint 702. For example, the architecture 700 can apply a bitwise XOR operation to the agent fingerprint 704 and the query fingerprint 702 to get a difference bitstring. The difference bitstring will have a value of 1 at a particular bit position if and only if the agent fingerprint 704 and the query fingerprint 702 had different values at that bit position. Therefore, the total number of nonzero bits in the difference bitstring is equal to the number of bitwise differences between the agent fingerprint 704 and the query fingerprint 702, and thus equal to the Hamming distance between the agent fingerprint 704 and the query fingerprint 702.

The architecture 700 can implement Single-Instruction Multiple-Data (SIMD) parallel processing operations 710. A SIMD operation describes a single operation that is applied simultaneously (e.g., in parallel) to multiple data elements organized as a vector. Such SIMD operations can be implemented on data processors, such as CPUs and GPUs. The SIMD operations can be part of an instruction set, such as the AVX-512 instruction set. As described in more detail below, the SIMD operations 710 allow parallel bitwise comparison of the agent fingerprints 704 with the query fingerprint 702.

The SIMD operations 710 can include a SIMD load operation 712. The SIMD load operation 712 can include loading data, such as the query fingerprint 702 and/or an agent fingerprint 704, into one or more registers (e.g., CPU registers). The size (e.g., bit length) of the loaded data can depend on factors such as processor architecture. In some implementations, a portion of the query fingerprint 702 and/or agent fingerprint 704 is loaded (e.g., if the fingerprints are larger than the size of each register).

The SIMD operations 710 can include a SIMD bitwise XOR operation 714. The SIMD bitwise XOR operation 714 can apply a bitwise XOR operation to two loaded bitstrings to produce a difference bitstring. The difference bitstring will have a 0 at every bit position where the two input bitstrings have the same value, and a 1 at every bit position where the input bitstrings have different values.

The SIMD operations 710 can including population count (e.g., a "popcount") in which the number of nonzero bits in the difference bitstring is counted. In some implementations, performing a population count includes performing population counts on substrings of the difference bitstring and adding the population counts. For example, the SIMD operations 710 can represent a difference bitstring as a series of substrings (e.g., represent a 512-bit length bitstring as 8 64-bit bitstrings), and returns a bitstring in which each substring represents an integer that is equal to the population count of the corresponding substring. For example, the substring 01100101, with 4 nonzero entries, becomes the substring 00000100, the binary representation of the integer 4. A horizontal sum operation 718 can add the integer values represented by each substring to calculate the total population count of the difference bitstring.

The SIMD operations 710 can be repeatedly applied to fingerprints until a Hamming distance is computed for each agent fingerprint 704 with respect to the query fingerprint 702. The Hamming distances can then be used as a basis of making a routing decision for the query and determining a routing path of agents to process the query (e.g., as described with respect to FIG. 6).

Fingerprint Evolution System

Figure 8:
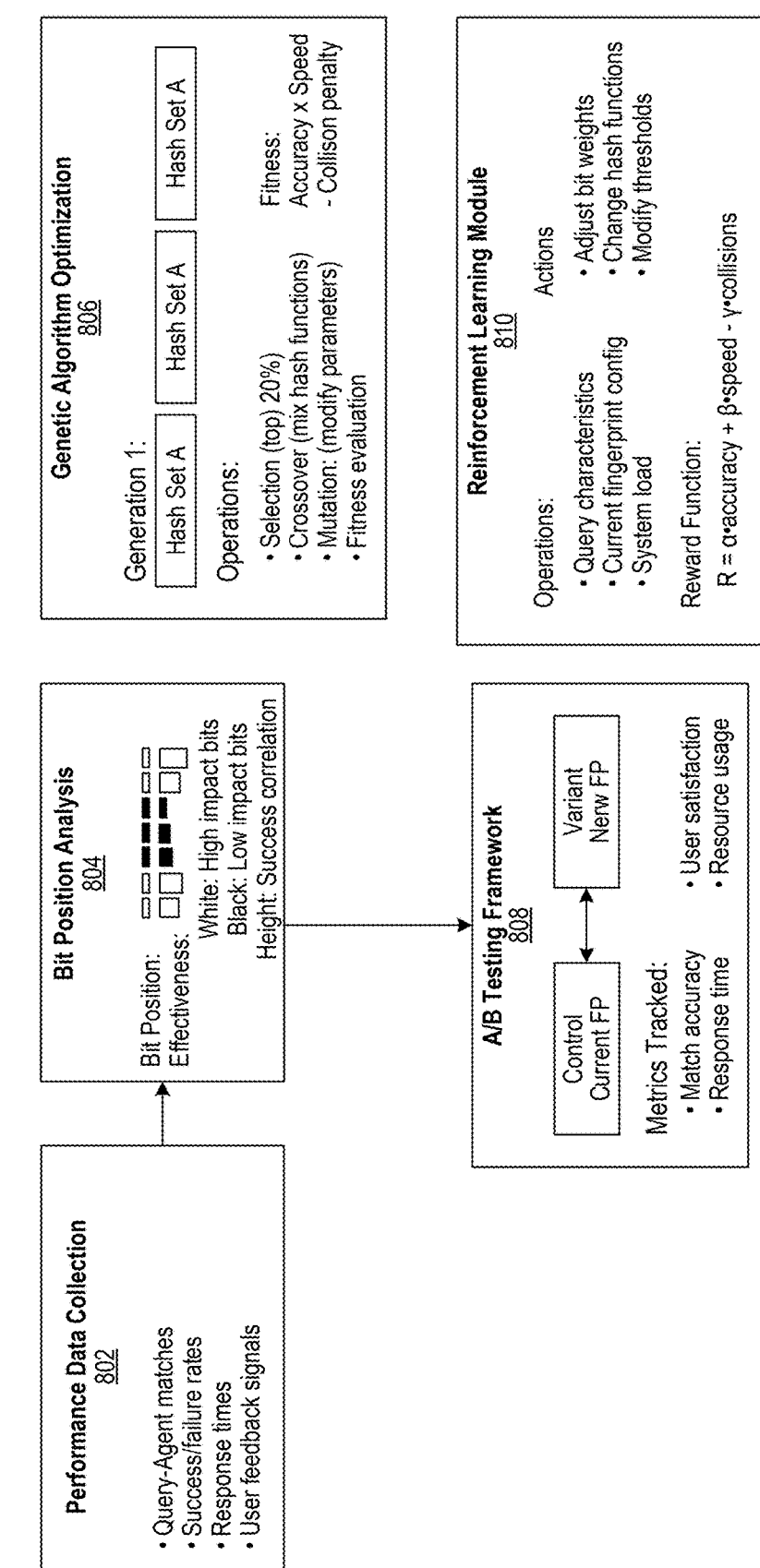
FIG. 8 shows a schematic illustrating an example architecture implementing a fingerprint evolution process, in accordance with some implementations of the present technology.

FIG. 8 shows a schematic illustrating an example architecture 800 implementing a fingerprint evolution process, in accordance with some implementations of the present technology. The architecture 800 is implemented using one or more computing systems, such as example device 200 and computing device 302 illustrated and described in more detail with respect to FIG. 2 and FIG. 3, respectively. Implementations of example architecture 800 can be carried out on multiple such devices (e.g., connected through a network) connected in various ways. The components included in the architecture 800 can be configured based on deployment requirements for a specific deployment and/or system implementing the architecture 800.

The fingerprint evolution process of architecture 800 is configured to dynamically improve the calculations implemented to generate a fingerprint from an input (e.g., a query and/or an agent capability description). As described in more detail with respect to FIG. 5, a fingerprinting operation (e.g., a set of calculations to generate a fingerprint from an input, as described in further detail with reference to FIG. 4) can involve multiple hash functions that generate one or more partial hash values (e.g., an output set) that determine the final fingerprint. Parameters characterizing this process can be dynamically modified, such as: a number of hierarchical levels 510 of the hierarchical fingerprint generation process, the number of partial hashes computed in each level 510, the hash algorithms used to generate a partial hash, a seed value used in generating a partial hash, operations for combining multiple partial hashes into a single level hash 512, the lengths of the level hashes 512, the information encoded by each level 510 (e.g., query intent, semantic meaning), how preprocessed input data (e.g., tokens, extracted feature vectors, semantic feature sets) are processed, and the like. Different values of such parameters influence what qualities are captured by each fingerprint and the relative weights of those qualities when generating a fingerprint.

The architecture 800 receives performance data 802 including performance metrics recorded from routing decisions. The performance data can include one or more performance metrics, such as: success rate (e.g., how often an agent chosen to address a query was capable of addressing the query), which can be determined by feedback from users, AI agents, and/or downstream systems; and/or response times (e.g., total latency between submitting a query and receiving a response from all agents the query was routed to).

The architecture 800 can perform a bit position analysis 804. The bit position analysis 804 can analyze correlations between particular performance metrics and the values of particular bits. For example, the bit position analysis 804 can determine that the value of a particular bit strongly influences the resulting routing path of the query, and/or that the value of the particular bit strongly influences the measured success rate. The results of the bit position analysis 804 can be used as an objective function for modifying parameters used in the fingerprinting process. For example, the fingerprinting parameters can be modified with the goal of making the bit impact and/or success correlation uniform across all bit positions.

The architecture 800 can implement genetic algorithm optimization 806. The genetic algorithm optimization 806 can use fingerprinting parameters, such as parametric hash functions (e.g., hash functions with changeable parameters, such as a seed value, output length, or salt value), as individuals in a population. Genetic operations can be implemented to diversify and optimize the individuals. The genetic operations can include: fitness evaluation (e.g., determining a fitness metric of a fingerprinting operation by using an objective function), selection (e.g., in which a certain amount of the highest-performing fingerprinting operations, as determined by the fitness evaluation, continue to the next generation), crossover, mutation (e.g., modifying parameters), and the like. The objective function for fitness evaluation can include results from the bit position analysis 804 (e.g., the average bit-to-success correlation across all bits produced by a fingerprinting operation), performance metrics (e.g., latency, accuracy), and/or a combination thereof (e.g., the product of accuracy and speed, minus a collision penalty that measures how often distinct inputs generate the same fingerprint value). The objective function can also be influenced by agent reputations. For example, an agent reputation can be calculated using performance metrics such as latency, accuracy, or success rate of an agent, and fingerprinting operations can be rewarded for routing queries to agents with higher reputations. The fitness of fingerprinting operations can be determined in a testing environment (e.g., by generating fingerprints from predetermined data) or in a production environment (e.g., by implementing A/B testing).

The architecture 800 can implement A/B testing framework 808 to compare the effectiveness of two or more fingerprinting operations. For example, the A/B testing framework 808 can determine that a portion of received inputs (e.g., queries and/or agent capability descriptions) will be processed using a test fingerprinting operation rather than a currently implemented fingerprinting operation. Implementing the test fingerprinting operation can involve using the agent capability descriptions to create an additional agent fingerprint database and/or agent bitstring database using the test fingerprinting operation. The A/B testing framework can continuously measure performance metrics related to each fingerprinting operation, such as routing accuracy, response time, user feedback (e.g., satisfaction), and/or system resource usage.

The architecture 800 can also implement a reinforcement learning module 810 to improve the parameters of fingerprinting operations. In some implementations, the state space of the reinforcement learning module 810 includes query characteristics (e.g., length, query intent, tokens, keywords, feature vectors), current fingerprinting operation parameters, and/or system performance metrics (e.g., latency, load). The reinforcement learning module 810 can then take actions such as adjusting bit weights for generated fingerprints, changing hash functions (e.g., changing hash algorithms and/or changing parameters of a parametric hash function), and/or modifying thresholds (e.g., a minimum Hamming distance for an agent to be included in a routing path). The reinforcement learning module 810 can then evaluate the reward of taking the action by applying a reward function to future performance metrics. For example, the reward function can favor accuracy and speed and disfavor fingerprint collisions.

Although the operations described with respect to FIG. 8 involved testing and updating fingerprinting operations, it can be appreciated by one of skill in the art that similar operations can be performed to test and update additional components of the agent routing process, such as the bloom filter cascade described with respect to FIG. 7 (e.g., to modify the process of creating a bitstring from a fingerprint).

Blockchain Integration

Figure 9:
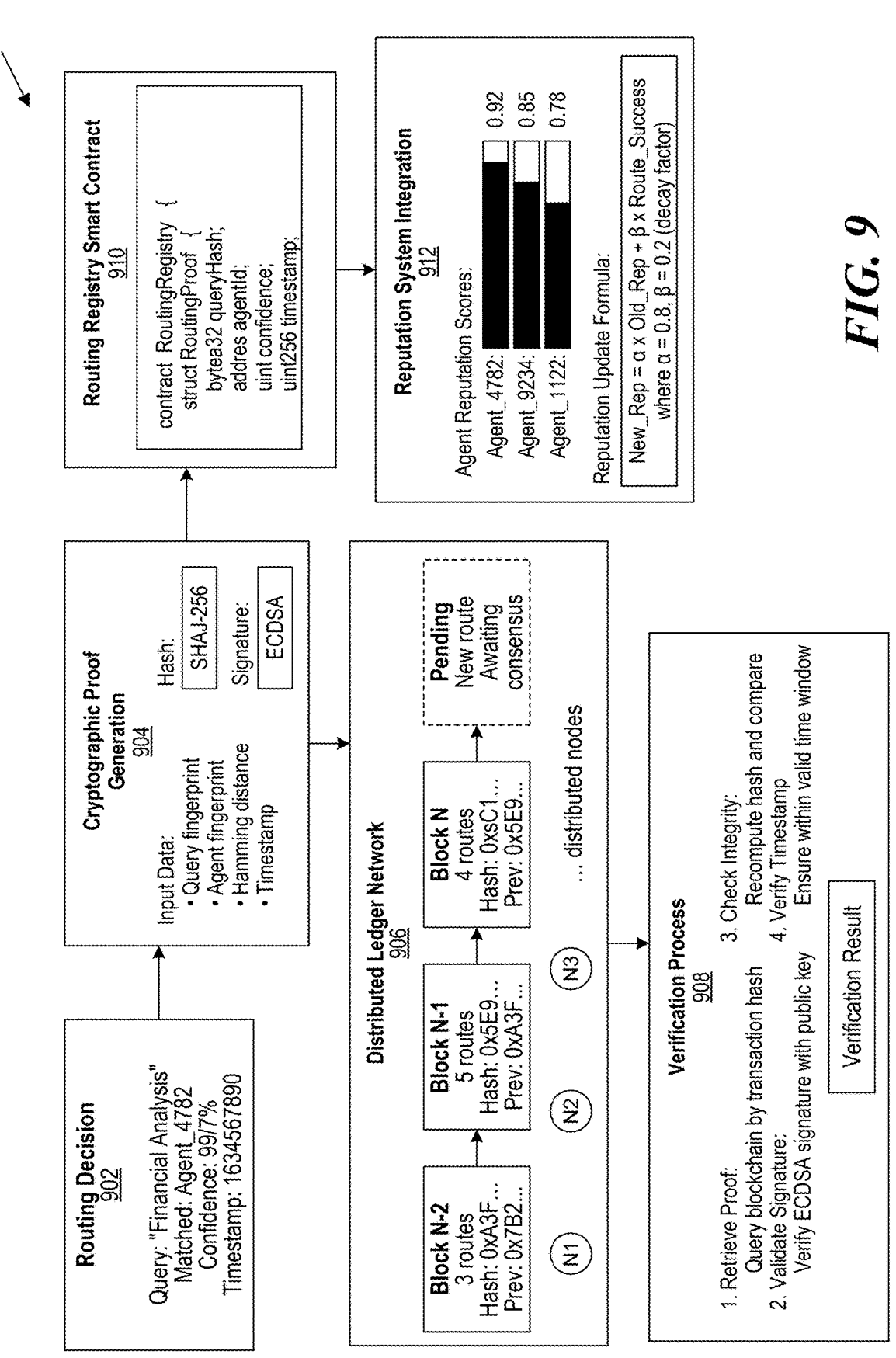
FIG. 9 shows a schematic illustrating an example architecture for using blockchain proofs for agent routing, in accordance with some implementations of the present technology.

FIG. 9 shows a schematic illustrating an example architecture 900 for using blockchain proofs for agent routing, in accordance with some implementations of the present technology. The architecture 900 is implemented using one or more computing systems, such as example device 200 and computing device 302 illustrated and described in more detail with respect to FIG. 2 and FIG. 3, respectively. Implementations of example architecture 900 can be carried out on multiple such devices (e.g., connected through a network) connected in various ways. The components included in the architecture 900 can be configured based on deployment requirements for a specific deployment and/or system implementing the architecture 900.

A semantic fingerprinting framework is configured to receive a query, generate a query fingerprint, and compare the query fingerprint to a plurality of agent fingerprints to determine a routing path 902. The query can be received from a user interface, which can be implemented on the client 102 of FIG. 1. The query can be a natural language query requesting generation of an output using one or more AI agents, such as the AI agents 110 in FIG. 1. The routing path 902 can have associated metadata, such as the query text, a confidence score, identifications of one or more fingerprinting parameters (e.g., number and type of hash functions used to generate the query fingerprint and/or to generate bitstrings for a bloom filter cascade), and/or a timestamp (e.g., when the query was received and/or when the routing path 902 was generated).

The architecture 900 includes a proof generation module 904. The proof generation module 904 can create a cryptographic attestation of the routing path and details related to its generation in order to provide cryptographic proofs of the routing path generation process for a certain query. The cryptographic attestation can be in a structured data format, such as a JSON format structure. The cryptographic attestation can include a digital signature of attestation data, which can be digitally signed using a private system key (e.g., an elliptic curve digital signature algorithm (ECDSA) key). The attestation data can include the query, one or more query representations (e.g., tokens, feature vectors, semantic feature sets), a query fingerprint (e.g., as generated by the semantic fingerprinting framework), agent fingerprints of the one or more agents included in the routing path 902 (e.g., as generated by the semantic fingerprinting framework), one or more bitstrings generated from the query fingerprint and/or the agent fingerprints, one or more Hamming distances between agent fingerprints and the query fingerprint, and the like. In some implementations, the proof data includes a cryptographic query fingerprint generated by performing a cryptographic hash (e.g., SHA256) on the query input and/or query representations. In some implementations, the attestation data can include contextual data, such as system load, latency, and/or a timestamp for when the query was received and/or when a routing path 902 was generated.

The architecture 900 can additionally track agent reputations, which can be stored on the blockchain. This can allow cryptographic verification of the measured effectiveness of the agents used to address a particular query. In some implementations, the architecture 900 maintains performance data associated with one or more agents, such as accuracy (e.g., average accuracy, cumulative accuracy), latency performance metrics (e.g. average latency), resource utilization statistics, reliability indicators, and/or total number of processed queries. The architecture 900 can periodically (e.g., at regular intervals and/or in response to a change in a model reputation) add a record of agent reputations to a blockchain.

The architecture 900 includes a blockchain manager 906. The blockchain manager 906 can receive the cryptographic attestation and/or agent reputation data and add the data to a blockchain. The blockchain can be a preexisting distributed ledger (e.g., Ethereum) and/or a locally hosted and/or controlled blockchain network. The blockchain can implement a Merkle tree structure and implement batching of data to improve efficiency. For example, multiple digital signatures corresponding to multiple attestation data of multiple queries can be generated in parallel and/or simultaneously. The blockchain manager 906 can implement configurable confirmation requirements for the blockchain to configure a delay before a transaction becomes immutable (e.g., measured as a number of blocks subsequently added to the blockchain). The blockchain manager 906 can arrange for cross-chain compatibility with different blockchain networks. The blockchain manager 906 can implement archival strategies for long-term storage of cryptographic proofs and blockchain data.

The blockchain manager 906 can include an audit trail verification program. In some implementations, the audit trail verification program is a smart contract stored on the blockchain. A smart contract can be computer-executable code stored on a blockchain that can be configured to automatically execute in response to certain conditions being satisfied. The audit trail verification program can implement storage management for proof data. The audit trail verification program can perform proof verification for a particular query. For example, a previously processed query can be identified (e.g., by a user) and the audit trail verification program can verify the contents and details of the agent routing process. In some implementations, verifying an agent routing process includes retrieving attestation data by querying the blockchain via a transaction hash, validating a signature via a public key, checking the integrity of the transaction by recomputing the cryptographic hash and comparing the hash to the blockchain, and/or verifying the timestamp to ensure that the transaction is within a valid time window.

The architecture 900 can implement a routing path registry smart contract 910.

The architecture 900 can be integrated into an agent reputation system 912. The agent reputation system can dynamically track and/or update reputation scores associated with each agent. The agent reputation score can be based on values of performance metrics, such as latency, reliability, and/or success rate. In some implementations, the reputation system 912 uses a blockchain to determine agent reputations. For example, the reputation system 912 can retrieve and/or verify agent success rates based on information stored in the blockchain (e.g., routing paths and/or feedback associated with a plurality of queries).

Hardware Acceleration Features

Figure 10:
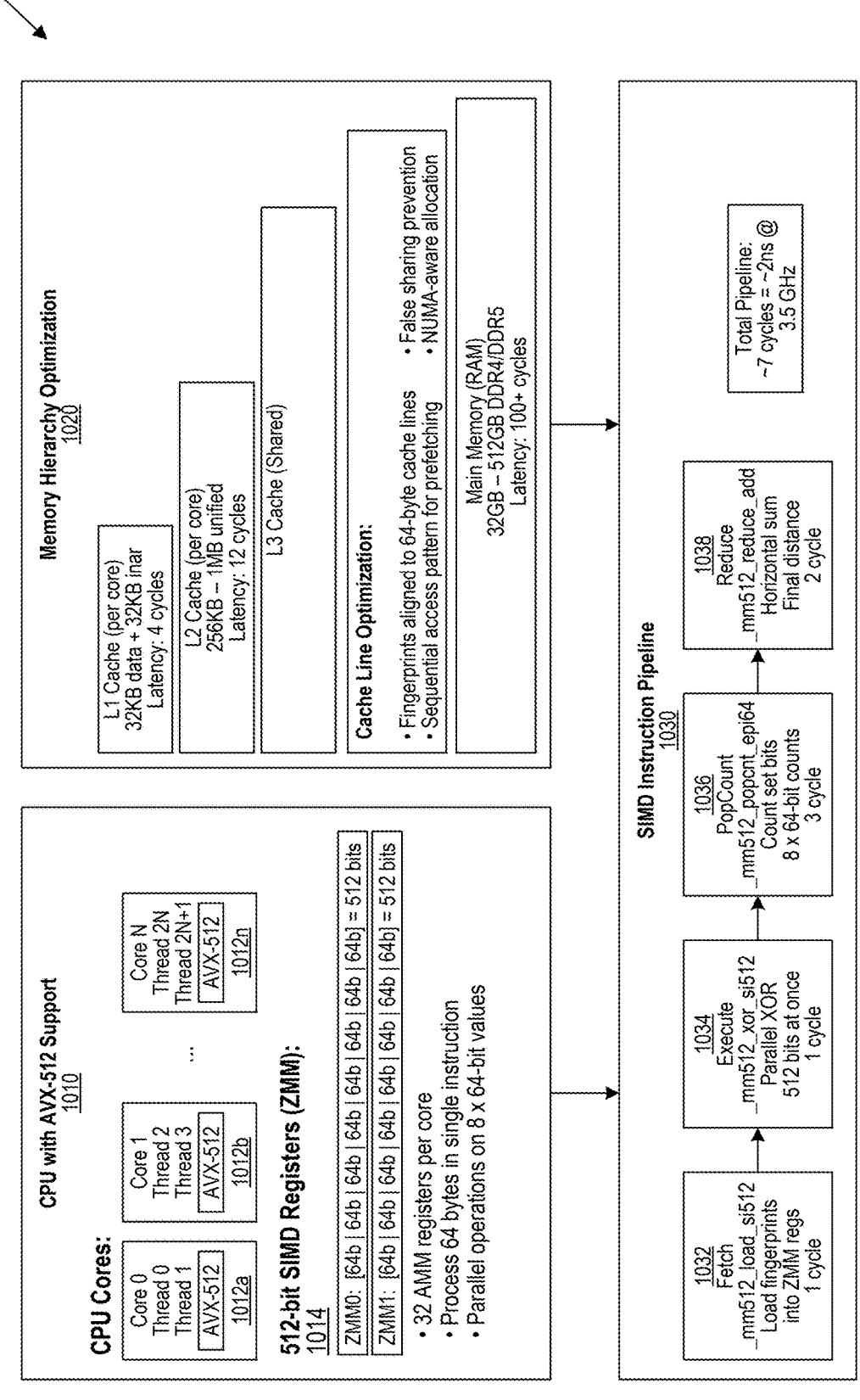
FIG. 10 shows a schematic illustrating an example architecture implementing hardware acceleration techniques for semantic fingerprinting and bitwise matching for agent routing, in accordance with some implementations of the present technology.

FIG. 10 shows a schematic illustrating an example architecture 1000 implementing hardware acceleration techniques for semantic fingerprinting and bitwise matching for agent routing, in accordance with some implementations of the present technology. The architecture 1000 is implemented using one or more computing systems, such as example device 200 and computing device 302 illustrated and described in more detail with respect to FIG. 2 and FIG. 3, respectively. Implementations of example architecture 1000 can be carried out on multiple such devices (e.g., connected through a network) connected in various ways. The components included in the architecture 1000 can be configured based on deployment requirements for a specific deployment and/or system implementing the architecture 1000.

The architecture 1000 can implement a CPU 1010 with SIMD support (e.g., a CPU supporting an AVX-512 instruction set for x86 instruction set architecture (ISA)). The CPU 1010 can have multiple cores 1012a through 1012n, and each core can implement independent SIMD support. The CPU 1010 can have dedicated SIMD registers 1014 of a fixed length (e.g., 512 bits). The length of the SIMD registers 1014 can correspond to a cache length for an attached memory device (e.g., the length of the smallest amount of data transferrable between the memory device and the CPU 1010). The architecture 1000 can also implement branch prediction in the CPU 1010 to optimize frequently-used software paths using the CPU 1010.

The architecture 1000 can implement memory optimization techniques 1020. The memory optimization techniques 1020 can include optimizing the locations of data in memory. For example, fingerprints associated with queries and/or agents can be cache-aligned. That is, if the CPU 1010 reads data from memory in fixed-length caches (e.g., an entire cache of memory is retrieved by the CPU 1010 in a single operation), the fingerprint values can be aligned such that a single fingerprint is stored inside a minimum number of caches (e.g., a fingerprint does not cross cache boundaries), so that the CPU 1010 does not need to load multiple caches containing fragmentary or partial information. In some implementations, the cache size is 64 bytes (512 bits).

In some implementations, the memory optimization techniques 1020 include storing fingerprints in sequence (e.g., sequentially in memory). If the CPU 1010 is configured to prefetch data (e.g., to retrieve data from memory that is located near a target memory), storing the fingerprints in sequence increases the likelihood that the fingerprint will be prefetched by the CPU 1010 during operation, leading to decreased latency. In some implementations, the memory optimization techniques 1020 include false sharing prevention. That is, the memory optimization techniques 1020 can include techniques (e.g., cache alignment) to prevent independent parallel operations from operating on data (e.g., fingerprints) in a shared cache. In some implementations, the memory optimization techniques 1020 include implementation of lock-free updates with respect to the fingerprints. For example, lock-free updates can allow fingerprints stored in memory to be updated (e.g., as a result of fingerprint evolution described with respect to FIG. 8) while allowing fingerprints to be utilized by the CPU 1010. In some implementations, the memory optimization techniques 1020 include allocating memory to optimize data for a non-uniform memory access (NUMA) computing architecture.

The architecture 1000 can implement a SIMD instruction pipeline 1030, which can include the SIMD operations 710 of FIG. 7. For example, the SIMD instruction pipeline 1030 can include: a load or fetch operation 1032 in which fingerprint data is retrieved from memory and loaded into one or more registers of the CPU 1010; an execute operation 1034 in which a bitwise XOR operation is applied to two fingerprints to compute a difference bitstring; a popcount operation 1036 in which a population count is performed on substrings of the difference bitstring, with the resulting population counts stored as integer values in the substrings; and a reduce operation 1038 that can sum the population counts stored in the substrings to produce a final population count of the difference bitstring, resulting in a Hamming distance between the two fingerprints.

The architecture 1000 can implement further optimization techniques in addition to, or alternatively to, those listed above. For example, the architecture 1000 can implement loop unrolling to reduce computational overhead, and/or hints to supply the CPU 1010 with additional data for branch prediction. The architecture 1000 can implement out-of-order execution, hardware prefetchers, and/or multiple dispatch units.

Collision Resolution

Figure 11:
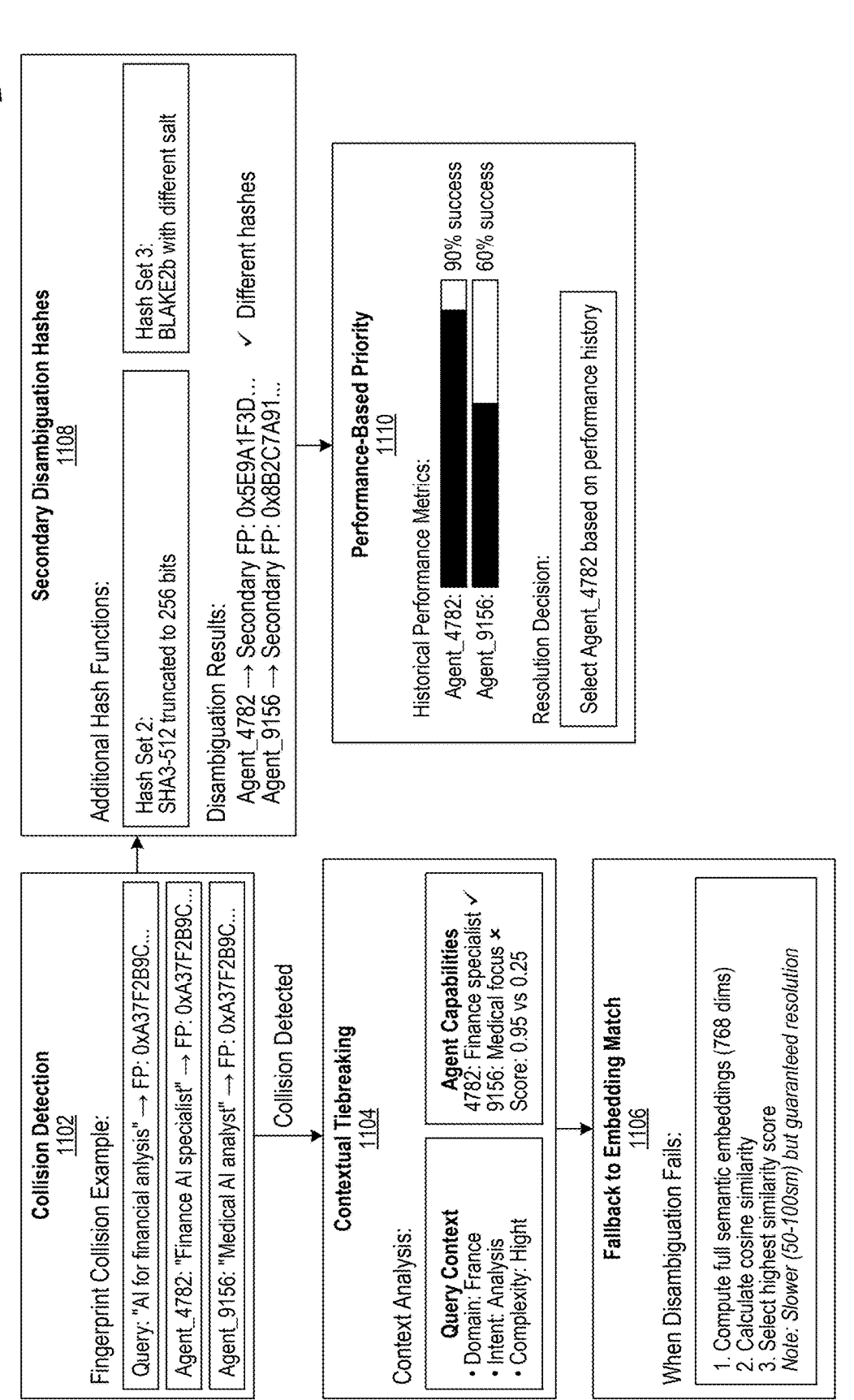
FIG. 11 shows a schematic illustrating an example architecture implementing a collision resolution framework for agent routing, in accordance with some implementations of the present technology.

FIG. 11 shows a schematic illustrating an example architecture 1100 implementing a collision resolution framework for agent routing, in accordance with some implementations of the present technology. The architecture 1100 is implemented using one or more computing systems, such as example device 200 and computing device 302 illustrated and described in more detail with respect to FIG. 2 and FIG. 3, respectively. Implementations of example architecture 1100 can be carried out on multiple such devices (e.g., connected through a network) connected in various ways. The components included in the architecture 1100 can be configured based on deployment requirements for a specific deployment and/or system implementing the architecture 1100.

A fingerprint collision occurs when two different agents are associated with the same fingerprint (e.g., as assigned by a semantic fingerprinting framework, as described with respect to FIG. 4). The two agents can have different specializations, focuses, or access to different information requiring different privileges. Fingerprint collisions cause unnecessary uses of computational resources, as queries can be routed to agents that are not equipped to address the queries, and can cause security issues if queries are routed to agents that have access to privileged data.

The architecture 1100 can include a collision detection module 1102. The collision detection module can determine when two or more distinct agents have an identical fingerprint, such as a fingerprint given by the semantic fingerprinting framework described with respect to FIG. 4. The collision detection module 1102 can be configured to detect a collision in response to receiving a routing path generated for a query. For example, the collision detection module 1102 can receive routing path information for a query, such as fingerprints for the query and/or the agents that the query is routed to. The collision detection module 1102 can compare the received fingerprints and determine that two agents have identical fingerprints. Alternatively, or additionally, the routing path information can include one or more bitstrings (e.g., used in the bloom filter cascade described with respect to FIG. 6), and compare the fingerprints of two agents in response to their associated bitstrings being identical. In some implementations, the collision detection module 1102 can be configured to periodically check a database (e.g., an agent fingerprint database and/or an agent bitstring database, such as the agent bitstring database 604) and identify fingerprint collisions.

The architecture 1100 can implement several potential techniques to resolve the fingerprint collision. The architecture 1100 can include a contextual tiebreaking module 1104. The contextual tiebreaking module 1104 can be configured to process contextual information, such as query context and agent capabilities, to choose an agent for processing the query. Query context can include semantic data of the query, such as, feature vectors, a determined intent of the query, a domain of the query, and/or a query complexity. Agent capabilities can include domain, query intents addressable by the agent, intended agent task or focus, computer-executable tasks that the agent can perform, and/or databases accessible by the agent. The query context and/or agent capabilities can be used to choose an agent to route the query to. For example, the agent can be chosen based on matching domains (e.g., if the query domain satisfies a similarity threshold with the agent domain, determined based on operations such as vector similarity), accessible databases (e.g., if the query intent is to retrieve information from a database that the agent has access to), and/or query complexity (e.g., if the query is complex and/or has multiple intents and the agent is advanced enough to accurately address the query). The contextual tiebreaking module 1104 can generate a confidence score for each agent that characterizes a likelihood that the agent can address the query.

The architecture 1100 can implement an embedding matching module 1106. The embedding matching module 1106 can be configured to directly compare embeddings (e.g., feature vectors) associated with the query and/or agents. For example, the embedding matching module 1106 can retrieve and/or compute feature vectors (e.g., from the query and/or capability descriptions of the agents) and compute a similarity metric between the feature vectors (e.g., a cosine similarity between the query feature vector and each agent feature vector). The embedding matching module 1106 can choose the agent with the best similarity metric (e.g., highest cosine similarity)

The architecture 1100 can implement one or more secondary hashes 1108. The secondary hashes 1108 can include cryptographic hashes and/or LSH functions. Data associated with the query and/or agents can be hashed using one or more secondary hashes 1108 to allow the architecture 1100 to disambiguate between agents with a fingerprint collision.

The architecture 1100 can implement a performance-based priority module 1110. The performance-based priority module 1110 can receive agent performance metrics and/or reputations (e.g., from a reputation database, from a distributed ledger via the agent reputation system 912 of FIG. 9) and route the query to the agent based on a comparison of the performance metrics and/or reputations (e.g., choosing the agent with the historical success rate).

In some implementations, the architecture 1100 can use multiple techniques to disambiguate fingerprint collisions. For example, the architecture can use the performance-based priority module 1110 to determine that two agents have similar reputations, and subsequently use the secondary hashes 1108 to disambiguate the agents. Alternatively, or additionally, the architecture 1100 can perform multiple techniques in parallel and use the combined results to determine a routing path for the query. For example, the architecture 1100 can use the embedding matching module 1106 to determine cosine similarities between the agent feature vectors and the query feature vector, use the contextual tiebreaking module 1104 to generate confidence scores for each agent, and use both results to determine a routing path for the query. This can include, for example, assigning a higher weight to the cosine similarities than the confidence scores, or vice versa. Additionally, the architecture 1100 can implement any combination of techniques in series, conditionally, and/or in parallel.

Method Flow

FIG. 12 is a flow diagram illustrating a process 1200 for routing queries by performing semantic fingerprinting of queries, in accordance with some implementations of the present technology. The process 1200 can be implemented on one or more computing systems, such as example devices 200 and computing devices 302 illustrated and described in more detail with reference to FIG. 2 and FIG. 3, respectively. The process 1200 can be implemented as part of a model orchestration platform.

At operation 1202, the process 1200 can include obtaining an output generation request comprising an input for generation of an output using one or more AI agents of a plurality of AI agents. The input can include a query, request, and/or a command set. The input can be a natural language input. The input can be received from a user via a user interface (UI). Each AI agent can be associated with a computer-executable operation set. The AI agent can be configured to autonomously execute one or more computer-executable operations in the set on one or more software applications of a software application set in response to satisfaction of a condition set associated with the AI agent.

The process 1200 can include generating an input fingerprint for the input. Generating the input fingerprint can include performing a fingerprinting operation via a semantic fingerprinting framework.

At operation 1204, the process 1200 can include generating a semantic feature set from the input by applying a neural network-based embedding model to a representation of the input. The embedding model can be a language model, such as an LLM and/or an SLM.

At operation 1206, the process 1200 can include applying one or more sets of hash functions to the semantic feature set to generate one or more output sets. For example, a plurality of hash functions can be applied to the semantic feature set to generate a corresponding plurality of partial hashes, where the output set comprises the partial hashes. Each output set can correspond to a set of hash functions. Each set of hash functions can operate within a different dimension of the semantic feature set.

At operation 1208, the process 1200 can include aggregating the one or more output sets to generate a composite vector that represents the input fingerprint. For example, each output set can correspond to a partial hash (e.g., a combination of the elements of the output set), and the partial hashes can be concatenated into the composite vector.

At operation 1210, the process 1200 can include accessing, for each AI agent of the plurality of AI agents, an associated agent fingerprint that comprises an associated vector generated by applying the one or more sets of hash functions to a description of the computer-executable operation set associated with the AI agent. Each associated agent fingerprint can be generated by performing a fingerprinting operation via a semantic fingerprinting framework.

At operation 1212, the process 1200 can include applying the input fingerprint to a series of probabilistic membership data structures each configured to probabilistically determine whether a difference exists between the input fingerprint and each accessed agent fingerprint of the plurality of AI agents. Applying the input fingerprint to the series of probabilistic membership data structures can include implementing a bloom filter cascade (e.g., where agent bitstrings generated from associated agent fingerprints are included in the probabilistic membership data structures). Each probabilistic membership data structure can correspond to a level in a bloom filter cascade, and have a different focus and/or comprise bitstrings of different lengths (e.g., when compared to other probabilistic membership data structures in the series).

At operation 1214, the process 1200 can include selecting one or more AI agents from the plurality of AI agents to form a selected AI agent set. A selected AI agent can correspond to a selected AI agent fingerprint such that no difference was determined to exist between the selected AI agent fingerprint and the input fingerprint. Selecting the one or more AI agents can include determining additional properties of the AI agent fingerprints, such as corresponding Hamming distances between the AI agent fingerprints and the input fingerprint.

At operation 1216, the process 1200 can include, in response to forming the selected AI agent set, transmitting the input to one or more selected AI agents of the selected AI agent set. The one or more selected AI agents can autonomously execute respective computer-executable operation sets.

Orchestrating Semi-Autonomous/Autonomous Agents Using the Model Orchestration Platform FIG. 13 shows a flow diagram illustrating a process 1300 for orchestrating a plurality of semi-autonomous or autonomous AI agents to generate a personalized response, in accordance with some implementations of the present technology. In some implementations, the process 1300 is performed by components of example devices 200 and computing devices 302 illustrated and described in more detail with reference to FIG. 2 and FIG. 3, respectively. Likewise, implementations can include different and/or additional operations or can perform the operations in different orders.

In operation 1302, the model orchestration platform is enabled to obtain (e.g., receive from a computing device) an output generation request that includes a digitally encoded input, such as a textual prompt, query object, or command set, for generation of an output using one or more AI agents of a set of AI agents communicatively connected to a gateway router (e.g., a large language model (LLM) set, an AI model set, a model set, an AI agent set).

In implementations where the gateway router is an LLM set, the LLM set can identify the context, intent, and/or semantic structure of the input using techniques such as dependency parsing, named entity recognition, and semantic role labeling. In some implementations, the gateway router is a modular suite of models that can include a hybrid setup of rules-based classifiers, neural embeddings, and so forth. The gateway router can map out which portions of the input are linked (e.g., what is the main verb, which nouns are the subject or object, and which adjectives modify which nouns) to identify dependencies. The gateway router can identify entities referenced within the input, such as names of people, organizations, locations, dates, or products. The gateway router can determine the underlying intent of the input by predicting the likely action based on training data or using a rule-based system to map identified verbs to a corresponding action. For example, an intent can be referenced as "retrieve information," "book an appointment," "send an email," or "answer a question."

One or more AI agents can be associated with a specific routing data structure such as a matrix, table, graph, or other data structure that identifies actions such as a computer-executable task set used to generate a response, preconditions, parameter boundaries, and/or trigger events. The routing data structure(s) can be annotated using domain-specific ontologies or knowledge graphs. For example, a matrix row maps a detected user type and operation to a given agent's indices, while a column encodes resource constraints or regulatory flags.

Each action can be autonomously executed by the AI agent on a set of software applications in response to satisfaction of a condition set. For example, each action can be identified in the routing data structure by its operational signature, such as a software API call, database transaction, service invocation, code execution on an isolated virtual machine, and so forth. The respective AI agent can evaluate a condition set, which can be Boolean or other logic, against the input's operational parameters (such as user permissions, data sensitivity, time constraints, or current system load). Only when the conditions in the condition set are satisfied does the agent proceed to autonomously execute the action.

In operation 1304, the model orchestration platform is enabled to segment, using the gateway router, the input into a plurality of portions such as sub-queries. Each sub-query can share a common output parameter set that identifies, for example, a user type or privilege level (to enforce access control), timestamp of receipt, requested output modality (such as text, file, JSON object, vector embedding, or structured report), performance metric thresholds (e.g., required response time, accuracy bounds, resource usage limits), constraints on system resource allocation (such as memory, CPU, or bandwidth quotas per sub-query), and so forth.

To partition the input, the gateway router can transform the input into high-dimensional vectors (i.e., numerical representations that encode the underlying contextual relationships of each part of the input) using an embedding model (which can be within the gateway router). The embeddings enable the gateway router to detect shifts in intent, semantic domains, or actionable entities within the input. For example, the vectors are compared against a set of pre-established reference embeddings, each representing prototypical intents, domains (e.g., a subset of knowledge), or entity types. By measuring the proximity and direction of the input vectors relative to these references (using cosine similarity or related distance metrics), the gateway router can quantify how closely each segment aligns with known categories or detect when vector patterns shift, signaling a change in user intent, topic, or actionable item. A vector shift can be flagged as a context transition, and therefore form a separate sub-query.

For example, when a user or automated system transmits an input to the platform that states "prepare the house for bedtime by turning off the downstairs lights, locking all exterior doors, lowering the thermostat to 65 degrees, and activating security cameras," the gateway router identifies the sequence of independent operations: (1) turning off lights, (2) locking doors, (3) adjusting the thermostat, and (4) activating security devices by identifying keywords within the input (e.g., "lock," "adjust thermostat"). Each of the operations is treated as a sub-query. For each sub-query, the gateway router can obtain the common output parameter set of the predefined sub-query. For instance, the gateway router tags each one with the user's privilege level (so "lock all doors" or "deactivate alarms" will only be attempted if the user has admin access).

In operation 1306, the model orchestration platform is enabled to determine an operational parameter set of each AI agent that defines at least one user type authorized to use the AI agent, a range of timestamps associated with the AI agent, at least one output modality of responses generated by the AI agent, at least one performance metric value, at least one resource usage value, and so forth. Performance metric values, such as required response time (latency), accuracy, trust confidence, or compliance levels, can be retrieved from agent registries or calculated in near-real-time or real-time based on prior executions, simulated workloads, or machine learning-based predictions. Resource usage values can define computational boundaries, such as maximum CPU cycles, RAM usage, bandwidth consumption, number of concurrent threads, and so forth. The model orchestration platform can store the operational parameter set of each AI agent within a respective dynamic routing table or configuration graph that tracks active constraints and current state for each agent.

In operation 1308, the model orchestration platform is enabled to, for each sub-query of the plurality of sub-queries, identify, using the gateway router, a candidate agent (single or multiple) from the plurality of AI agents by comparing the output parameter set of the sub-query with the operational parameter set of each AI agent within the plurality of AI agents. In a rule-based approach, the gateway router uses filtering and logic rules to remove agents who do not meet particular requirements, such as compliance, privilege level, and so forth. In some implementations, the gateway router calculates similarity scores between the vectors of sub-query output parameters and agent operational parameters, e.g., using cosine similarity or other distance measures. The gateway router can use an ensemble model to rank candidate agents on predefined static capabilities (e.g., training data) and/or near-real-time or real-time performance, availability, historical success rate for similar tasks, predicted energy consumption, and so forth. For example, when the operational parameter set defines the at least one resource usage value, the model orchestration platform can allocate a subset of available computational resources to process the sub-query based on the one or more resource usage values of the identified candidate agent.

The gateway router can cross-reference the vectorized input against structured ontologies, or digital maps of domain expertise and capabilities of the AI agents communicatively connected to the model orchestration platform, to map distinct portions of the input to their most appropriate downstream handler. The gateway router can compare the current prompt with historical requests and workflows, and use the comparison to route similar input portions to historically routed agents.

In some implementations, each AI agent is associated with an ontology data structure. The ontology data structure can refer to a machine-readable representation of a domain set, an attribute set of each domain-specific category in the domain set, and/or a set of relationships among the domain set and the attribute set of each domain set. The AI model set can access the ontology data structure of a particular AI agent to identify, for a particular sub-query, a query-specific domain within the domain set based on one or more query-specific attributes within respective attribute sets of each domain. One or more candidate agents of the candidate agent set can be associated with the query-specific domain. The ontology data structure can be stored in, for example, a graph database, a distributed file system, a cloud-based object storage service, a local persistent memory of the AI agent, and so forth. Updates to the ontology structure can be performed only in response to a consensus among the AI agents. For example, the model orchestration platform can update the ontology data structure responsive to receiving a data signal from the AI agent set that indicates a consensus among the AI agent set for the update.

The plurality of AI agents can be organized in a hierarchal architecture (e.g., a "constellation" of agents). The hierarchal architecture can include a general-purpose agent at a first level of the hierarchal architecture, multiple specialized sub-agents at a second level, and so forth. AI agents can be identified on an API registry, which can refer to a continuously updated directory that lists all registered agents, their endpoints, supported functions, operational health status, and/or compliance metadata. For example, the model orchestration platform can expose an API registry identifying the AI agent set, where the API registry is accessible by the gateway router. This registry can be implemented as a centralized ledger or a distributed service, allowing the orchestrator (and even sub-agents) to dynamically discover, authenticate, and select the available agents for a given sub-task.

In some implementations, at least one AI agent is associated with a dynamic retrieval-augmented generation (RAG)-based model. The dynamic RAG-based model can update a knowledge base associated with the RAG-based model by retrieving data from one or more data sources via, for example, an API. The update can be triggered based on detected performance degradation, received user feedback, a scheduled interval, and the other contextual signals such as those discussed with reference to FIG. 5. The dynamic agent refers to a dynamic RAG-based agent that communicatively connects its internal language model(s) to an actively managed knowledge base that is continually refreshed by retrieving new data from sources (e.g., trusted sources) through APIs, web scrapers, and/or other database connectors. The timing and frequency of the updates can be fully automated or governed by predefined logic, for example, triggering data incorporation when an agent's live performance metrics drop below an accuracy benchmark (e.g., 90% on evaluation sets), in direct response to user feedback highlighting knowledge gaps, or at regular, scheduled intervals. The flexibility enables the gateway router and/or the candidate agent itself to monitor for new or valuable data sources, check for stale entries, and incorporate vetted updates, while minimizing or at least greatly reducing retraining costs and ensuring that sensitive or proprietary information remains secure and is not intermixed or exfiltrated outside a trusted or otherwise validated environment.

In some implementations, at least one AI agent is instantiated as fine-tuned models, wherein the fine-tuning can be performed using domain-specific datasets to modify the model parameters of a pre-trained neural network. The model orchestration platform can receive a base model (e.g., a transformer-based LLM or small language model (SLM)), select a corpus of training data associated with a target domain (such as legal, medical, or financial records), and/or execute a supervised learning operation to update the model's weights. The resulting fine-tuned AI agent is enabled to generate responses to sub-queries that match the domain of the training data, and the model orchestration platform can dynamically route such sub-queries to the fine-tuned agent by matching sub-query metadata or semantic embeddings of the query to a respective domain of the fine-tuned AI agent.

Thus, internal representations of the fine-tuned AI agent are specifically adapted to the operational context of the sub-query.

The model orchestration platform, in some implementations, uses purpose-trained SLMs that have been constructed using knowledge distillation operations. For example, the knowledge distillation operations include training a "compact" SLM (the "student") to replicate the output distributions of a larger, more "complex" (i.e., more parameters) model (the "teacher") on a set of inputs. In some implementations, a dataset of input-output pairs is generated using the teacher model that can be subsequently used to train the student SLM to minimize or otherwise reduce a divergence metric (e.g., Kullback-Leibler divergence) between its outputs and those of the teacher. The resulting SLM agent can be registered within the model orchestration platform with metadata that indicates its specific capabilities. During runtime, the model orchestration platform evaluates system resource constraints and sub-query requirements, and selectively routes sub-queries to the SLM agent when its operational profile and knowledge domain are determined to be aligned for the task.

The AI agents can be instantiated using various machine learning techniques, such as Bayesian inference models, decision trees, SVMs, rule-based expert systems, and the like. Each AI agent can be instantiated as a software module with a defined interface for receiving sub-queries, executing a computational procedure (e.g., probabilistic inference, tree traversal, or rule evaluation), and/or returning a structured response. The model orchestration platform can maintain a registry of agent capabilities and match sub-query characteristics (such as data type, required explainability, or determinism) to the agent sharing common attributes.

Conversely, static agents operate against fixed, immutable knowledge bases, which provides the benefit of full control, data provenance, and improved data privacy, especially when the underlying LLM or SLM is kept on-premises or within particular operative boundaries (e.g., within the automated systems or servers of an organization). This architecture reduces the risk of unwanted data leakage or contamination. In some implementations, dynamic RAG agents can perform validations via both automated validation (using deep learning-driven validators) and human-in-the-loop workflows, where updates to the knowledge base are subject to approval by users with specific roles or permissions.

In some implementations, at least one AI agent is a static agent associated with a first knowledge base that is fixed, and at least one other AI agent is a dynamic agent with a second knowledge base that can be updated. The data routing table can select between static and dynamic agents for a particular portion of the input based on data sensitivity, update frequency, user-defined policy, and so forth. The routing data structure or gateway router can dynamically determine, for each incoming input or sub-query, whether a static or dynamic agent is most appropriate, based on the rate at which information changes in the relevant domain (update frequency), the sensitivity or classification of the information (ensuring proprietary or confidential data is handled only by static agents), policies defined by administrators, and so forth.

In operation 1310, the model orchestration platform is enabled to, for each identified candidate agent of each sub-query, select, using the gateway router, one or more actions (e.g., computer-executable tasks from the computer-executable task set) identified by a respective routing data structure (e.g., table, matrix) of the candidate agent. Each of the one or more actions can be selected based on the sub-query satisfying a respective condition set of the action. For example, the routing data structure can indicate a knowledge source used by the AI agent and/or a model used by the AI agent. The gateway router evaluates each sub-query against condition sets (i.e., logic rules or feature thresholds) identified by the routing data structure. For instance, if a sub-query requests "lower temperature if above 28° C.," the agent's task table can only activate its "HVAC adjust" action if current sensor data meets or exceeds that threshold. The routing structure can indicate which knowledge source (such as a sensor, retrieved data, or an external model) the agent should use, as well as which specific model or sub-model is invoked to process the input.

Routing data structures, which determine how actions are matched to conditions, can be maintained manually (e.g., updated by administrators through dashboards or configuration files) or automatically, via dynamic signals observed by the model orchestration platform itself. To update the routing data structures dynamically, the model orchestration platform can detect a change in one or more environmental signals using the LLM set, and dynamically modify the routing data structure of one or more AI agents based on the detected change in the one or more environmental signals.

The routing data structure can be updated in response to a detected change in system load (CPU, memory, or network usage), a detected change in user context (such as a role change), a detected change in environmental signals (such as a change in building occupancy or sensor reading/malfunction), and so forth. The change can additionally or alternatively be a change in value of a performance metric associated with the AI agent. Examples of contextual signals are discussed in further detail with reference to FIG. 5. For instance, if performance metrics indicate that an AI agent is becoming a bottleneck (increased response time, dropped packets), the routing data structure can downgrade its task assignment priority until a particular action such as fault recovery is executed.

In some implementations, the AI agent set and/or the gateway router includes a validation agent to validate updates to a knowledge base accessed by one or more AI agents. The validation agent can obtain (e.g., receive) a proposed update to the knowledge base. The validation agent can initiate a computer-implemented workflow to evaluate the proposed update against an update criteria set, and responsive to determining satisfaction of the proposed update with the update criteria set, apply the proposed update to the knowledge base. This thus prevents inadvertent propagation of faulty rules or data.

In some implementations, candidate agents can be identified based on historical queries. For example, the model orchestration platform compares the prompt against a database of previous queries, and identifies one or more identified candidate agents based on the comparison. Each new input can be compared against a database of previously processed output generation requests, using vector similarity search, recurrence pattern mining, or clustering models. If a current input closely matches a previously handled input, the routing platform can prioritize (e.g., increase the rank of) agent(s) that successfully (e.g., accurately, within a particular latency threshold) responded in the past.

In operation 1312, the model orchestration platform is enabled to autonomously execute, using the identified candidate agent, the selected one or more computer-executable tasks to generate an agent-specific response set responsive to the sub-query.

In operation 1314, the model orchestration platform is enabled to, using the gateway router, aggregate each respective agent-specific response set of each respective candidate agent of each sub-query (possibly from different modalities, such as text, images, audio, video, multi-modal data, unstructured data, semi-structured data, structured data, device status codes, summaries, and the like) into an overall response set that is responsive to the prompt of the output generation request. In some implementations, since responses can stem from a wide variety of data modalities, the gateway router normalizes each respective agent-specific response set into a standardized internal format so that disparate data types can be mapped to the original subcomponents of the input and enable the model orchestration platform to maintain a traceable link between each response and the specific sub-query of the input the response addresses. For example, one sub-query can request a temperature reading (structured data) while another requests a video snapshot from a security camera (multi-modal data).

Once normalized, the model orchestration platform can synthesize each respective agent-specific response set using temporal and semantic alignment (linking events or data across agents by their timestamp or logical context) and merging or summarizing redundant or complementary information. The model orchestration platform can perform conflict resolution through policy rules or majority voting. Confidence scoring and contextual weighting can be used to assess the reliability of each agent based on historical performance metrics, current system status, or explicit confidence values returned by the agents themselves. For instance, if two agents provide disagreeing status codes for a device state, the model orchestration platform can resolve the discrepancy by choosing (or weighting more heavily) the result from the most recently updated or highest-confidence agent. The aggregated response can be formatted or encoded according to the requirements of the output channel or requesting user, such as generating a structured report, a dashboard, a single summary text, or machine-consumable data package (e.g., JSON).

In some implementations, one or more AI agents are enabled to implement a feedback loop. For example, the model orchestration platform, via the gateway router and/or the AI agent, obtains a feedback set for one or more agent-specific response sets. The model orchestration platform generates a modification set (e.g., actions to adjust task parameters, alter execution sequences, or reweight routing priorities) to modify the one or more computer-executable tasks of a respective candidate agent and/or a sequence of the one or more computer-executable tasks of the respective candidate agent. The model orchestration platform transmits the modification set to the respective candidate agent, and applies the actions indicated in the modification set onto the respective candidate agent. The one or more AI agents can, once modified, re-execute the computer-executable tasks to generate a modified agent-specific response set, which can then be re-validated using the model orchestration platform.

In some implementations, the feedback loop is implemented using operations associated with fine-tuning and reinforcement learning. Fine-tuning can be performed by updating the parameters of a deployed agent model using additional labeled data that is specific to the operational environment or user context. For example, once new training samples are received, a supervised learning operation can be applied to adjust the model's weights, and the updated agent can be redeployed within the model orchestration platform. Reinforcement learning operations can be executed so that an agent receives reward signals based on the outcomes of its actions within the environment of the model orchestration platform. For example, an agent's policy is updated to enable the agent to iteratively adjust its behavior over time in response to observed feedback and performance metrics (e.g., using algorithms such as Q-learning or policy gradients).

Feedback can be generated internally by the agent itself, for example, by monitoring its own performance metrics, error rates, or confidence scores during task execution. Additionally or alternatively, feedback can be received from the orchestrator, which can be aggregate system-level performance data, user satisfaction scores, or compliance audit results. The orchestrator can transmit the received feedback as structured feedback signals to the agent. Agents, in some implementations, receive feedback from peer agents within the network to enable collaborative learning from feedback received by other agents. Furthermore, the model orchestration platform can obtain feedback from external sources, such as user annotations, third-party evaluation services, or regulatory compliance systems.

Agents within the model orchestration platform can autonomously generate feedback signals based on their internal state, task outcomes, or detected anomalies. The agent-generated feedback signals can be transmitted to the orchestrator, to other agents, or to external monitoring systems. For example, the model orchestration platform can implement a subscriber framework to enable services, agents, or external systems to register as subscribers to specific feedback channels or topics. When feedback is generated or received, the model orchestration platform can publish the feedback to all subscribed entities using a publish-subscribe messaging protocol. Thus, relevant feedback is disseminated in near real time or real time to all associated components across the model orchestration platform.

Validating Agent Inputs and Outputs Using the Model Orchestration Platform

Figure 14:
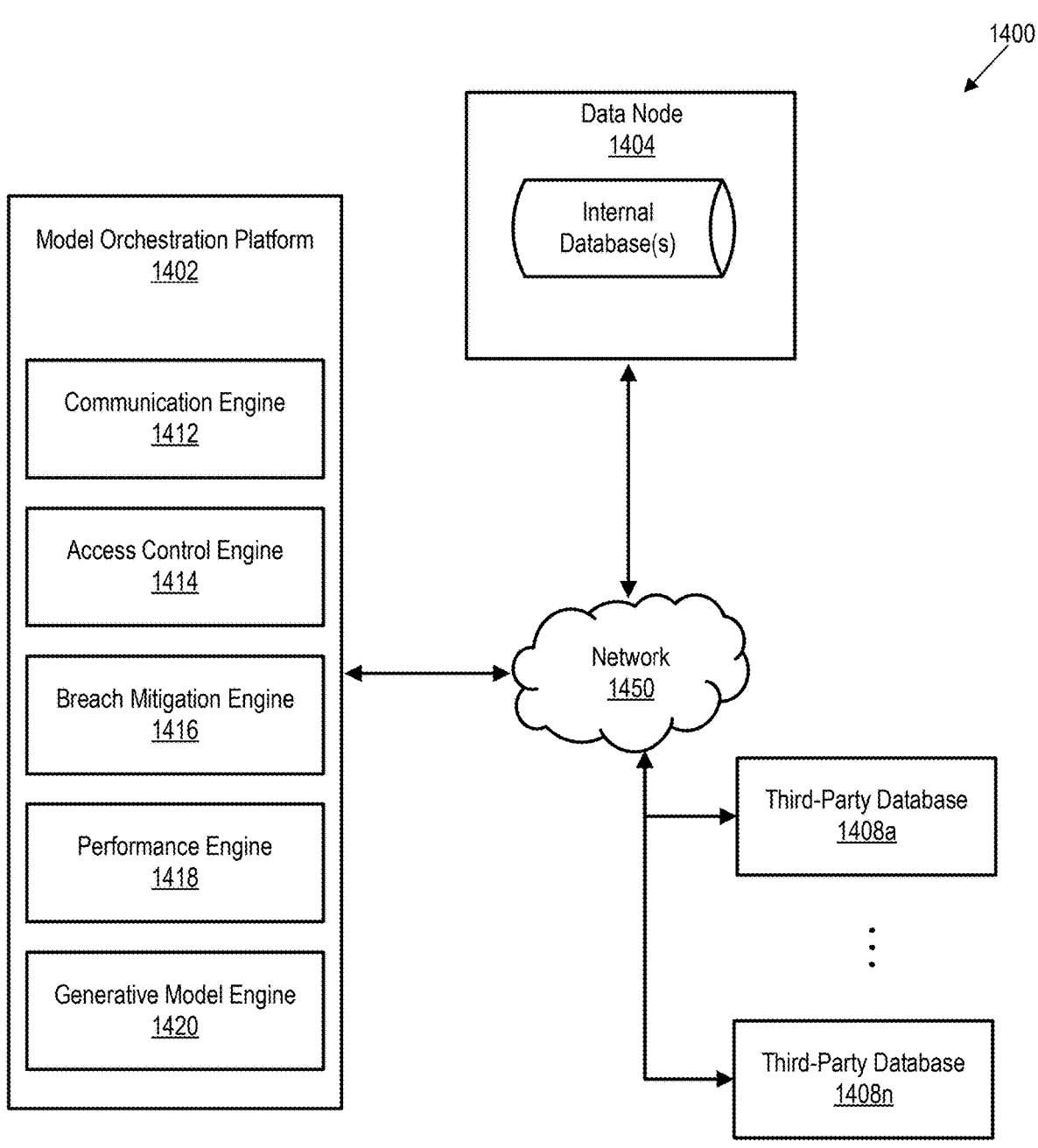
FIG. 14 shows an illustrative environment for evaluating model prompts and outputs for model selection and validation, in accordance with some implementations of the present technology.

FIG. 14 shows an illustrative environment 1400 for evaluating machine learning model inputs (e.g., agent prompts) and outputs for model selection and validation, in accordance with some implementations of the present technology. For example, the environment 1400 includes the model orchestration platform 1402, which is capable of communicating with (e.g., transmitting or receiving data to or from) a data node 1404 and/or third-party databases 1408a-1408n via a network 1450. The model orchestration platform 1402 can include software, hardware, or a combination of both and can reside on a physical server or a virtual server (e.g., as described in FIG. 3) running on a physical computer system. For example, the model orchestration platform 1402 can be distributed across various nodes, devices, or virtual machines (e.g., as in a distributed cloud server). In some implementations, the model orchestration platform 1402 can be configured on a user device (e.g., a laptop computer, smartphone, desktop computer, electronic tablet, or another suitable user device). Furthermore, the model orchestration platform 1402 can reside on a server or node and/or can interface with third-party databases 1408a-1408n directly or indirectly.

The data node 1404 can store various data, including one or more machine learning models, prompt validation models, associated training data, user data, performance metrics and corresponding values, validation criteria, and/or other suitable data. For example, the data node 1404 includes one or more databases, such as an event database (e.g., a database for storage of records, logs, or other information associated with LLM-related user actions), a vector database, an authentication database (e.g., storing authentication tokens associated with users of the model orchestration platform 1402), a secret database, a sensitive token database, and/or a deployment database.

An event database can include data associated with events relating to the model orchestration platform 1402. For example, the event database stores records associated with users' inputs or prompts for generation of an associated natural language output (e.g., prompts intended for processing using an LLM). The event database can store timestamps and the associated user requests or prompts. In some implementations, the event database can receive records from the model orchestration platform 1402 that include model selections/determinations, prompt validation information, user authentication information, and/or other suitable information. For example, the event database stores platform-level metrics (e.g., bandwidth data, central processing unit (CPU) usage metrics, and/or memory usage associated with devices or servers associated with the model orchestration platform 1402). By doing so, the model orchestration platform 1402 can store and track information relating to performance, errors, and troubleshooting. The model orchestration platform 1402 can include one or more subsystems or subcomponents. For example, the model orchestration platform 1402 includes a communication engine 1412, an access control engine 1414, a breach mitigation engine 1416, a performance engine 1418, and/or a generative model engine 1420.

A vector database can include data associated with vector embeddings of data. For example, the vector database includes a numerical representations (e.g., arrays of values) that represent the semantic meaning of unstructured data (e.g., text data, audio data, or other similar data). For example, the model orchestration platform 1402 receives inputs such as unstructured data, including text data, such as a prompt, and utilize a vector encoding model (e.g., with a transformer or neural network architecture) to generate vectors within a vector space that represents meaning of data objects (e.g., of words within a document). By storing information within a vector database, the model orchestration platform 1402 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the model orchestration platform 1402 or associated development pipeline. For example, the authentication database stores keys (e.g., public keys that match private keys linked to users and/or devices). The authentication database can include other user or device information (e.g., user identifiers, such as usernames, or device identifiers, such as medium access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as application programming interface (API) keys, passwords, credentials, or other such information. For example, sensitive information includes personally identifiable information (PII), such as names, identification numbers, or biometric information. By storing secrets or other sensitive information, the model orchestration platform 1402 can evaluate prompts and/or outputs to prevent breaches or leakage of such sensitive information.

A deployment database can include data associated with deploying, using, or viewing results associated with the model orchestration platform 1402. For example, the deployment database can include a server system (e.g., physical or virtual) that stores validated outputs or results from one or more LLMs, where such results can be accessed by the requesting user.

The model orchestration platform 1402 can receive inputs (e.g., prompts), training data, validation criteria, and/or other suitable data from one or more devices, servers, or systems. The model orchestration platform 1402 can receive such data using communication engine 1412, which can include software components, hardware components, or a combination of both. For example, the communication engine 1412 includes or interfaces with a network card (e.g., a wireless network card and/or a wired network card) that is associated with software to drive the card and enables communication with network 1450. In some implementations, the communication engine 1412 can also receive data from and/or communicate with the data node 1404, or another computing device. The communication engine 1412 can communicate with the access control engine 1414, the breach mitigation engine 1416, the performance engine 1418, and the generative model engine 1420.

In some implementations, the model orchestration platform 1402 can include the access control engine 1414. The access control engine 1414 can perform tasks relating to user/device authentication, controls, and/or permissions. For example, the access control engine 1414 receives credential information, such as authentication tokens associated with a requesting device and/or user. In some implementations, the access control engine 1414 can retrieve associated stored credentials (e.g., stored authentication tokens) from an authentication database (e.g., stored within the data node 1404). The access control engine 1414 can include software components, hardware components, or a combination of both. For example, the access control engine 1414 includes one or more hardware components (e.g., processors) that are able to execute operations for authenticating users, devices, or other entities (e.g., services) that request access to an LLM associated with the model orchestration platform 1402. The access control engine 1414 can directly or indirectly access data, systems, or nodes associated with the third-party databases 1408a-1408n and can transmit data to such nodes. Additionally or alternatively, the access control engine 1414 can receive data from and/or send data to the communication engine 1412, the breach mitigation engine 1416, the performance engine 1418, and/or the generative model engine 1420.

The breach mitigation engine 1416 can execute tasks relating to the validation of inputs and outputs associated with the LLMs. For example, the breach mitigation engine 1416 validates inputs (e.g., prompts) to prevent sensitive information leakage or malicious manipulation of LLMs, as well as validate the security or safety of the resulting outputs. The breach mitigation engine 1416 can include software components (e.g., modules/virtual machines that include prompt validation models, performance criteria, and/or other suitable data or processes), hardware components, or a combination of both. As an illustrative example, the breach mitigation engine 1416 monitors prompts for the inclusion of sensitive information (e.g., PII), or other forbidden text, to prevent leakage of information from the model orchestration platform 1402 to entities associated with the target LLMs. The breach mitigation engine 1416 can communicate with the communication engine 1412, the access control engine 1414, the performance engine 1418, the generative model engine 1420, and/or other components associated with the network 1450 (e.g., the data node 1404 and/or the third-party databases 1408a-1408n).

The performance engine 1418 can execute tasks relating to monitoring and controlling performance of the model orchestration platform 1402 (e.g., or the associated development pipeline). For example, the performance engine 1418 includes software components (e.g., performance monitoring modules), hardware components, or a combination thereof. To illustrate, the performance engine 1418 can estimate performance metric values associated with processing a given prompt with a selected LLM (e.g., an estimated cost or memory usage). By doing so, the performance engine 1418 can determine whether to allow access to a given LLM by a user, based on the user's requested output and the associated estimated system effects. The performance engine 1418 can communicate with the communication engine 1412, the access control engine 1414, the performance engine 1418, the generative model engine 1420, and/or other components associated with the network 1450 (e.g., the data node 1404 and/or the third-party databases 1408a-1408n).

The generative model engine 1420 can execute tasks relating to machine learning inference (e.g., natural language generation based on a generative machine learning model, such as an LLM). The generative model engine 1420 can include software components (e.g., one or more LLMs, and/or API calls to devices associated with such LLMs), hardware components, and/or a combination thereof. To illustrate, the generative model engine 1420 can provide users' prompts to a requested, selected, or determined model (e.g., LLM) to generate a resulting output (e.g., to a user's query within the prompt). As such, the generative model engine 1420 enables flexible, configurable generation of data (e.g., text, code, or other suitable information) based on user input, thereby improving the flexibility of software development or other such tasks. The generative model engine 1420 can communicate with the communication engine 1412, the access control engine 1414, the performance engine 1418, the generative model engine 1420, and/or other components associated with the network 1450 (e.g., the data node 1404 and/or the third-party databases 1408a-1408n).

Engines, subsystems, or other components of the model orchestration platform 1402 are illustrative. As such, operations, subcomponents, or other aspects of particular subsystems of the model orchestration platform 1402 can be distributed, varied, or modified across other engines. In some implementations, particular engines can be deprecated, added, or removed. For example, operations associated with breach mitigation are performed at the performance engine 1418 instead of at the breach mitigation engine 1416.

Figure 15:
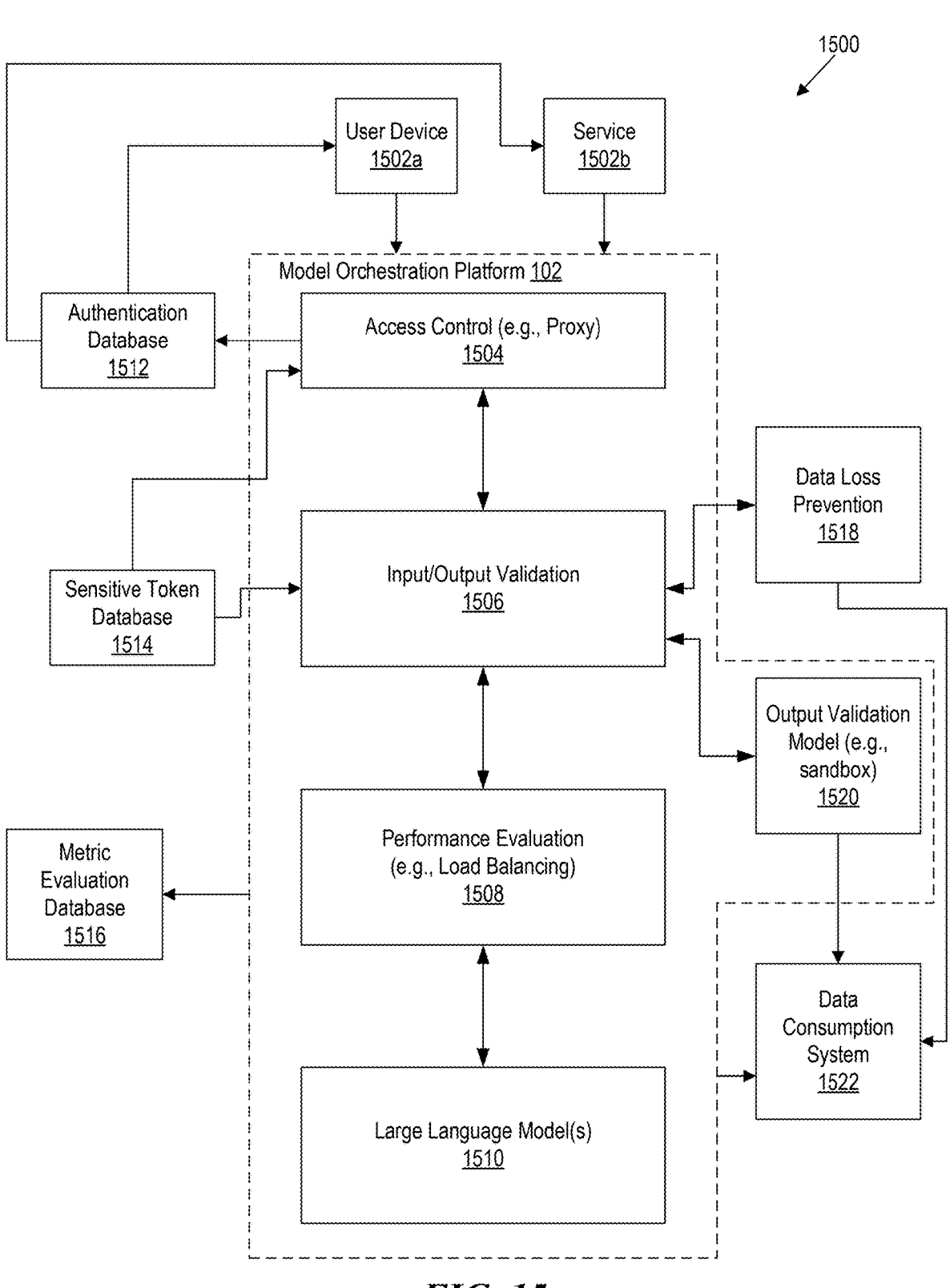
FIG. 15 is a schematic illustrating a process for validating model inputs and outputs, in accordance with some implementations of the present technology.

FIG. 15 is a schematic illustrating a process 1500 for validating model (e.g., agent) inputs and outputs, in accordance with some implementations of the present technology. For example, a user device 1502a or a service 1502b provides an output generation request (e.g., including an input, such as a prompt, and an authentication token) to the model orchestration platform 1402 (e.g., to the access control engine 1414 for access control 1504 via the communication engine 1412 of FIG. 14). The access control engine 1414 can authenticate the user device 1502a or service 1502b by identifying stored tokens within an authentication database 1512 that match the provided authentication token. The access control engine 1414 can communicate the prompt to the breach mitigation engine 1416 for input/output validation 1506. The breach mitigation engine 1416 can communicate with a sensitive token database 1514 and/or a data-loss prevention engine 1518, and/or an output validation model 1520 for validation of prompts and/or model outputs. Following input validation, the performance engine 1418 can evaluate the performance of models to route the prompt to an appropriate model (e.g., model(s) 1510). The model orchestration platform 1402 can transmit the generated output to the output validation model 1520 for testing and validation of the output (e.g., to prevent security breaches). The output validation model 1520 can transmit the validated output to a data consumption system 1522, for exposure of the output to the user device 1502*a* and/or the service 1502*b*. In some implementations, the model orchestration platform 1402 can transmit metric values, records, or events associated with the model orchestration platform 1402 to a metric evaluation database 1516 (e.g., an event database) for monitoring, tracking, and evaluation of the model orchestration platform 1402.

A user device (e.g., the user device 1502*a*) and/or a module, component, or service of a development pipeline (e.g., a service 1502*b*) can generate and transmit an output generation request to the model orchestration platform 1402 (e.g., via the communication engine 1412 of FIG. 14). An output generation request can include an indication of a requested output from a machine learning model. The output generation request can include an input, such as a prompt, an authentication token, and/or a user/device identifier of the requester. To illustrate, the output generation request can include a prompt (e.g., a query) requesting data, information, or data processing (e.g., from a model). The prompt can include a natural language question or command (e.g., in English). For example, the prompt includes a request for a model to generate code (e.g., within a specified programming language) that executes a particular operation. Additionally or alternatively, a prompt includes a data processing request, such as a request to extract or process information of a database (e.g., associated with one or more of the third-party databases 1408*a*-1408*n*). The output generation request can be transmitted to the model orchestration platform 1402 using an API call to an API associated with the model orchestration platform 1402 and/or through a graphical user interface (GUI).

The output generation request can include textual and/or non-textual inputs. For example, the output generation request includes audio data (e.g., a voice recording), video data, streaming data, database information, and other suitable information for processing using a machine learning model. For example, the output generation request is a video generation request that includes an image and a textual prompt indicating a request to generate a video based on the image. As such, machine learning models of the model orchestration platform disclosed herein enable inputs of various formats or combinations thereof.

Figure 16:
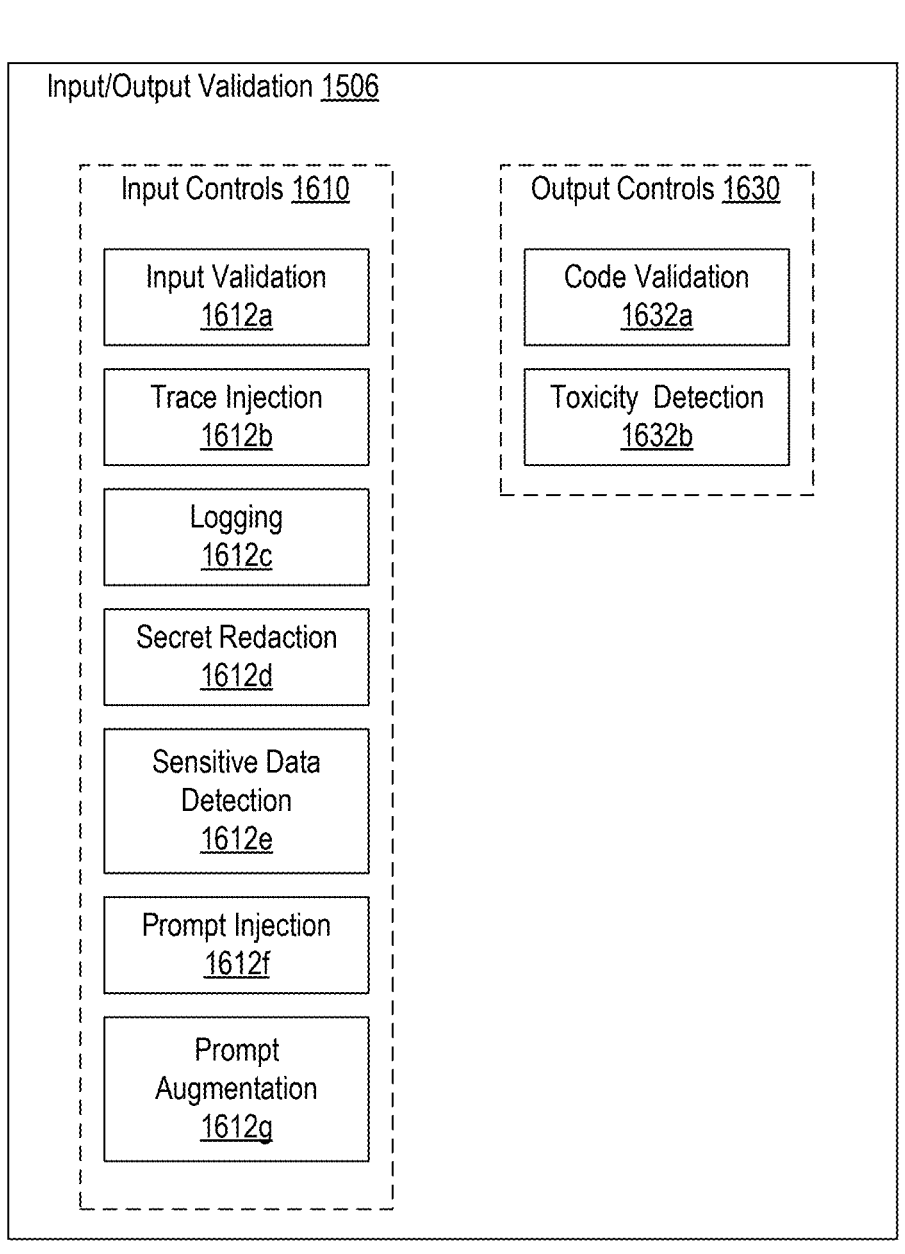
FIG. 16 shows a schematic illustrating components of input/output validation, in accordance with some implementations of the present technology.

FIG. 16 shows a schematic 1600 illustrating components of input/output validation, in accordance with some implementations of the present technology. For example, input/output validation 1506 (e.g., through breach mitigation engine 1416) includes input controls 1610 (e.g., associated with prompt validation) that include one or more prompt validation models. The input/output validation 1506 can additionally or alternatively include output controls 1630, as discussed below. Modules, components, or models associated with the input/output validation 1506 can be updated, modified, added, removed, activated, or deactivated (e.g., according to attributes of the output generation request, a classification of the user, or other suitable factors). Thus the breach mitigation engine 1416 (and the model orchestration platform 1402) are flexible, modular, and configurable in an application-specific manner.

A prompt (e.g., input) validation model can include a module (e.g., a software component), model, algorithm, or process for validating, authenticating, modifying, and/or controlling inputs (e.g., to models). For example, a prompt validation model includes one or more input controls 1610, as shown in FIG. 16. Additionally or alternatively, the input controls 1610 can include one or more prompt validation models capable of executing operations including input validation, trace injection, logging, secret redaction, sensitive data detection, prompt injection, and/or prompt augmentation. A prompt validation model can generate a validation indicator. The validation indicator can indicate a validation status (e.g., a binary indicator specifying whether the prompt is suitable for provision to the associated model). Additionally or alternatively, the validation indicator can indicate or specify aspects of the prompt that are validated and/or invalid, thereby enabling further modification to cure any associated deficiencies in the prompt.

FIG. 17 shows a flow diagram illustrating a process 1700 for the dynamic evaluation of model prompts and validation of the resulting outputs, in accordance with some implementations of the present technology. For example, the process 1700 is used to generate data and/or code for in the context of data processing or software development pipelines.

At act 1702, process 1700 can receive an output generation request from a user device (e.g., where the user device is associated with an authentication token). For example, the model orchestration platform 1402 receives an output generation request from a user device, where the user device is associated with an authentication token, and where the output generation request includes a prompt for generation of a text-based output using a first model. As an illustrative example, the model orchestration platform 1402 receives a request from a user, through a computing device, indicating a query to request the generation of code for a software application. The request can include a user identifier, such as a username, as well as a specification of a particular requested model architecture. By receiving such a request, the model orchestration platform 1402 can evaluate the prompt and generate a resulting output in an efficient, secure manner.

In some implementations, process 1700 can generate an event record that describes the output generation request. For example, the model orchestration platform 1402 generates, based on the output generation request, an event record including the performance metric value, a user identifier associated with the user device, and the prompt. The model orchestration platform 1402 can transmit, to the server system, the event record for storage in an event database. As an illustrative example, the model orchestration platform 1402 can generate a log of requests from users for generation of outputs (e.g., including the user identifier and associated timestamp). By doing so, the model orchestration platform 1402 can track, monitor, and evaluate the use of system resources, such as models, thereby conferring improved control to system administrators to improve the effectiveness of troubleshooting and system resource orchestration.

At act 1704, process 1700 can authenticate the user. For example, the model orchestration platform 1402 authenticates the user device based on the authentication token (e.g., credentials associated with the output generation request). As an illustrative example, the model orchestration platform 1402 can identify the user associated with the output generation request and determine whether the user is allowed to submit a request (e.g., and/or whether the user is allowed to select an associated model). By evaluating the authentication status of the user, the model orchestration platform 1402 can protect the associated software development pipeline from malicious or unauthorized use.

In some implementations, process 1700 can compare the authentication token with a token stored within an authentication database in order to authenticate the user. For example, the model orchestration platform 1402 determines a user identifier associated with the user device. The model orchestration platform 1402 can determine, from a token database, a stored token associated with the user identifier. The model orchestration platform 1402 can compare the stored token and the authentication token associated with the output generation request. In response to determining that the stored token and the authentication token associated with the output generation request match, the model orchestration platform 1402 can authenticate the user device. As an illustrative example, the model orchestration platform 1402 can compare a first one-time password assigned to a user (e.g., as stored within an authentication database) with a second one-time password provided along with the authentication request. By confirming that the first and second passwords match, the model orchestration platform 1402 can ensure that the user submitting the output generation request is authorized to interact to use the requested models.

At act 1706, process 1700 can determine a performance metric value associated with the output generation request. For example, the model orchestration platform 1402 determines a performance metric value associated with the output generation request, where the performance metric value indicates an estimated resource requirement for the output generation request. As an illustrative example, the model orchestration platform 1402 can determine an estimated memory usage associated with the output generation request (e.g., an estimated memory size needed by the associated model to generate the requested output based on the input prompt). By doing so, the model orchestration platform 1402 can determine the load or burden on the system associated with the user's request, thereby enabling the model orchestration platform 1402 to evaluate and suggest resource use optimization strategies to improve the efficiency of the associated development pipeline.

At act 1708, process 1700 can identify a prompt validation model, for validation of the output generation request, based on an attribute of the request. For example, the model orchestration platform 1402 identifies, based on an attribute of the output generation request, a first prompt validation model of a plurality of prompt validation models (e.g., of a set of input controls). As an illustrative example, the model orchestration platform 1402 can determine a technical application or type of requested output associated with the prompt. The attribute can include an indication that the prompt is requesting code (e.g., for software development purposes). Based on this attribute, the model orchestration platform 1402 can determine a prompt validation model (e.g., an input control) that is suitable for the given prompt or output generation request. By doing so, the model orchestration platform 1402 enables tailored, flexible, and modular controls or safety checks on prompts provided by users, thereby improving the efficiency of the system will targeting possible vulnerabilities in a prompt-specific manner.

At act 1710, process 1700 can provide the output generation request to the identified model for modification of the prompt. For example, the model orchestration platform 1402 provides the output generation request to the first prompt validation model to modify the prompt. As an illustrative example, the model orchestration platform 1402 can execute one or more input controls to evaluate the prompt, including trace injection, prompt injection, logging, secret redaction, sensitive data detection, prompt augmentation, or input validation. By doing so, the model orchestration platform 1402 can improve the accuracy, security, and stability of prompts that are subsequently provided to models, thereby preventing unintended data leakage (e.g., of sensitive information), malicious prompt manipulation, or other adverse effects.

In some implementations, process 1700 can replace or hide sensitive data within the user's prompt. For example, the model orchestration platform 1402 determines that the prompt includes a first alphanumeric token. The model orchestration platform 1402 can determine that one or more records in a sensitive token database include a representation of the first alphanumeric token. The model orchestration platform 1402 can modify the prompt to include a second alphanumeric token in lieu of the first alphanumeric token, where the sensitive token database does not include a record representing the second alphanumeric token. As an illustrative example, the model orchestration platform 1402 can detect that the prompt includes sensitive information (e.g., PII), such as users' personal names, social security numbers, or birthdays. By masking such information, the model orchestration platform 1402 can ensure that such sensitive information is not leaked to or provided to external systems (e.g., via an API request to an externally housed model), thereby mitigating security breaches associated with model use.

In some implementations, process 1700 can remove forbidden tokens from the user's prompt. For example, the model orchestration platform 1402 determines that the prompt includes a forbidden token. The model orchestration platform 1402 can generate the modified prompt by omitting the forbidden token. As an illustrative example, the model orchestration platform 1402 can determine whether the user's prompt includes inappropriate or impermissible tokens, such as words, phrases, or sentences that are associated with swear words. The model orchestration platform 1402 can mask or replace such inappropriate tokens, thereby improving the quality of inputs to the target model and preventing unintended or undesirable outputs as a result.

In some implementations, process 1700 can inject a trace token into the user's prompt to improve model evaluation and tracking capabilities. For example, the model orchestration platform 1402 can generate a trace token comprising a traceable alphanumeric token. The model orchestration platform 1402 can generate the modified prompt to include the trace token. As an illustrative example, the model orchestration platform 1402 can inject (e.g., by modifying the prompt to include) tokens, such as characters, words, or phrases, that are designed to enable tracking, evaluation, or monitoring of the prompt any resulting outputs. By doing so, the model orchestration platform 1402 enables evaluation and troubleshooting with respect to model outputs (e.g., to detect or prevent prompt manipulation or interception of the prompt or output by malicious actors).

At act 1712, process 1700 can compare the performance metric value with a performance criterion (e.g., a threshold metric value) that is related to the model associated with the output generation request. For example, the model orchestration platform 1402 compares the performance metric value of the output generation request with a first performance criterion associated with the first model of a plurality of models. As an illustrative example, the model orchestration platform 1402 can compare a requirement of system resources for execution of the model using the given prompt with a threshold value (e.g., as associated with the model, the user, and/or the attribute of the output generation request). For example, the model orchestration platform 1402 can compare an estimated system memory usage for use of the model with an available system memory availability to determine whether the model can be used without adversely affecting the associated computing system. By doing so, the model orchestration platform 1402 can prevent unintended system-wide issues regarding resource use.

In some implementations, process 1700 can generate a cost metric value and determine whether the cost metric value satisfies a threshold cost (e.g., a threshold associated with the performance criterion). For example, the model orchestration platform 1402 generates a cost metric value associated with the estimated resource requirement for the output generation request. The model orchestration platform 1402 can determine a threshold cost associated with the first model. The model orchestration platform 1402 can determine that the cost metric value satisfies the threshold cost. As an illustrative example, the model orchestration platform 1402 can determine a monetary cost associated with running the model with the requested prompt. Based on determining that the cost is greater than a threshold cost (e.g., a remaining budget within the user's allotment), the model orchestration platform 1402 can determine not to provide the prompt to the model. Additionally or alternatively, the model orchestration platform 1402 can determine that the cost is less than the threshold cost and, in response to this determination, proceed to provide the prompt to the model. By doing so, the model orchestration platform 1402 provides improved flexibility and/or control over the use of system resources (including memory, computational, and/or financial resources), enabling optimization of the associated development pipeline.

At act 1714, process 1700 can provide the prompt (e.g., as modified by suitable prompt validation models) to the model generate the requested output. For example, in response to determining that the performance metric satisfies the first performance criterion, the model orchestration platform 1402 provides the prompt to the first model to generate an output. As an illustrative example, the model orchestration platform 1402 can generate a vector representation of the prompt (e.g., using a vectorization system and/or the vector database) and provide the vector representation to a transformer model and/or a neural network associated with an model (e.g., through an API call). By doing so, the model orchestration platform 1402 can generate a resulting output (e.g., generated code or natural language data) in response to a query submitted by the user within the prompt.

At act 1716, process 1700 can validate the output from the model. For example, the model orchestration platform 1402 provides the output to an output validation model to generate a validation indicator associated with the output. As an illustrative example, the model orchestration platform 1402 can validate the output of the model to prevent security breaches or unintended behavior. For example, the model orchestration platform 1402 can review output text using a toxicity detection model and determine an indication of whether the output is valid or invalid. In some implementations, the model orchestration platform 1402 can determine a sentiment associated with the output and modify the output (e.g., by resubmitting the output to the model) to modify the sentiment associated with the output. By doing so, the model orchestration platform 1402 can ensure the accuracy, utility, and reliability of generated data.

In some implementations, process 1700 can validate the output by generating and testing an executable program compiled on the basis of the output. For example, the model orchestration platform 1402 extracts a code sample from the output, where the code sample includes code for a software routine. The model orchestration platform 1402 can compile, within a virtual machine of the system, the code sample to generate an executable program associated with the software routine. The model orchestration platform 1402 can execute, within the virtual machine, the software routine using the executable program. The model orchestration platform 1402 can detect an anomaly in the execution of the software routine. In response to detecting the anomaly in the execution of the software routine, the model orchestration platform 1402 can generate the validation indicator to include an indication of the anomaly. As an illustrative example, the model orchestration platform 1402 can generate a validation indicator based on determining that the output contains code and testing the code (and/or the compiled version of the code) in an isolated environment for potential adverse effects, viruses, or bugs. By doing so, the model orchestration platform 1402 can ensure the safety and security of generated code, thereby protecting the software development pipeline from security breaches or unintended behavior.

At act 1718, process 1700 can enable access to the output by the user. For example, in response to generating the validation indicator, the model orchestration platform 1402 transmits the output to a server system enabling access to the output by the user device. As an illustrative example, the model orchestration platform 1402 can provide the output to a server that enables users to access the output data (e.g., through login credentials) for consumption of the data and/or use in other downstream applications. As such, the model orchestration platform 1402 provides a robust, flexible, and modular way to validate model-generated content.

Figure 18:
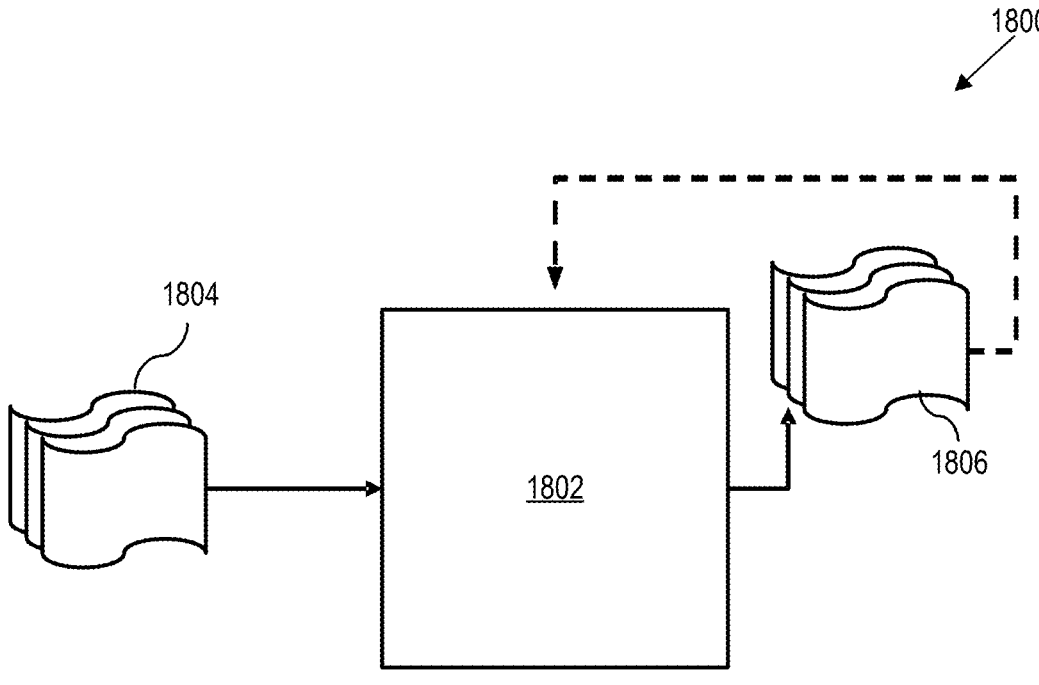
FIG. 18 shows a diagram of an artificial intelligence (AI) model, in accordance with some implementations of the present technology.

FIG. 18 shows a diagram of an AI model, in accordance with some implementations of the present technology. AI model 1800 is shown. In some implementations, AI model 1800 can be any AI model. In some implementations, AI model 1800 can be part of, or work in conjunction with, server computing device 306 (FIG. 3). For example, server computing device 306 can store a computer program that can use information obtained from AI model 1800, provide information to AI model 1800, or communicate with AI model 1800. In other implementations, AI model 1800 can be stored in database 308 and can be retrieved by server computing device 306 to execute/process information related to AI model 1800, in accordance with some implementations of the present technology.

In some implementations, AI model 1800 can be a machine learning model 1802. Machine learning model 1802 can include one or more neural networks or other machine learning models. As an example, neural networks can be based on a large collection of neural units (or artificial neurons). Neural networks can loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit can have a summation function that combines the values of all its inputs together. In some implementations, each connection (or the neural unit itself) can have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, backpropagation techniques can be utilized by the neural networks, where forward stimulation is used to reset weights on the "front" neural units. In some implementations, stimulation and inhibition for neural networks can be more free-flowing, with connections interacting in a more chaotic and complex fashion.

As an example, with respect to FIG. 18, machine learning model 1802 can take inputs 1804 and provide outputs 1806. In one use case, outputs 1806 can be fed back to machine learning model 1802 as input to train machine learning model 1802 (e.g., alone or in conjunction with user indications of the accuracy of outputs 1806, labels associated with the inputs, or other reference feedback information). In another use case, machine learning model 1802 can update its configurations (e.g., weights, biases, or other parameters) based on its assessment of its prediction (e.g., outputs 1806) and reference feedback information (e.g., user indication of accuracy, reference labels, or other information). In another use case, where machine learning model 1802 is a neural network, connection weights can be adjusted to reconcile differences between the neural network's prediction and the reference feedback. In a further use case, one or more neurons (or nodes) of the neural network can require that their respective errors are sent backward through the neural network to them to facilitate the update process (e.g., backpropagation of error). Updates to the connection weights can, for example, be reflective of the magnitude of error propagated backward after a forward pass has been completed. In this way, for example, the machine learning model 1802 can be trained to generate better predictions.

As an example, where the prediction models include a neural network, the neural network can include one or more input layers, hidden layers, and output layers. The input and output layers can respectively include one or more nodes, and the hidden layers can each include a plurality of nodes. When an overall neural network includes multiple portions trained for different objectives, there may or may not be input layers or output layers between the different portions. The neural network can also include different input layers to receive various input data. Also, in differing examples, data can be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links can correspond to the number of the nodes included in the subsequent layer. For example, in adjacent fully connected layers, each node of a current layer can have a respective link to each node of the subsequent layer, noting that in some examples such full connections can later be pruned or minimized during training or optimization. In a recurrent structure, a node of a layer can be again input to the same node or layer at a subsequent time, while in a bi-directional structure, forward and backward connections can be provided. The links are also referred to as connections or connection weights, referring to the hardware-implemented connections or the corresponding "connection weights" provided by those connections of the neural network. During training and implementation, such connections and connection weights can be selectively implemented, removed, and varied to generate or obtain a resultant neural network that is thereby trained and that can be correspondingly implemented for the trained objective, such as for any of the above example recognition objectives.

Dynamic Agent Selection for the Model Orchestration Platform

The model orchestration platform disclosed herein enables dynamic model (e.g., LLM, agent) selection for processing inputs (e.g., prompts) to generate associated outputs (e.g., responses to the prompts). For example, the model orchestration platform can redirect a prompt to a second model (e.g., distinct from the first model selected by the user within the output generation request). Additionally or alternatively, the model orchestration platform operates with other suitable machine learning model algorithms, inputs (e.g., including images, multimedia, or other suitable data), and outputs (e.g., including images, video, or audio). By doing so, the model orchestration platform 1402 can mitigate adverse system performance (e.g., excessive incurred costs or overloaded memory devices or processors) by estimating system effects associated with the output generation request (e.g., the prompt) and generating an output using an appropriate model.

Figure 19:
FIG. 19 shows a schematic of a data structure illustrating a system state and associated threshold metric values, in accordance with some implementations of the present technology.

FIG. 19 shows a schematic of a data structure 1900 illustrating a system state and associated threshold metric values, in accordance with some implementations of the present technology. For example, the data structure 1900 includes usage values 1904 and maximum values 1906 for performance metrics 1902. The model orchestration platform 1402 can determine threshold metric values based on data associated with system performance (e.g., at the time of receipt of the output generation request). By doing so, the model orchestration platform 1402 enables dynamic evaluation of requests for output generation, as well as dynamic selection of suitable models with which to process such requests.

As discussed in relation to FIG. 15 above, a performance metric can include an attribute of a computing system that characterizes system performance. For example, the performance metric is associated with monetary cost, system memory, system storage, processing power (e.g., through a CPU or a GPU), and/or other suitable indications of performance. The system state (e.g., a data structure associated with the system state) can include information relating to performance metrics 1902, such as CPU usage, memory usage, hard disk space usage, a number of input tokens (e.g., system-wide, across one or more models associated with the model orchestration platform 1402), and/or cost incurred. The data structure 1900 corresponding to the system state can include usage values 1904 and maximum values 1906 associated with the respective performance metrics 1902.

In some implementations, the model orchestration platform 1402 determines a threshold metric value (e.g., of the threshold metric values 1908 of FIG. 19) based on a usage value and maximum value for a corresponding performance metric (e.g., of performance metrics 1902). For example, the model orchestration platform 1402 determines a cost incurred up to a given point of time or within a predetermined time period associated with machine learning models of the model orchestration platform 1402. The cost incurred can be stored as a usage value within the system state. For example, the usage value includes an indication of a sum of metric values for previous output generation requests, inputs (e.g., textual or non-textual prompts), or output generation instances associated with the system. The system state can include an indication of an associated maximum, minimum, or otherwise limiting value for the cost incurred or other performance metrics (e.g., an associated maximum value). By storing such information, the model orchestration platform 1402 can determine a threshold metric value associated with generating an output using the selected model based on the prompt.

For example, the model orchestration platform 1402 determines the threshold metric value based on a difference between the usage value and the maximum value. The model orchestration platform 1402 can determine a threshold metric value associated with a cost allowance for processing a prompt based on a difference between a maximum value (e.g., a maximum budget) and a usage value (e.g., a cost incurred). As such, the model orchestration platform 1402 can handle situations where the system's performance metric changes over time.

In some implementations, the model orchestration platform 1402 can determine or predict a threshold metric value based on providing the output generation request and the system state to a threshold evaluation model. For example, the model orchestration platform 1402 can provide the input, the indication of a selected model, and information of the system state to the threshold evaluation model to predict a threshold metric value. To illustrate, the model orchestration platform 1402 can predict a future system state (e.g., a time-series of performance metric values associated with the system) based on the output generation request, the current system state, and the selected model. The model orchestration platform 1402 can estimate an elapsed time for the generation of output using the requested model; based on this elapsed time, the model orchestration platform 1402 can determine a predicted system state throughout the output generation, thereby enabling more accurate estimation of the threshold metric value. The threshold evaluation model can be trained on historical system usage (e.g., performance metric value) information associated with previous output generation requests. As such, the model orchestration platform 1402 enables the determination of threshold metric values on a dynamic, pre-emptive basis, thereby improving the ability of the model orchestration platform 1402 to predict and handle future performance issues.

In some implementations, the system state is generated with respect to a particular user and/or group of users. For example, the model orchestration platform 1402 determines a system state associated with a subset of resources assigned to a given user or group of users. To illustrate, the model orchestration platform 1402 can determine a maximum cost value associated with output generation for a given user or subset of users of the model orchestration platform 1402. For example, the maximum cost value corresponds to a budget (e.g., a finite set of monetary resources) assigned to a particular group of users, as identified by associated user identifiers. Furthermore, the usage value can be associated with this particular group of users (e.g., corresponding to the generation of outputs using models by users of the group). As such, the model orchestration platform 1402 can determine an associated threshold metric value that is specific to the particular associated users. By doing so, model orchestration platform 1402 enables flexible, configurable requirements and limits to system resource usage based on the identity of users submitting prompts.

In some implementations, the model orchestration platform 1402 determines an estimated performance metric value, as discussed in relation to FIG. 15. For example, the model orchestration platform 1402 generates the estimated performance metric value based on a performance metric evaluation model. A performance metric evaluation model can include an artificial intelligence model (e.g., or another suitable machine learning model) that is configured to predict performance metric values associated with generating outputs using machine learning models (e.g., agents, LLMs). For example, the performance metric evaluation model can generate an estimated cost value for processing a prompt using the first model to generate the associated output. In some implementations, the performance metric evaluation model is trained using previous prompts and associated performance metric values. The performance metric evaluation model can be specific to a particular machine learning model or LLM. Additionally or alternatively, the performance metric evaluation model accepts an indication of a machine learning model as an input to generate the estimated performance metric value.

In some implementations, the model orchestration platform 1402 evaluates the suitability of a prompt for a given model based on comparing a composite metric value with a threshold composite value. For example, the model orchestration platform 1402 generates a composite performance metric value based on a combination of performance metrics (e.g., the performance metrics 1902 as shown in FIG. 19). To illustrate, the model orchestration platform 1402 can generate a composite performance metric based on multiple performance metrics of the computing system associated with the machine learning models. Based on the metric, the model orchestration platform 1402 can generate an estimated composite metric value corresponding to the composite metric (e.g., by calculating a product of values associated with the respective performance metrics) and compare the estimated composite metric value with an associated threshold metric value. As such, model orchestration platform 1402 enables a more holistic evaluation of the effect of a given output generation request on system resources, thereby improving the accuracy and efficiency of the model orchestration platform 1402 in selecting a suitable model. In some implementations, the model orchestration platform 1402 can assign particular performance metrics a respective weight and calculate a value for the composite metric accordingly. Accordingly, the model orchestration platform 1402 enables the prioritization of relevant performance metrics (e.g., cost) over other metrics (e.g., memory usage) according to system requirements.

FIG. 20 shows a flow diagram illustrating a process 2000 for dynamic selection of models based on evaluation of user inputs (e.g., prompts), in accordance with some implementations of the present technology. For example, the process 2000 enables selection of a model for generation of an output (e.g., software-related code samples) based on an input (e.g., a text-based prompt) to prevent overuse of system resources (e.g., to ensure that sufficient system resources are available to process the request).

At act 2002, the process 2000 can receive an input for generation of an output using a model. For example, the process 2000 receives, from a user device, an output generation request comprising an input (e.g., prompt) for generation of an output using a first model (e.g., an agent) of a plurality of models. As an illustrative example, the model orchestration platform 1402 (e.g., through the communication engine 1412) receives a prompt indicating a desired output, such as a text-based instruction for the generation of software-related code samples (e.g., associated with a particular function). The output generation request can include an indication of a selected model (e.g., agent) for processing the prompt. As such, the model orchestration platform 1402 can evaluate the effect of generating an output using the selected model based on the prompt (e.g., or other suitable inputs) on the basis of the content or nature of the request (e.g., based on a user identifier associated with the request).

At act 2004, the process 2000 can determine a performance metric associated with processing the output generation request. For example, the process 2000 determines a performance metric associated with processing the output generation request. As an illustrative example, the model orchestration platform 1402 can determine one or more performance metrics that characterize the behavior of the system (e.g., when providing inputs to a model for generation of an output). Such performance metrics can include CPU utilization, cost (e.g., associated with the operation of the system and/or the associated models), memory usage, storage space, and/or number of input or output tokens associated with MODELs. In some implementations, the model orchestration platform 1402 (e.g., through the performance engine 1418) determines multiple performance metrics (e.g., associated with the system state) for evaluation of the effects (e.g., of generating an output based on the prompt) on the system.

At act 2006, the process 2000 can determine a system state associated with system resources. For example, the process 2000 determines a system state associated with system resources for processing requests using the first model of the plurality of models. As an illustrative example, the performance engine 1418 dynamically determines a state of the system (e.g., with respect to the determined performance metrics). The system state can include an indication of values associated with performance metrics (e.g., usage values, such as CPU utilization metric values, memory usage values, hard disk space usage values, numbers of input tokens previously submitted to models within the system, and/or values of incurred cost). For example, the model orchestration platform 1402, through communication engine 1412 can query a diagnostic tool or program associated with the computing system and/or an associated database to determine values of the performance metrics. In some implementations, the system state includes maximum, minimum, or other limiting values associated with the performance metric values (e.g., a maximum cost/budget, or a maximum available memory value). By receiving information relating to the system state and associated restrictions, the model orchestration platform 1402 can evaluate the received prompt to determine whether the selected model is suitable for generating an associated output.

At act 2008, the process 2000 can calculate a threshold metric value (e.g., associated with the output generation request). For example, the process 2000 can calculate, based on the system state, a threshold metric value for the determined performance metric. As an illustrative example, the model orchestration platform 1402 (e.g., through the performance engine 1418) determines an indication of computational or monetary resources available for processing the input or prompt (e.g., to generate an associated output). The model orchestration platform 1402 can determine an available budget (e.g., a threshold cost metric) and/or available memory space (e.g., remaining space within a memory device of the system) for processing the request. By doing so, the model orchestration platform 1402 can evaluate the effect of generating an output based on the prompt using the specified model (e.g., agent) with respect to system requirements or constraints.

In some implementations, the model orchestration platform 1402 (e.g., through performance engine 1418) can determine the threshold metric value to include the allowance value. For example, the performance engine 1418 determines that the performance metric corresponds to a cost metric. The performance engine 1418 can determine a maximum cost value associated with output generation associated with the system. The performance engine 1418 can determine, based on the system state, a sum of cost metric values for previous output generation requests associated with the system. The performance engine 1418 can determine, based on the maximum cost value and the sum, an allowance value corresponding to the threshold metric value. The performance engine 1418 can determine the threshold metric value comprising the allowance value. As an illustrative example, the performance engine 1418 determines a remaining budget associated with model operations. By doing so, the performance engine 1418 can mitigate cost overruns associated with output text generation, thereby improving the efficiency of the model orchestration platform 1402.

In some implementations, the model orchestration platform 1402 (e.g., through the performance engine 1418) can determine the threshold metric value based on a user identifier and corresponding group associated with the output generation request. For example, the model orchestration platform 1402 determines, based on the output generation request, a user identifier associated with a user of the user device. The performance engine 1418 can determine, using the user identifier, a first group of users, wherein the first group comprises the use. The performance engine 1418 can determine the allowance value associated with the first group of users. As an illustrative example, the performance engine 1418 determines an allowance value (e.g., a budget) that is specific to a group of users associated with the user identifier (e.g., a username) of the output generation request. As such, the model orchestration platform 1402 enables tracking of resources assigned or allocated to particular groups of users (e.g., teams), thereby improving the flexibility of allocation of system resources.

In some implementations, the model orchestration platform 1402 (e.g., through the performance engine 1418) can determine the threshold metric value based on a usage value for a computational resource. For example, the model orchestration platform 1402 determines that the performance metric corresponds to a usage metric for a computational resource. The performance engine 1418 can determine an estimated usage value for the computational resource based on the indication of an estimated computational resource usage by the first model (e.g., agent) when processing the input (e.g., prompt) with the first model. The performance engine 1418 can determine a maximum usage value for the computational resource. The performance engine 1418 can determine, based on the system state, a current resource usage value for the computational resource. The performance engine 1418 can determine, based on the maximum usage value and the current resource usage value, an allowance value corresponding to the threshold metric value. The performance engine 1418 can determine the threshold metric value comprising the allowance value. As an illustrative example, the performance engine 1418 can determine a threshold metric value based on a remaining available set of resources that are idle (e.g., processors that are not being used or free memory). As such, the model orchestration platform 1402 enables dynamic evaluation of the state of the system for determination of whether sufficient resources are available for processing the output.

At act 2010, the process 2000 can determine an estimated performance metric value associated with processing the output generation request. For example, the process 2000 determines a first estimated performance metric value for the determined performance metric based on an indication of an estimated resource usage by the first model when processing the input included in the output generation request. As an illustrative example, the model orchestration platform 1402 determines a prediction for resource usage for generating an output using the indicated model (e.g., an agent associated with the determined performance metric). The model orchestration platform 1402 (e.g., through the performance engine 1418) can determine a number of input tokens within the input or prompt and predict a cost and/or a memory usage associated with processing the prompt using the selected model. By doing so, the model orchestration platform 1402 can evaluate the effects of processing the input on system resources for evaluation of the suitability of the model for generating the requested output.

In some implementations, the model orchestration platform 1402 generates a composite performance metric value based on more than one performance metric. For example, the performance engine 1418 determines that the performance metric includes a composite metric associated with a plurality of system metrics. The performance engine 1418 can determine, based on the system state, a threshold composite metric value. The performance engine 1418 can determine a plurality of estimated metric values corresponding to the plurality of system metrics. Each estimated metric value of the plurality of estimated metric values can indicate a respective estimated resource usage associated with processing the output generation request with the first model. The performance engine 1418 can determine, using the plurality of estimated metric values, a composite metric value associated with processing the output generation request with the first model. The performance engine 1418 can determine the first estimated performance metric value comprising the composite metric value. As an illustrative example, the model orchestration platform 1402 can generate a geometric mean of estimated values associated with various performance metrics (e.g., estimated memory usage, CPU utilization, and/or cost) and determine an associated metric. In some implementations, the model orchestration platform 1402 can generate a weighted geometric mean based on weightings assigned to respective values of the performance metric. By doing so, the model orchestration platform 1402 enables flexible, targeted evaluation of system behavior associated with generating outputs using models.

In some implementations, the model orchestration platform 1402 generates a performance metric value corresponding to a number of input or output tokens. For example, the first estimated performance metric value corresponds to a number of input or output tokens, and wherein the threshold metric value corresponds to a maximum number of tokens. As an illustrative example, the model orchestration platform 1402 determines a number of input tokens (e.g., words or characters) associated with the input or prompt. Additionally or alternatively, the model orchestration platform 1402 determines (e.g., predicts or estimates) a number of output tokens associated with the output in response to the prompt. For example, the model orchestration platform 1402 can estimate a number of output tokens by identifying instructions or words associated with prompt length within the prompt (e.g., an instruction to keep the generated output within a particular limit). By doing so, the model orchestration platform 1402 can compare the number of tokens associated with processing the prompt with an associated threshold number of tokens to determine whether the selected model is suitable for the generation task. As such, the model orchestration platform 1402 can limit wordy or excessive output generation requests, thereby conserving system resources.

In some implementations, the model orchestration platform 1402 generates the estimated performance metric value based on providing the prompt to an evaluation model. For example, the model orchestration platform 1402 provides the input (e.g., the prompt) and an indication of the first model (e.g., agent) to a performance metric evaluation model to generate the first estimated performance metric value. To illustrate, the model orchestration platform 1402 can provide the input to a machine learning model (e.g., an artificial neural network) to generate an estimate of resources used (e.g., an estimated memory usage or cost) based on historical data associated with output generation. By doing so, the model orchestration platform 1402 improves the accuracy of estimated performance metric value determination, thereby mitigating overuse of system resources.

In some implementations, the model orchestration platform 1402 trains the evaluation model based on previous inputs (e.g., prompts) and associated performance metric values. For example, the model orchestration platform 1402 obtains, from a first database, a plurality of training prompts and respective performance metric values associated with providing respective training prompts to the first model. The model orchestration platform 1402 can provide the plurality of training prompts and respective performance metric values to the performance metric evaluation model to train the performance metric evaluation model to generate estimated performance metric values based on prompts. For example, the model orchestration platform 1402 can retrieve previous prompts submitted by users, as well as previous system states when the prompts are submitted to the associated model (e.g., agent). Based on these previous prompts and system states, the model orchestration platform 1402 can train the performance metric evaluation model to generate estimated performance metrics based on inputs.

At act 2012, the process 2000 can compare the first estimated performance metric value with the threshold metric value. As an illustrative example, the model orchestration platform 1402 can determine whether the first estimated performance metric value is greater than, equal to, and/or less than the threshold metric value. At act 2014, the process 2000 can determine whether the first estimated performance metric value satisfies the threshold metric value. (e.g., by determining that the estimated resource usage value is less than or equal to a threshold metric value). For example, the model orchestration platform 1402 can determine whether an estimated cost value associated with processing the prompt using the first model is less than or equal to an allowance value (e.g., a remaining balance within a budget). By doing so, the model orchestration platform 1402 can ensure that the prompt is processed when suitable system resources are available.

At act 2016, the process 2000 can provide the input (e.g., prompt) to the first model in response to determining that the first estimated performance metric value satisfies the threshold metric value. For example, in response to determining that the first estimated performance metric value satisfies the threshold metric value, the process 2000 provides the prompt to the first model to generate a first output by processing the input (e.g., prompt) included in the output generation request. As an illustrative example, the model orchestration platform 1402 can transmit the prompt (e.g., through the communication engine 1412 and/or via an associated API) to the first model for generation of an associated output. To illustrate, the model orchestration platform 1402 can generate a vector representation of the prompt (e.g., through word2vec or another suitable algorithm) and generate a vector representation of the output via the first model. By doing so, the model orchestration platform 1402 can process the user's output generation request with available system resources (e.g., monetary resources or computational resources).

At act 2018, the process 2000 can generate the output for display on a device associated with the user. For example, the process 2000 transmits the first output to a computing system enabling access to the first output by the user device. As an illustrative example, the model orchestration platform 1402 (e.g., through the communication engine 1412) can transmit the output from the first model to a computing system (e.g., a server) from which the user can access the generated output (e.g., through an API call and/or via a user interface). By doing so, the model orchestration platform 1402 enables generation of outputs (e.g., natural language outputs) using models specified by the user when system resources are available to process associated prompts.

At act 2020, the process 2000 can determine a second estimated performance metric value associated with a second model (e.g., agent) in response to determining that the first estimated performance metric value does not satisfy the threshold metric value. For example, in response to determining that the first estimated performance metric value does not satisfy the threshold metric value, the process 2000 determines a second estimated performance metric value for the determined performance metric based on an indication of an estimated resource usage by a second model of the plurality of models when processing the prompt included in the output generation request. As an illustrative example, the model orchestration platform 1402 can determine a second estimate for a cost associated with processing the output with the second model and determine whether this cost estimate is consistent with the threshold cost value (e.g., determine whether the cost is less than the budget available to the user for the output generation request).

At act 2022, the process 2000 can compare the second estimated performance metric value with the threshold metric value. For example, at act 2024, the process 2000 can determine whether the second estimated performance metric value satisfies the threshold metric value. As an illustrative example, the model orchestration platform 1402 can determine whether the cost metric value associated with processing the input (e.g., prompt) with the second model is greater than, less than, and/or equal to the threshold metric value (e.g., associated with an allowance or budget). By doing so, the model orchestration platform 1402 can ensure that sufficient system resources are available for processing the prompt using the second model, thereby enabling redirection of output generation requests to an appropriate model when the selected model is unsuitable due to insufficient resource availability.

At act 2026, the process 2000 can generate a second output by providing the prompt to the second model in response to determining that the second estimated performance metric value satisfies the threshold metric value. For example, the process 2000 provides the prompt to the second model to generate a second output by processing the input (e.g., prompt) included in the output generation request. As an illustrative example, the model orchestration platform 1402 (e.g., through the communication engine 1412) can generate vector representations of the prompt and transmit these (e.g., via an API call) to a device associated with the second model for generation of the associated output. By doing so, the model orchestration platform 1402 enables processing of the output generation request using a model (e.g., the second agent) that satisfies system resource limitations or constraints, thereby improving the resilience and efficiency of the model orchestration platform 1402.

In some implementations, the process 2000 can determine the second model based on a selection of the model by the user. For example, in response to determining that the first estimated performance metric value does not satisfy the threshold metric value, the model orchestration platform 1402 transmits a model (e.g., agent) selection request to the user device. In response to transmitting the model selection request, the model orchestration platform 1402 obtains, from the user device, a selection of the second model. The model orchestration platform 1402 can provide the input (e.g., prompt) to the second model associated with the selection. As an illustrative example, the model orchestration platform 1402 can generate a message for the user requesting selection of another model for generation of an output in response to the prompt. In response to the message, the model orchestration platform 1402 can receive instructions from the user (e.g., via a command or function) for redirection of the prompt to another suitable model that satisfies performance requirements for the system.

In some implementations, the process 2000 can determine the second model based on a selection of the model on a GUI (e.g., from a list of models with performance metrics that satisfy the performance requirements). For example, the model orchestration platform 1402, in response to determining that the first estimated performance metric value does not satisfy the threshold metric value, generates, for display on a user interface of the user device, a request for user instructions, wherein the request for user instructions comprises a recommendation for processing the output generation request with the second model of the plurality of models. In response to generating the request for user instructions, the model orchestration platform 1402 can receive a user instruction comprising an indication of the second model. In response to receiving the user instruction, the model orchestration platform 1402 can provide the prompt to the second model. To illustrate, the model orchestration platform 1402 can generate indications of one or more recommended models with estimated performance metric values (e.g., estimated cost values) that are compatible with the associated threshold performance metric (e.g., a threshold cost metric). By doing so, the model orchestration platform 1402 can present options for models (e.g., that satisfy system performance constraints) for processing the user's prompt, conferring the user with increased control over output generation.

At act 2028, the process 2000 can generate the output for display on a device associated with the user. For example, the process 2000 transmits the second output to the computing system enabling access to the second output by the user device. As an illustrative example, the model orchestration platform 1402 (e.g., through communication engine 1412) transmits the second output to a computing system that enables access to the output by the user (e.g., through an associated API or GUI).

At act 2030, the process 2000 can transmit an error message to the computing system in response to determining that the second estimated performance metric value does not satisfy the threshold metric value. As an illustrative example, the model orchestration platform 1402 (e.g., through the communication engine 1412) can generate a message that indicates that the input (e.g., prompt) is unsuitable for provision the second model due to insufficient resources. Additionally or alternatively, the model orchestration platform 1402 can determine a third model (e.g., agent) with satisfactory performance characteristics (e.g., with a third estimated performance metric value that satisfies the threshold metric value). By doing so, the model orchestration platform 1402 enables generation of an output based on the prompt via a model such that system resources are conserved or controlled.

In some implementations, the process 2000 generates a recommendation for a model by providing the output generation request (e.g., the associated prompt) to a selection model. For example, in response to determining that the first estimated performance metric value does not satisfy the threshold metric value, the model orchestration platform 1402 generates, for display on a user interface of the user device, a request for user instructions. The request for user instructions can include a recommendation for processing the output generation request with the second model of the plurality of models. In response to generating the request for user instructions, the model orchestration platform 1402 can receive a user instruction comprising an indication of the second model. In response to receiving the user instruction, the model orchestration platform 1402 can provide the input (e.g., prompt) to the second model. As an illustrative example, the model orchestration platform 1402 can evaluate the prompt for selection of a model that is compatible with resource requirements and/or a task associated with the output generation request. For example, the model orchestration platform 1402 can determine an attribute associated with the prompt (e.g., that the prompt is requesting the generation of a code sample) and reroute the prompt to a model that is configured to generate software-related outputs. By doing so, the model orchestration platform 1402 can recommend models that are well-suited to the user's requested task, thereby improving the utility of the disclosed model orchestration platform.

Figure 21:
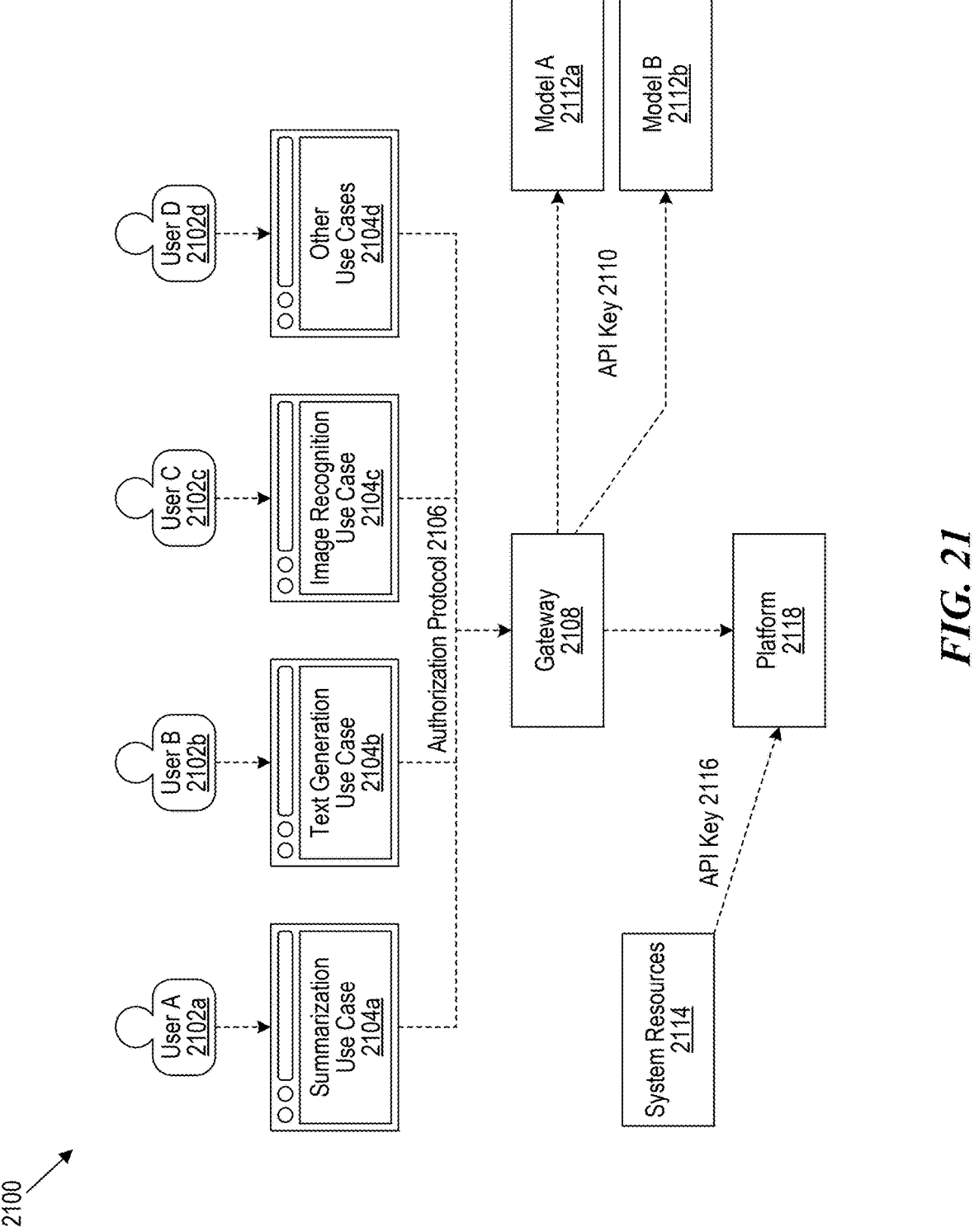
FIG. 21 shows a schematic illustrating an example environment of a platform for dynamically selecting models and infrastructure to process a request with the selected models, in accordance with some implementations of the present technology.

Dynamic Resource-Sensitive Agent Selection Using the Model Orchestration Platform FIG. 21 is an illustrative diagram illustrating an example environment 2100 of a platform 2118 for dynamically selecting models and infrastructure to process a request with the selected models, in accordance with some implementations of the present technology. Environment 2100 includes users 2102a-d, use cases 2104a-d, authorization protocol 2106, gateway 2108, API key 2110, 2116, models 2112a-b, system resources 2114, and platform 2118. Platform 2118 is implemented using components of example devices 200 and computing devices 302 illustrated and described in more detail with reference to FIG. 2 and FIG. 3, respectively. Platform 2118 can be the same as or similar to model orchestration platform 1402 with reference to FIG. 14. Likewise, implementations of example environment 2100 can include different and/or additional components or can be connected in different ways.

Users 2102a-d can each represent different individuals or entities who interact with the platform by submitting inputs (e.g., input inquiry, prompt, query) in an output generation request to be processed subsequently by the platform 2118 to select appropriate models and resources. Each user 2102a-d can have distinct requirements and use cases, such as summarization use case 2104a, text generation use case 2104b, image recognition use case 2104c, and/or other use cases 2104d. For example, the summarization use case 2104a can include generating a concise summary of a given text input. The user 2102a submits a text document or a large body of text, and the platform 2118 processes the text document to produce a shorter version that captures the representative points and information of the text document. Additionally, the text generation use case 2104b can include generating new text based on a given prompt or input. The user 2102b provides a starting sentence, topic, or context, and the platform generates coherent and contextually relevant text. For instance, a user can provide a prompt like "Once upon a time in a faraway land," and the platform generates a continuation of the story. Further, the image recognition use case 2104c can include analyzing and identifying objects, features, or patterns within an image. The user 2102c submits an image, and the platform processes the image to recognize and label the contents. For example, a user can upload a photo of a crowded street, and the platform identifies and labels objects such as cars, pedestrians, traffic lights, and buildings.

The authorization protocol 2106 ensures that only authorized users and devices can access the platform 2118 by managing authentication and authorization processes, verifying user identities, and granting appropriate access rights based on predefined policies. The authorization protocol 2106 can include one or more of, for example, multi-factor authentication, OAuth tokens, or other security measures to ensure access control. In some implementations, the authorization protocol can also include biometric verification or hardware-based security modules for improved security. Examples of authorization protocol 2106 and methods of implementing authorization protocol 2106 are discussed with reference to FIG. 22.

The gateway 2108 is an entry point for output generation requests submitted by users 2102a-d, routing the output generation requests to the platform 2118. The gateway 2108 can perform load balancing (i.e., distributing requests across multiple platform instances to improve efficiency of resource use and prevent bottlenecks), data transformations (i.e., converting and normalizing input data for compatibility with the platform), and/or protocol translations (e.g., converting HTTP requests to gRPC) to support the interactions between users 2102a-d and the platform 2118. In some implementations, the gateway 2108 is a microservices-based architecture that allows for scalable and modular handling of requests. For example, when user 2102a submits a text summarization request, the gateway 2108 balances the load by directing the request to an available instance (e.g., platform 2118), transforms the data format if needed, and/or translates the protocol to ensure compatibility before transmitting the request to the platform 2118. The platform 2118 processes the request, and the gateway 2108 returns the summarized text to the user.

In some implementations, when a user submits a request, the gateway 2108 first intercepts the request and checks for the presence of a valid API key 2110. The API key 2110, which serves as a unique identifier, is verified against the authorization protocol 2106. API key 2110 is used to authenticate (e.g., via authorization protocol 2106) and authorize API requests to ensure that only valid requests from authorized users or systems are processed by the platform. Once authenticated, the authorization protocol 2106 can check the associated permissions and roles linked to the API key 2110 to determine if the user has the necessary access rights to perform the requested action. If the API key 2110 is valid and the user is authorized, the gateway 2108 routes the request to the appropriate components within the platform 2118. This interaction ensures that only authorized users can access the platform's resources, maintaining the security and integrity of the system. In some implementations, the authorization protocol 2106 can also enforce additional security measures, such as rate limiting and logging, to further protect the platform from unauthorized access and abuse. In some implementations, API key 2110 can be supplemented with JWT (JSON Web Tokens) for stateless authentication and improved security.

Models 2112*a-b* are the different models (e.g., AI models, machine learning models, LLMs) accessible by the platform 2118. The models 2112*a-b* can have different capabilities and performance properties or attributes. The platform 2118 dynamically selects the most appropriate model(s) within models 2112*a-b* based on the output generation request of the user 2102*a-d* that specifies the use case 2104*a-d*. Methods of dynamically selecting the most appropriate model(s) is discussed in further detail with reference to FIG. 22. The models 2112*a-b* can include, for example, deep learning models, decision trees, or ensemble methods, depending on the use case 2104*a-d*. In some implementations, the platform can use a model registry to manage and version control the models 2112*a-b* to ensure that the most up-to-date and accurate versions of models 2112*a-b* are used for processing the output generation request.

Similarly to API key 2110, API key 2116 can be used to verify the system resources 2114 accessible by the users 2102*a-d*. System resources 2114 include the computational and storage resources used to process output generation request, encompassing CPU, GPU, memory, and/or other software, hardware, and/or network components that the platform allocates dynamically. The platform can use container orchestration tools such as KUBERNETES to manage the system resources 2114. In some implementations, the platform could leverage cloud-based infrastructure for elastic scaling and cost efficiency.

FIG. 22 is a flow diagram illustrating a process 2200 for the dynamic selection of models and infrastructure to process the request with the selected models based on evaluation of user prompts, in accordance with some implementations of the present technology. In some implementations, the process 2200 is performed by components of example devices 200 and computing devices 302 illustrated and described in more detail with reference to FIG. 2 and FIG. 3, respectively. Likewise, implementations can include different and/or additional operations or can perform the operations in different orders.

In operation 2202, the system receives, from a computing device, an output generation request including an input (e.g., a prompt, query, input query, request) for generation of an output using one or more models (e.g., AI models) of a plurality of models. In some implementations, at least one AI model in the plurality of AI models is an LLM. The request can be received, for example, via an API endpoint exposed by a gateway (e.g., gateway 2108), which can be the entry point for incoming output generation request. The output generation request can include various parameters such as the type of output desired (e.g., text, image, or data), specific instructions or constraints, and/or metadata about the requestor.

In some implementations, the output generation request includes a predefined query context (e.g., metadata about the requestor) corresponding to a user of the computing device. The predefined query context is a vector representation of one or more expected values for the set of output attributes of the output generation request. The query context can include various types of metadata, such as the user's preferences, historical interaction data, or specific constraints and requirements for the output. For example, if the requestor is a user seeking a text summary, the query context can include information about the preferred summary length, the level of detail required, and any specific sections of the text that should be prioritized.

The vector representation of the query context is typically generated using techniques such as word embeddings, sentence embeddings, or other forms of vectorization that capture the semantic meaning and relationships of the metadata. Text vectorization transforms textual data into a numerical format. The pre-defined query context can be preprocessed, which can include tokenization, normalization, and/or stop word removal. Tokenization is the process of breaking down text into smaller units called tokens. These tokens can be words, phrases, or even individual characters. For instance, the sentence "The quick brown fox jumps over the lazy dog" can be tokenized into individual words like "The", "quick", "brown", "fox", "jumps", "over", "the", "lazy", and "dog". Normalization converts text into a consistent format, making the text easier to process. This can include converting all characters to lowercase, removing punctuation, expanding contractions (e.g., "don't" to "do not"), and handling special characters. Normalization ensures uniformity in the text, reducing variations that could lead to inaccuracies in analysis. For example, normalizing "Don't" and "don't" can result in both being converted to "do not". Stop word removal is the process of filtering out common words that carry little semantic value and are often considered irrelevant for text analysis. These words include "the", "is", "in", "and", etc. Removing stop words helps in focusing on the more meaningful parts of the text. For example, in the sentence "The quick brown fox jumps over the lazy dog", removing stop words would result in "quick", "brown", "fox", "jumps", "lazy", and "dog".

This vector is used to inform and guide the AI models during the output generation process. For instance, a model can adjust its text generation parameters to produce a summary that aligns with the user's historical or recorded preferences for length and detail. The use of a predefined query context allows the system to provide more personalized and contextually relevant outputs, enhancing the overall user experience. Additionally, the query context can be dynamically updated based on the user's interactions and feedback, allowing the system to continuously learn and improve its performance.

In operation 2204, using the prompt of the output generation request, the system generates expected values for a set of output attributes (e.g., output properties, features) of the output generation request. The generated expected values for the set of output attributes of the output generation request can indicate: (1) a type of the output generated from the prompt (e.g., text generation, summarization, image recognition, length of output, format, tone) and (2) a threshold response time of the generation of the output (e.g., low latency, high latency). Natural language processing (NLP) techniques, such as tokenization, part-of-speech tagging, and named entity recognition, can be used to identify the semantic structure and intent of the prompt. Based on this analysis, the system generates expected values for the output attributes.

The type of output refers to the specific format or nature of the generated content. For instance, the system can determine whether the output should be a text summary, a detailed report, an image, or a data visualization. The determination is based on the prompt's content and any predefined query context provided in the request. The system can use classification algorithms or predefined rules to categorize the prompt and assign the appropriate output type. For example, a prompt asking for a summary of a document can result in the system generating a concise text summary, while a prompt requesting an analysis of sales data can lead to the creation of a graphical report.

The threshold response time is an attribute that specifies the maximum allowable time for generating the output. The threshold response time ensures that the system meets performance requirements and provides timely responses to user requests. The system can calculate the threshold response time based on factors such as the complexity of the prompt, the computational resources available, and any user-specified constraints. For instance, a simple text generation task can have a shorter threshold response time compared to a complex image recognition task that uses extensive processing. The threshold response time can be dynamically adjusted based on a current load or resource availability of the system. For example, the system continuously monitors metrics such as CPU and GPU utilization, memory usage, network bandwidth, and active requests. When high load or limited resources are detected, the system increases the threshold response time for new requests to balance the load and prevent delays. Conversely, during low demand periods, the system decreases the threshold response time to provide faster responses. The system can prioritize requests based on the importance, assigning shorter response times to high-priority requests and longer times to lower-priority ones.

In operation 2206, for each particular AI model in the plurality of AI models, the system determines capabilities of the particular AI model. The capabilities can include, for example, (1) values of a set of estimated performance metrics for processing requests using the particular AI model (e.g., the abilities of the models on the platform), and/or (2) values of a set of system resource metrics indicating an estimated resource usage of available system resources for processing the requests using the particular AI model. The available system resources can include hardware resources, software resources, and/or network resources accessible by the computing device to process the output generation request using the particular AI model. Hardware resources can include resources beyond physical hardware, such as virtual machines (VMs). A VM is a software-based emulation of a physical computer that runs an operating system and applications just like a physical computer. Multiple VMs are able to run on a single physical machine, sharing the physical machine's resources such as CPU, memory, and storage. Each VM operates independently and can run different operating systems and applications, and are thus commonly used for tasks such as testing, development, and running multiple applications on a single hardware platform.

The values of the set of estimated performance metrics for each particular AI model in the plurality of AI models can include, for example, response time, accuracy, and/or latency. For example, the system can analyze the model's accuracy in generating text summaries, its response time for image recognition tasks, or its throughput in handling multiple concurrent requests.

The values of the set of system resource metrics for each particular AI model in the plurality of AI models can include, for example, Central Processing Unit (CPU) usage, Graphical Processing Unit (GPU) usage, memory usage, cost, power consumption, and/or network bandwidth. The system assesses the resource consumption patterns of each AI model, considering factors like computational intensity, memory footprint, and data transfer requirements. For instance, a deep learning model for image recognition can have high GPU and memory usage, while an NLP model can use significant CPU and network bandwidth for handling large text datasets.

To determine the capabilities of each AI model, the system can examine the model's architecture (e.g., the number of layers in a neural network), configuration (e.g., the types of operations the model performs), and dependencies (e.g., dependency on specific libraries or frameworks) to estimate the model's resource requirements and performance characteristics (e.g., computational intensity, memory footprint, and potential bottlenecks). In some implementations, the system can execute the model with representative data and capturing metrics such as processing time, accuracy, throughput, CPU and GPU utilization, memory consumption, and network bandwidth usage.

In some implementations, the system obtains a set of operation boundaries (e.g., guidelines, regulatory guidelines) of the plurality of AI models. In some implementations, the system translates guidelines into actionable test cases for evaluating AI model compliance. By parsing and interpreting guidelines (e.g., regulatory documents), the system identifies relevant compliance requirements and operational boundaries that must be complied with plurality of AI models. The system constructs a set of test cases associated with each guideline that covers various scenarios derived from the regulatory requirements. These test cases can include prompts, expected outcomes, and/or expected explanations. For each particular AI model in the plurality of AI models, the system evaluates the particular AI model against the set of test cases to determine compliance of the particular AI model with the set of operation boundaries. The system can generate one or more compliance indicators based on comparisons between expected and actual outcomes and explanations. For example, if the particular AI model's response meets the expected outcome and explanation, the particular AI model receives a positive compliance indicator. If there are discrepancies, the system can flag these as areas requiring further attention or modification. In some implementations, the system can automatically adjust to the parameters of the particular AI model to ensure alignment with regulatory guidelines. By validating each particular AI model, this results in more efficient resource usage so the validation test cases only have to be run once by the platform, rather than every time a user attempts to access a particular AI model.

In operation 2208, the system dynamically selects a subset of AI models from the plurality of AI models by comparing the generated expected values for the set of output attributes of the output generation request with the determined capabilities of the plurality of AI models. This comparison can be performed by assigning a degree to which each model's capabilities align with/satisfy the expected values. For instance, if the request requires a high-accuracy text summary with a short response time, the system assigns a higher degree of alignment/satisfaction to models that have demonstrated high accuracy and low latency in similar tasks in their determined capabilities.

In some implementations, the subset of models is dynamically selected responsive to determining the capabilities of each particular model in the plurality of models. The system can compare the determined capabilities a first model of the plurality of models with the determined capabilities of a second model of the plurality of models. The system can use a scoring mechanism that assigns a compatibility score to each AI model based on how well its capabilities match the expected values. The scoring mechanism can use weighted criteria to prioritize certain attributes over others, depending on the specific requirements of the request. For example, in a real-time application, response time can be weighted more heavily than accuracy, whereas in a medical diagnosis task, accuracy can be the primary criterion. The system aggregates the scores to rank the AI models, identifying those that best meet the overall requirements of the request. The system can normalize the performance metrics and expected values to a common scale to allow different metrics can be compared and aggregated. The system applies weights to each metric based on the importance of the corresponding attribute. The weights can be predefined based on the type of request or dynamically adjusted based on user preferences or contextual factors. For instance, a weight of 0.7 can be assigned to accuracy and 0.3 can be assigned to latency for a medical diagnosis task, reflecting the higher priority of accuracy.

Once the weights are applied, the system calculates a weighted sum for each AI model, representing its overall compatibility score. The score is a composite measure that reflects how well the model's capabilities align with the expected values across all relevant attributes. The system aggregates the scores to rank the AI models, identifying those that best meet the overall requirements of the request. The models with the highest compatibility scores are selected as the subset of AI models for processing the output generation request. In some implementations, the system prioritizes each AI model in the plurality of AI models based on historical performance data of each AI model in the plurality of AI models. The system can store the historical performance data of each AI model in a database accessible by the system. The system updates the historical performance data of one or more AI models in the plurality of AI models after the output generation request is processed.

In some implementations, the system sequentially evaluates each model's capabilities and compares them to the expected values, until a model is found that satisfies the requirements of the output generation request. The system determines the capabilities of a first model in the plurality of models. The system compares the generated expected values for the set of output attributes of the output generation request with the determined capabilities of the first model. Responsive to the determined capabilities of the first model satisfying the generated expected values for the set of output attributes of the output generation request, the system provides the input to the first model to generate the output by processing the input included in the output generation request using the selected subset of available system resources. Responsive to the determined capabilities of the first model not satisfying the generated expected values for the set of output attributes of the output generation request, the system can determine the capabilities of a second model in the plurality of models. Responsive to the determined capabilities of the second model satisfying the generated expected values for the set of output attributes of the output generation request, the system can provide the input to the second model to generate the output by processing the input included in the output generation request using the selected subset of available system resources. The approach ensures that the system quickly identifies a suitable model without the need for exhaustive evaluation of all available models. By stopping the search as soon as a model that meets the expected values is found, the system can efficiently allocate resources and minimize processing time.

In operation 2210, the system dynamically selects a subset of available system resources to process the prompt included in the output generation request by comparing the values of the set of system resource metrics of the dynamically selected subset of AI models with the determined capabilities of the dynamically selected subset of AI models. The system can query resource management modules to obtain real-time data on resource usage across the computing infrastructure. The system assesses the availability of hardware resources, such as the number of free CPU cores, available GPU memory, and storage capacity. The system can additionally or alternatively consider software dependencies, ensuring that the required libraries and frameworks are installed and compatible with the selected models. Additionally, the system evaluates network resources, such as available bandwidth and latency, to ensure that data can be transferred efficiently between components. To perform the comparison, the system can take into account various factors, such as resource constraints, priority levels, and potential contention with other tasks. The system can assign weights (e.g., accessed via an API key) to different resource types based on the resource's respective importance for the specific models and the output generation request. For example, GPU resources can be weighted more heavily for a model that relies on parallel processing, while network bandwidth can be prioritized for a model that requires frequent data transfers.

The dynamically selected subset of available system resources can include a set of shared hardware and a set of dedicated hardware. Shared hardware refers to resources that are concurrently used by multiple tasks or processes, such as general-purpose CPUs, shared GPU clusters, and common storage systems. Dedicated hardware, on the other hand, refers to resources that are exclusively allocated to a specific task or process, such as dedicated GPU instances, specialized accelerators (e.g., TPUs), and isolated memory pools. In some implementations, the system initializes processing the input query included in the output generation request using the set of shared hardware for a predetermined time period. Upon expiration of the predetermined time period, the system continues to process the input query included in the output generation request using the set of dedicated hardware. The transition allows the most resource-intensive stages of the processing are handled by dedicated resources, which can provide higher performance, lower latency, and more predictable execution times.

In some implementations, the system initializes processing the input query included in the output generation request using the set of dedicated hardware for a predetermined time period. Upon expiration of the predetermined time period, the system continues to process the input query included in the output generation request using the set of shared hardware. The transition helps better use resources by offloading less performance-based stages of the processing to shared resources, freeing up dedicated hardware for other high-priority tasks.

In operation 2212, the system provides the prompt to the selected subset of AI models to generate the output by processing the prompt included in the output generation request using the selected subset of available system resources. The routing process can be managed by a task scheduler that coordinates the execution of the models across the allocated system resources. The scheduler ensures that the input data is distributed to the appropriate models, taking into account factors such as data locality, resource availability, and load balancing. For example, if multiple models are running on different GPU instances, the scheduler ensures that the input data is transferred to the correct GPU memory to minimize data transfer latency and maximize processing efficiency. In some implementations, responsive to the generated output, the system automatically transmits, to the computing device, the output within the threshold response time. In some implementations, processing the input included in the output generation request using the dynamically selected subset of available system resources consumes less electrical power than processing the input included in the output generation request using a different subset of available system resources within the set of available system resources.

The output can be a final output. In some implementations, the system provides the prompt to the dynamically selected subset of AI models in parallel. The system can aggregate model-specific outputs from each AI model of the dynamically selected subset of AI models to generate the final output. In some implementations, the system distributes the input prompt across multiple AI models simultaneously, allowing each model to process the data independently and concurrently. The system can partition the input prompt into segments or sub-tasks that can be processed in parallel. For instance, in a text summarization task, the input document can be divided into sections, with each section being processed by a different model. In an image recognition task, different regions of an image can be analyzed by separate models. Once the input prompt is partitioned, the system routes each segment to the corresponding AI model in the dynamically selected subset. Once each AI model has processed the model's segment of the input prompt, the system aggregates the model-specific outputs to generate the final output. For instance, in a text summarization task, the system can merge the summaries generated by each model into a single summary. In an image recognition task, the system can combine the detected objects and features from each model into a single analysis of the input image.

In some implementations, the system provides the prompt to the dynamically selected subset of AI models in a sequence. The system can input a model-specific output from a first AI model of the dynamically selected subset of AI models into a second AI model of the dynamically selected subset of AI models in the sequence. For example, the system can provide the initial prompt to the first AI model in the sequence. The model processes the input data according to its specific capabilities and generates an intermediate output. For example, in an NLP task, the first model can perform tokenization and part-of-speech tagging on the input text. In an image processing task, the first model can perform initial feature extraction or object detection. Once the first model has generated its output, the system takes the model-specific output and inputs the model-specific output into the second AI model in the sequence. The second model processes the intermediate output, further refining or transforming the data. For instance, in the NLP task, the second model can perform named entity recognition or sentiment analysis on the tagged text. In the image processing task, the second model can perform more detailed analysis, such as identifying specific objects or classifying detected features. The sequential processing continues, with each model in the sequence receiving the output from the previous model and generating its own intermediate output. Once the final model in the sequence has processed its input, the system generates the final output.

In some implementations, the system generates a confidence score for a model-specific output generated by each AI model in the selected subset of AI models. The system can aggregate the model-specific outputs using the generated confidence scores. The system selects the model-specific output with a highest confidence score for transmission to the computing device. For example, in an NLP task, a model can calculate its confidence score based on the probability distribution of the generated text, the coherence of the sentences, and the alignment with known linguistic patterns. In an image recognition task, a model can calculate its confidence score based on the clarity of the detected objects, the consistency of the classification results, and the alignment with training data.

The system can receive a set of user feedback on the generated output. The feedback can be collected through various channels, such as user ratings, comments, error reports, or direct interaction with the output. The feedback data can be evaluated by the system to identify patterns, trends, and specific areas for improvement using NLP techniques and sentiment analysis to interpret and categorize the feedback. For example, the system can parse the textual feedback to extract information such as user satisfaction levels, specific issues encountered, and/or suggestions for improvement. The system can use machine learning algorithms, such as support vector machines (SVM) or neural networks, to classify the feedback into different categories, such as accuracy, relevance, performance, and usability. For example, feedback indicating that the output was inaccurate or irrelevant can be categorized under "accuracy issues," while feedback highlighting slow response times can be categorized under "performance issues."

Using the processed feedback, the system can adjust the dynamically selected subset of AI models and/or the dynamically selected subset of available system resources. For the AI models, the system can update the model selection criteria (e.g., assigning a higher weight to criticized areas such as accuracy or latency), retrain or fine-tune the models, or incorporate new models that better address the identified issues. For the system resources, the system can reallocate resources based on the feedback to improve performance and efficiency. For example, if the feedback indicates that the processing time is too slow, the system can allocate more CPU or GPU resources to the task, adjust the data pipelines, or implement more efficient algorithms. Conversely, if the feedback indicates that certain resources are being underutilized, the system can reallocate those resources to other tasks or reduce the overall resource allocation to improve cost efficiency. In some implementations, the system can use a reward-based mechanism where positive feedback leads to reinforcement of the current model and resource configurations, while negative feedback triggers further adjustments.

In some implementations, responsive to the generated output, the system generates for display at the computing device, a layout indicating the output. The layout can include a first representation of each model in the dynamically selected subset of models, a second representation of the dynamically selected subset of available system resources, and/or a third representation of the output. Further examples and methods of displaying the output are discussed with reference to FIG. 23.

Figure 23:
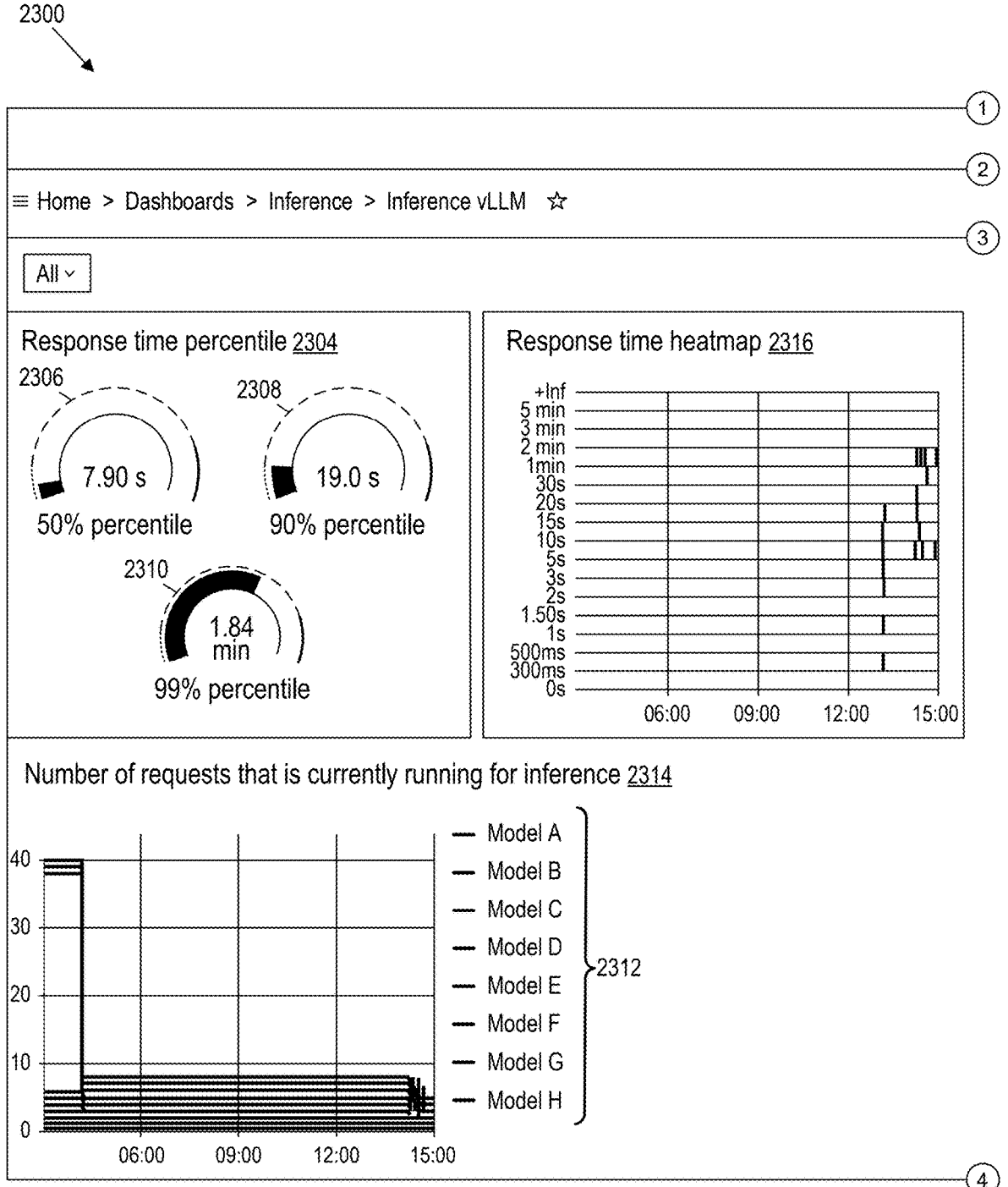
FIG. 23 is an example user interface for monitoring user activity, in accordance with some implementations of the present technology.
Figure 23:
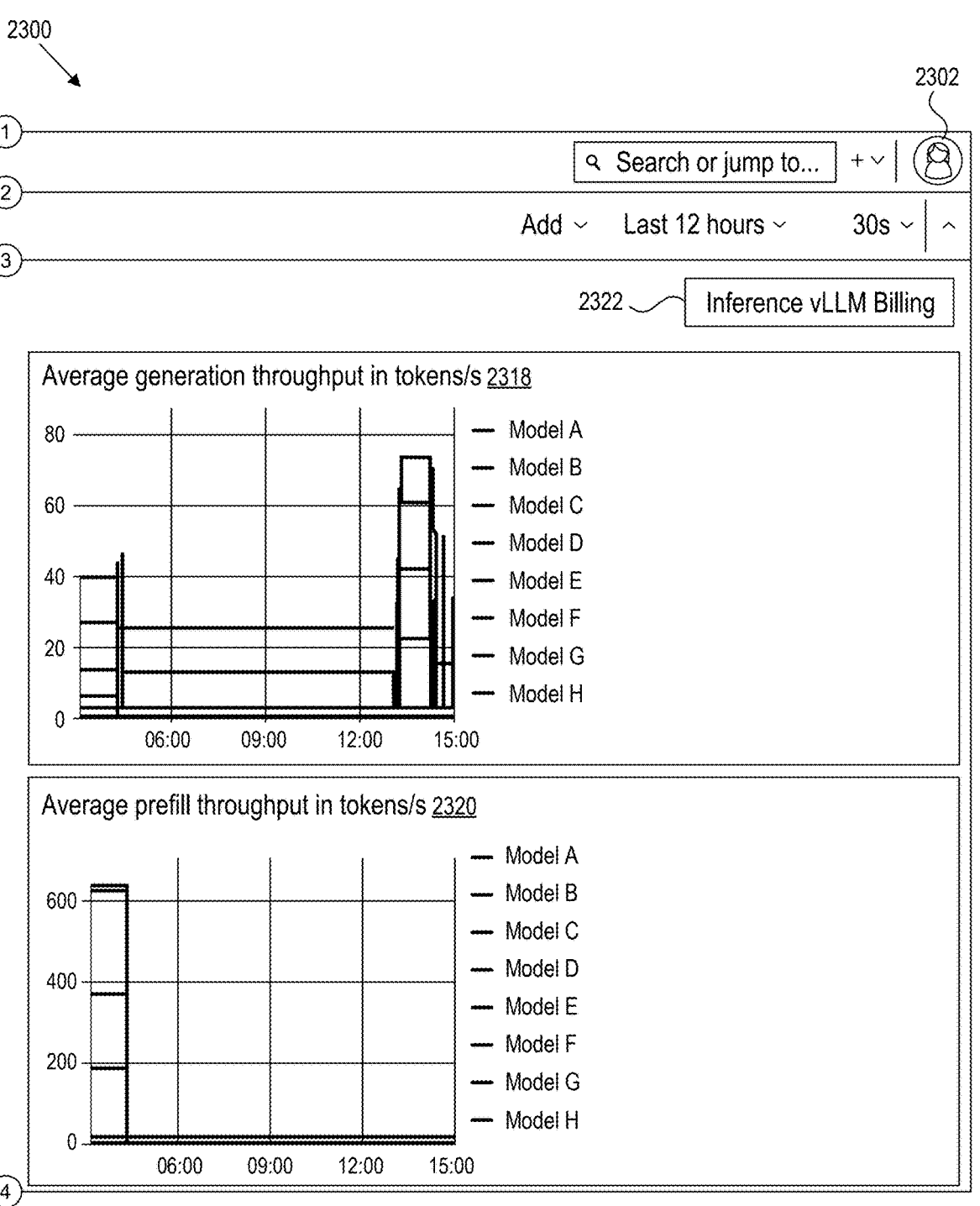

FIG. 23 is an example user interface 2300 for monitoring user activity, in accordance with some implementations of the present technology. User interface 2300 includes user 2302, response time percentile 2304, percentile graphs 2306, 2308, 2310, models 2312, request load 2314, latency representation 2316, generation throughput representation 2318, prefill throughput representation 2320, and cost representation 2322. User interface 2300 is implemented using components of example devices 200 and computing devices 302 illustrated and described in more detail with reference to FIG. 2 and FIG. 3, respectively. User 2302 can be the same as or similar to users 2002a-d with reference to FIG. 21. Implementations of example user interface 2300 can include different and/or additional components or can be connected in different ways.

The user interface 2300 allows users or administrators to monitor and manage the platform performance. The user 2302 refers to the individual or entity interacting with the system. The user 2302 can have a particular role and set of permissions within the system, and the output generation requests of the user 2302 can be tracked to ensure efficient resource allocation and model selection. In some implementations, the user 2302 can include automated agents or services that interact with the system on behalf of human users.

The response time percentile 2304 represents the distribution of response times for requests processed by the system. The response time percentile 2304 can be used to indicate the performance and latency of the system. The response time percentile 2304 can be displayed in a particular percentile format, such as the 50th, 90th, and 99th percentiles, indicating the response times below which a certain percentage of requests fall. In some implementations, additional percentiles or custom percentile ranges can be included to provide more granular insights into system performance. Percentile graphs 2306, 2308, 2310 visually represent the response time percentiles over a specified period. For example, in FIG. 16, percentile graph 2306 indicates the 50th percentile (e.g., 7.90 seconds), percentile graph 2308 indicates the 90th percentile (e.g., 19.0 seconds), and percentile graph 2310 indicates the 99th percentile (e.g., 1.84 seconds). Percentile graphs 2306, 2308, 2310 help users or administrators quickly identify trends and anomalies in system performance. In some implementations, the percentile graphs 2306, 2308, 2310 can be interactive, allowing users to zoom in on specific time ranges or filter data based on different criteria.

Models 2312 refer to the various machine learning models available within the system. Models 2312 can include a wide range of models, such as those for text generation, image recognition, and summarization, as depicted in FIG. 21. Each model has specific capabilities and resource requirements. In some implementations, models 2312 can also include custom or user-defined models loaded into the platform.

Request load 2314 indicates the number of requests currently being processed by the system. For example, high request loads can trigger the dynamic selection of additional models or system resources to maintain performance. In some implementations, request load 2314 can also include historical data to help predict future workloads. Latency representation 2316 visualizes the latency of requests processed by the system and helps users identify delays and bottlenecks in the system. For example, the latency representation 2316 can be displayed as a heatmap, bar chart, or line graph. In some implementations, latency representation 2316 can include breakdowns by model (e.g., Models A through H) or resource type to provide more detailed insights.

Generation throughput representation 2318 represents the average throughput of the system in terms of tokens generated per second and indicates the efficiency of the models in generating outputs. In some implementations, the generation throughput representation 2318 can be broken down by individual models or aggregated across all models to provide a comprehensive view of system performance. Prefill throughput representation 2320 indicates the average throughput of the system in terms of tokens prefilled per second. Prefill throughput representation 2320 helps users understand the efficiency of the system in preparing inputs for model processing. In some implementations, the prefill throughput representation 2320 can be displayed alongside generation throughput to provide a complete picture of system performance. Cost representation 2322 indicates the cost associated with processing requests within the system and helps users manage and adjust their resource usage to lower expenses. Cost representation 2322 can include metrics such as the cost per request, total cost over a specified period, and cost breakdown by model or resource type. In some implementations, cost representation 2322 can also include projections and recommendations generated by the platform using methods discussed in FIG. 22.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having operations, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 712(f) will begin with the words "means for," but use of the term "for" in any other context is not intended to invoke treatment under 35 U.S.C. § 712(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A non-transitory computer-readable storage medium comprising instructions for routing queries to autonomous artificial intelligence (AI) agents using respective semantic fingerprints stored thereon, wherein the instructions when executed by at least one data processor of a system, cause the system to:

receive, from a computing device, an output generation request comprising a query for generation of an output using one or more AI agents of a plurality of AI agents, wherein each AI agent is associated with a computer-executable operation set that is configured to be autonomously executed by the AI agent on a software application set in response to satisfaction of a condition set associated with the AI agent;

generate a query fingerprint for the query by:

generating a semantic feature set from textual data of the query by applying a neural network-based embedding model to each token of the query, applying a plurality of hash functions to the semantic feature set to generate an output set, wherein each hash function operates within a different dimension of the semantic feature set, and aggregating respective output sets of the plurality of hash functions to generate a composite binary vector that represents the query fingerprint;

access, for each AI agent of the plurality of AI agents, an associated agent fingerprint that comprises a particular binary vector generated by applying the plurality of hash functions to a textual description set describing the computer-executable operation set of the AI agent;

apply the query fingerprint to a series of probabilistic membership data structures each configured to probabilistically determine a similarity between the query fingerprint and each accessed agent fingerprint of the plurality of AI agents;

select one or more AI agents from the plurality of AI agents to form a selected AI agent set, wherein a respective agent fingerprint of each selected AI agent satisfies a similarity threshold associated with the query fingerprint; and in response to forming the selected AI agent set, transmit the query to one or more selected AI agents of the selected AI agent set to autonomously execute respective computer-executable operation sets of the one or more selected AI agents.

2. The non-transitory computer-readable storage medium of claim 1, wherein each computer-executable operation set executed by each AI agent causes the AI agent to perform one or more of: retrieval of data from a database, updating of a data structure, invoking an application programming interface (API), or returning a response to the computing device.

3. The non-transitory computer-readable storage medium of claim 1, wherein one or more AI agents of the plurality of AI agents are autonomous AI agents or semi-autonomous AI agents.

4. The non-transitory computer-readable storage medium of claim 1, wherein each hash function of the plurality of hash functions is a locality-sensitive hash (LSH) function.

5. The non-transitory computer-readable storage medium of claim 1, wherein applying the query fingerprint to the series of probabilistic membership data structures comprises:

identifying a series of bloom hash functions, wherein each bloom hash function is configured to output a hash value that is less than a maximum hash value;

generate, for each accessed agent fingerprint, a corresponding bloom bitstring, wherein a length of the corresponding bloom bitstring corresponds to the maximum hash value, wherein each nonzero bit in the bloom bitstring is at a position in the bloom bitstring that corresponds to a bloom hash value computed by applying a bloom hash function to the accessed agent fingerprint, wherein each corresponding bloom bitstring is an entry in a probabilistic data structure of the series of probabilistic membership data structures;

generate a query bloom hash value by applying a particular bloom hash function to the query fingerprint, access, via the probabilistic data structure, a particular bit of a bloom bitstring corresponding to a particular agent fingerprint;

wherein the particular bit is at a position in the particular bloom bitstring that corresponds to the query bloom hash value; and determine, in response to the particular bit having a value of zero, that the query fingerprint is not equal to the particular agent fingerprint.

6. The non-transitory computer-readable storage medium of claim 1, wherein the dimensions comprise one or more of: a domain, an intent, a required action, or a data sensitivity level.

7. The non-transitory computer-readable storage medium of claim 1, wherein a first hash function generates outputs that are longer than outputs of a second hash function.

8. The non-transitory computer-readable storage medium of claim 1, wherein selecting the one or more AI agents comprises:

identifying, based on applying the query fingerprint to the series of probabilistic membership data structures, one or more similar agent fingerprints, wherein each similar agent fingerprint satisfies the similarity threshold associated with the query fingerprint;

computing a Hamming distance between each similar agent fingerprint and the query fingerprint; and selecting AI agents corresponding to agent fingerprints with a corresponding Hamming distance that is below a threshold distance value.

9. The non-transitory computer-readable storage medium of claim 8, wherein computing a Hamming distance comprises performing a single-instruction, multiple-data (SIMD) operation.

10. A computer-implemented method for routing inputs to autonomous artificial intelligence (AI) agents using respective semantic fingerprints, the method comprising:

obtaining an output generation request comprising an input for generation of an output using one or more AI agents of a plurality of AI agents, wherein each AI agent is associated with a computer-executable operation set that is configured to be autonomously executed by the AI agent on a software application set in response to satisfaction of a condition set associated with the AI agent;

generating a semantic feature set from the input by applying a neural network-based embedding model to a representation of the input;

applying one or more sets of hash functions to the semantic feature set to generate one or more output sets, wherein each output set corresponds to a set of hash functions, wherein each set of hash functions operate within a different dimension of the semantic feature set;

aggregating the one or more output sets to generate a composite vector that represents an input fingerprint;

accessing, for each AI agent of the plurality of AI agents, an associated agent fingerprint that comprises an associated vector generated by applying the one or more sets of hash functions to a description of the computer-executable operation set associated with the AI agent;

applying the input fingerprint to a series of probabilistic membership data structures each configured to probabilistically determine a similarity between the input fingerprint and each accessed agent fingerprint of the plurality of AI agents;

selecting one or more AI agents from the plurality of AI agents to form a selected AI agent set, wherein a respective agent fingerprint of each selected AI agent satisfies a similarity threshold associated with the input fingerprint; and in response to forming the selected AI agent set, transmitting the input to one or more selected AI agents of the selected AI agent set to autonomously execute respective computer-executable operation sets of the one or more selected AI agents.

11. The computer-implemented method of claim 10, wherein one or more hash functions of the one or more sets of hash functions are locality-sensitive hash (LSH) functions.

12. The computer-implemented method of claim 10, wherein aggregating the one or more output sets comprises:

generating an output value for each output set; and concatenating the output values to generate the composite vector.

13. The computer-implemented method of claim 10, wherein applying the input fingerprint to the series of probabilistic membership data structures comprises:

identifying a set of bloom hash functions, wherein each bloom hash function is configured to output a hash value below a maximum hash value;

generate, for each accessed agent fingerprint, a corresponding bloom bitstring, wherein a length of the corresponding bloom bitstring corresponds to the maximum hash value, wherein each nonzero bit in the bloom bitstring is at a position in the bloom bitstring that corresponds to a bloom hash value computed by applying a bloom hash function to a portion of the accessed agent fingerprint, wherein each corresponding bloom bitstring is an entry in a probabilistic data structure of the series of probabilistic membership data structures;

generate an input bloom hash value by applying a particular bloom hash function to a portion of the input fingerprint, access, via the probabilistic data structure, a particular bit of a particular bloom bitstring corresponding to a particular accessed agent fingerprint;

wherein the particular bit is at a position in the particular bloom bitstring that corresponds to the input bloom hash value; and determine, based at least in part on the particular bit having a value of zero, that the particular accessed fingerprint does not satisfy a similarity threshold associated with the input fingerprint.

14. The computer-implemented method of claim 13, wherein the input bloom hash value is generated by applying the bloom hash function a portion of the input fingerprint corresponding to an output set of the one or more output sets.

15. The computer-implemented method of claim 10, wherein selecting the one or more AI agents comprises:

identifying, based on applying the input fingerprint to the series of probabilistic membership data structures, one or more similar agent fingerprints, wherein each similar agent fingerprint satisfies the similarity threshold associated with the input fingerprint;

determining that a first similar agent fingerprint corresponding to a first AI agent is identical to a second similar agent fingerprint corresponding to a second selected AI agent;

identifying a first success rate of the first selected AI agent;

identifying a second success rate of the second selected AI agent; and in response to the first success rate being higher than the second success rate, select the first AI agent to be included in the selected AI agent set.

16. The computer-implemented method of claim 10, further comprising:

generating a cryptographic hash representing the input and the selected AI agents; and storing the cryptographic hash on a distributed ledger.

17. A system comprising:

at least one hardware processor; and at least one non-transitory memory storing instructions, which, when executed by the at least one hardware processor, cause the system to:

obtain an output generation request comprising a command set for generation of an output using one or more AI agents of a plurality of AI agents, wherein each AI agent is associated with a computer-executable operation set that is configured to be autonomously executed by the AI agent on a software application set in response to satisfaction of a condition set associated with the AI agent;

generate a command fingerprint for the command set by:

generating a semantic feature set from the command set by applying a neural network-based embedding model to a representation of the command set, applying one or more sets of hash functions to the semantic feature set to generate one or more output sets, wherein each output set corresponds to a set of hash functions, wherein each set of hash functions operate within a different dimension of the semantic feature set, and aggregating the one or more output sets to generate a composite vector that represents the command fingerprint;

access, for each AI agent of the plurality of AI agents, an associated agent fingerprint that comprises an associated vector generated by applying the plurality of hash functions to a description of the computer-executable operation set associated with the AI agent;

apply the command fingerprint to a series of probabilistic membership data structures each configured to probabilistically determine membership of the command fingerprint in one or more predetermined sets of accessed agent fingerprints of the plurality of AI agents;

select one or more AI agents from the plurality of AI agents to form a selected AI agent set, wherein the a respective agent fingerprint of each selected AI agent satisfies a similarity threshold associated with the command fingerprint; and in response to forming the selected AI agent set, transmit the command set to one or more selected AI agents of the selected AI agent set to autonomously execute respective computer-executable operation sets of the one or more selected AI agents.

18. The system of claim 17, wherein the command set comprises a natural language instruction.

19. The system of claim 17, wherein at least one associated agent fingerprint comprises an associated vector generated by applying the plurality of hash functions to a natural language description.

20. The system of claim 17, wherein applying the command fingerprint to the series of probabilistic membership data structures comprises:

identifying a set of bloom hash functions, wherein each bloom hash function is configured to output a hash value below a maximum hash value;

generate, for each set of accessed agent fingerprints, a corresponding bloom bitstring, wherein a length of the corresponding bloom bitstring corresponds to the maximum hash value, wherein each nonzero bit in the bloom bitstring is at a position in the bloom bitstring that corresponds to a bloom hash value computed by applying a bloom hash function to an accessed agent fingerprint of the set of accessed agent fingerprints, wherein each corresponding bloom bitstring is an entry in a probabilistic membership data structure of the series of probabilistic data structures;

generate a command bloom hash value by applying a particular bloom hash function to a portion of the command fingerprint, access, via the probabilistic data structure, a particular bit of a particular bloom bitstring corresponding to a particular set of accessed agent fingerprints;

wherein the particular bit is at a position in the particular bloom bitstring that corresponds to the command bloom hash value; and determine, based at least in part on the particular bit having a value of zero, that a particular agent fingerprint of the particular set of accessed agent fingerprints does not satisfy a similarity threshold associated with the command fingerprint.

* * * * *